United States Patent
Moriura et al.

(10) Patent No.: US 11,296,383 B2
(45) Date of Patent: Apr. 5, 2022

(54) SECONDARY BATTERY

(71) Applicant: Panasonic Intellectual Property Management Co., Ltd., Osaka (JP)

(72) Inventors: Yuta Moriura, Osaka (JP); Kenichi Ono, Hyogo (JP); Hironobu Ukitsu, Osaka (JP); Shinobu Masuda, Osaka (JP); Yui Sawada, Osaka (JP); Seiichi Hatakenaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 14 days.

(21) Appl. No.: 16/935,106

(22) Filed: Jul. 21, 2020

(65) Prior Publication Data

US 2020/0350535 A1     Nov. 5, 2020

Related U.S. Application Data

(63) Continuation of application No. PCT/JP2019/001667, filed on Jan. 21, 2019.

(30) Foreign Application Priority Data

Jan. 23, 2018    (JP) .................................. 2018-009059
Jan. 23, 2018    (JP) .............................. JP2018-009100

(51) Int. Cl.
*H01M 50/20*       (2021.01)
*H01M 10/615*     (2014.01)
(Continued)

(52) U.S. Cl.
CPC .......... *H01M 50/20* (2021.01); *H01M 10/44* (2013.01); *H01M 10/48* (2013.01);
(Continued)

(58) Field of Classification Search
CPC .... H01M 10/425; H01M 10/44; H01M 10/48; H01M 10/615; H01M 10/63;
(Continued)

(56) References Cited

U.S. PATENT DOCUMENTS

2012/0219839 A1    8/2012   Kritzer et al.
2015/0104683 A1    4/2015   Lundstrom
2019/0348721 A1*   11/2019   Unno ..................... H02J 7/0021

FOREIGN PATENT DOCUMENTS

JP    2011-048425 A    3/2011
JP    2012-073150 A    4/2012
(Continued)

OTHER PUBLICATIONS

Internatonal Preliminary Report on Patentability issued in corresponding International Patent Application No. PCT/JP2019/001667, dated Jul. 28, 2020, with English translation.
(Continued)

*Primary Examiner* — Victoria H Lynch
(74) *Attorney, Agent, or Firm* — McDermott Will & Emery LLP

(57) ABSTRACT

The present invention provides a secondary battery in which effective utilization of the installation space for a pressure sensitive sensor and a heater is more sufficiently achieved and high rate deterioration and electrolytic solution deterioration can be more sufficiently detected. The present invention relates to a secondary battery including: one or more battery cells; a case for housing the battery cells; and a heater provided between a battery cell in contact with the case and the case and/or between two battery cells adjacent to each other among the battery cells, in which the heater serves as a pressure sensitive sensor that detects a pressure
(Continued)

distribution between the battery cell in contact with the case and the case and/or between the two battery cells adjacent to each other.

18 Claims, 24 Drawing Sheets

(51) Int. Cl.
*H01M 10/6555* (2014.01)
*H01M 10/6571* (2014.01)
*H01M 10/44* (2006.01)
*H01M 10/48* (2006.01)

(52) U.S. Cl.
CPC ..... *H01M 10/615* (2015.04); *H01M 10/6555* (2015.04); *H01M 10/6571* (2015.04)

(58) Field of Classification Search
CPC ......... H01M 10/6555; H01M 10/6571; H01M 2010/4271; H01M 2220/20; H01M 50/20; H01M 10/625; H01M 10/647; Y02E 60/10
See application file for complete search history.

(56) References Cited

FOREIGN PATENT DOCUMENTS

| | | |
|---|---|---|
| JP | 2013-510411 A | 3/2013 |
| JP | 5467322 B2 | 4/2014 |
| JP | 5493070 B2 | 5/2014 |
| JP | 5668966 B2 | 2/2015 |
| JP | 2015-518240 A | 6/2015 |
| JP | 2015-138649 A | 7/2015 |
| JP | 6037166 B2 | 11/2016 |
| JP | 2017-027774 A | 2/2017 |

OTHER PUBLICATIONS

International Search Report issued in corresponding International Patent Application No. PCT/JP2019/001667, dated Feb. 26, 2019, with English translation.

* cited by examiner

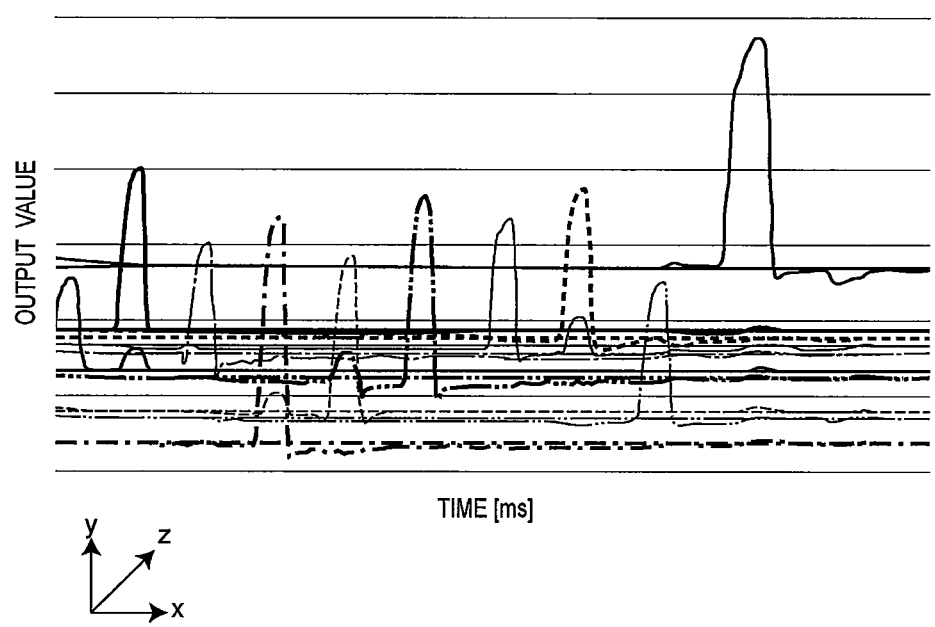

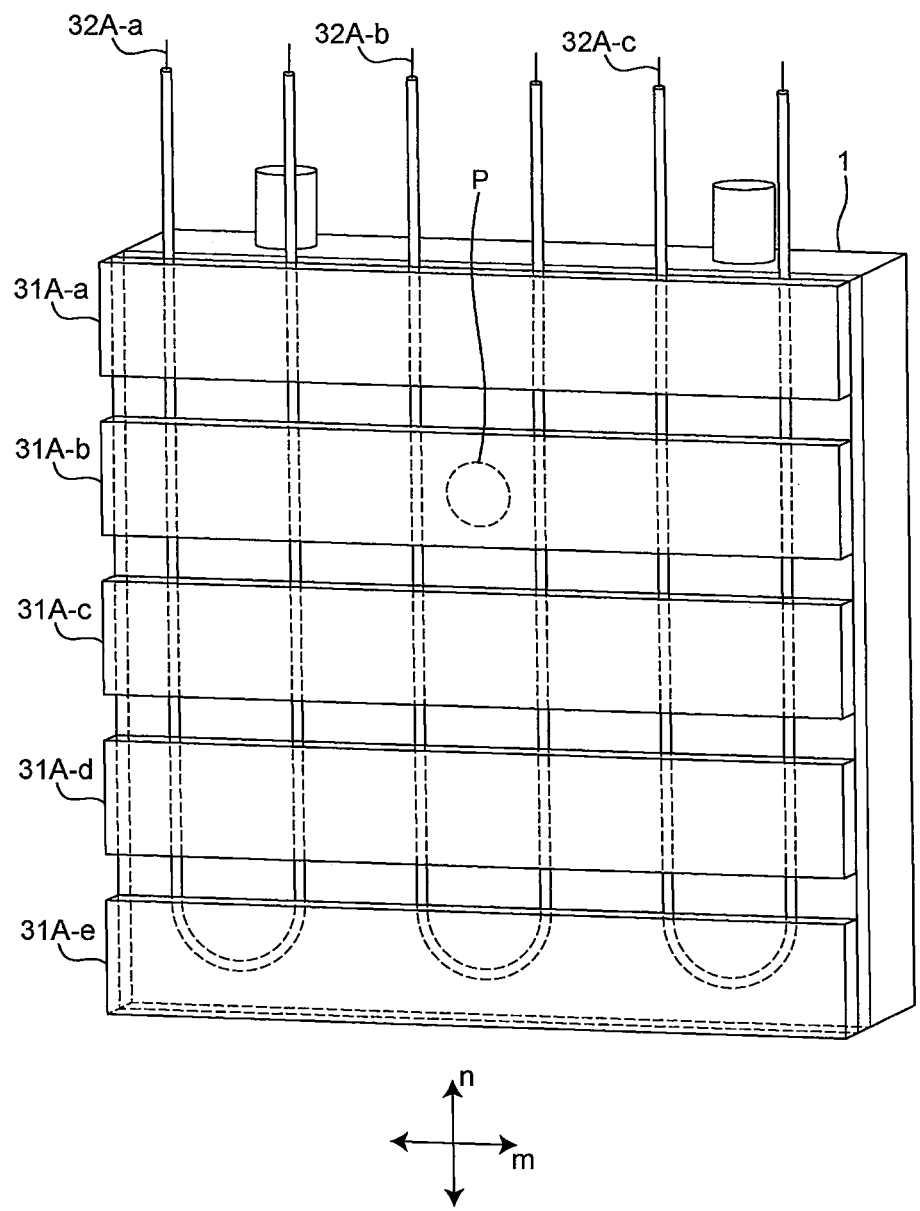

SECONDARY BATTERY

CROSS-REFERENCE OF RELATED APPLICATIONS

This application is the Continuation Application of International Patent Application No. PCT/JP2019/001667, filed on Jan. 21, 2019, which in turn claims the benefit of Japanese Application No. 2018-009059, filed on Jan. 23, 2018, and Japanese Application No. 2018-009100, filed Jan. 23, 2018, the entire disclosures of which Applications are incorporated by reference herein.

TECHNICAL FIELD

The disclosure relates to a secondary battery.

BACKGROUND ART

In the field of secondary batteries typified by lithium-ion batteries, high output is demanded in order to drive large-scale equipment such as electric vehicles. Hence, for example, secondary batteries which are so-called assembled batteries or battery packs and include two or more battery cells housed in a case are well known.

In such secondary batteries, discharge at a high rate is demanded for high output but, for example, there has been a problem of high rate deterioration due to insufficient battery reaction in a low temperature environment of 0° C. or less. In addition, for example, there has been a problem of an increase in output current (overcurrent) due to deterioration of the electrolytic solution at the time of long-term use of the secondary battery.

Both of these problems (namely, high rate deterioration and electrolytic solution deterioration) are accompanied by a volume increase (swelling) of the secondary battery, and thus attempts have been made to dispose a pressure sensor inside or outside the case (Patent Literatures 1 to 3). For example, Patent Literature 1 proposes a technique in which a pressure sensor and a heater are disposed outside the case and the secondary battery is heated by the heater at an appropriate timing based on the pressure sensor to suppress high rate deterioration. Moreover, for example, in Patent Literature 2, an attempt has been made to dispose a heater inside the case while disposing a rod-shaped pressure sensor between two adjacent battery cells. In addition, for example, in Patent Literature 3, an attempt has been made to dispose a pressure sensor inside the case.

On the other hand, in recent years, in the field of next-generation tactile interfaces, it is demanded to have both an input function to input information through a tactile sense and an output function to generate heat, vibration and the like that act on human intuition (five senses).

As an input device which exerts an input function, various pressure sensitive devices have been conventionally known which detect pressure distribution by measuring a pressing position and a pressing force by a capacitance type (for example, Patent Literatures 4 to 7).

CITATION LIST

Patent Literature

Patent Literature 1: JP-B-6037166
Patent Literature 2: JP-A-2015-138649
Patent Literature 3: JP-A-2017-27774
Patent Literature 4: JP-B-5467322
Patent Literature 5: JP-B-5493070
Patent Literature 6: JP-B-5668966
Patent Literature 6: JP-A-2012-73150

SUMMARY OF INVENTION

Problems to be Solved by the Invention

However, in the field of conventional secondary batteries, a pressure sensor and a heater are each disposed as a separate member and thus the installation space cannot be effectively used. In addition, the heater heats the entire secondary battery, thus the entire case is heated when heating is performed to suppress high rate deterioration, and the heating efficiency is poor. Hence, high rate deterioration cannot be sufficiently suppressed. In addition, the site at which high rate deterioration is not required to be suppressed is also heated, and thus it may cause new failures such as inducement to deterioration (evaporation) of the electrolytic solution. Furthermore, when one or more battery cells are housed in the case to assemble a secondary battery, the secondary battery may be in a state in which a great pressure is locally applied to the battery cells due to deviation of the battery cells and the like, and this becomes a starting point of battery deterioration. For example, the expansion places are different in each cell surface, the expansion places are nonuniform in the surface, and this becomes a starting point of cell failure.

The main object of the disclosure is to provide a secondary battery in which effective utilization of the installation space for a pressure sensitive sensor and a heater is more sufficiently achieved.

An auxiliary object of the disclosure is to provide a secondary battery in which effective utilization of the installation space for a pressure sensitive sensor and a heater is more sufficiently achieved and high rate deterioration can be more sufficiently detected.

An auxiliary object of the disclosure is to provide a secondary battery in which effective utilization of the installation space for a pressure sensitive sensor and a heater is more sufficiently achieved and high rate deterioration and electrolytic solution deterioration can be more sufficiently detected.

Moreover, in the field of next-generation tactile interfaces, there are new problems such as lack of installation space and/or increased number of wirings and an increase in manufacturing cost since both an input device (for example, pressure sensitive device) and an output device (for example, heating device) are mounted.

An auxiliary object of the disclosure is to provide a pressure sensitive device which additionally serves as a heating device.

Means for Solving Problems

The disclosure relates to a secondary battery including:
one or more battery cells;
a case for housing the battery cells; and
a heater provided between a battery cell in contact with the case and the case and/or between two battery cells adjacent to each other among the battery cells, in which
the heater additionally serves as a pressure sensitive sensor that detects a pressure distribution between the battery cell in contact with the case and the case and/or between the two battery cells adjacent to each other.

The disclosure relates to a pressure sensitive device including:

a plurality of first electrodes extending in a first direction, a plurality of second electrodes extending in a second direction intersecting the first direction, a plurality of dielectrics provided on surfaces of the plurality of second electrodes, and a conductive heating element and a conductive elastic body that are disposed at each of a plurality of facing portions at which the plurality of first electrodes and the plurality of second electrodes intersect each other.

Effects of the Invention

In the secondary battery of the disclosure, the heater additionally serves as a pressure sensitive sensor and it is thus possible to more sufficiently achieve effective utilization of the installation space for a pressure sensitive sensor and a heater.

In the secondary battery of the disclosure, it is desirably possible to more sufficiently detect high rate deterioration.

In the secondary battery of the disclosure, it is desirably possible to more sufficiently detect electrolytic solution deterioration.

In the secondary battery of the disclosure, the heater which additionally serves as a pressure sensitive sensor is disposed inside the case, it is thus desirably possible to more sufficiently prevent the secondary battery from being in a state in which a great pressure is locally applied to the battery cells.

The pressure sensitive device of the disclosure can additionally serve as a heating device.

The pressure sensitive device of the disclosure can desirably perform local heating.

BRIEF DESCRIPTION OF DRAWINGS

FIG. 8 is an example of a manner (graph) of changes in an output value when a load is applied to each of ten sensor units (elements) and simultaneous measurement is performed in heaters according to the first embodiment and the third embodiment and the pressure sensitive device according to the tenth embodiment.

FIG. 9 illustrates a schematic appearance of a battery cell equipped with the heater according to the first embodiment.

MODES FOR CARRYING OUT THE INVENTION

Figure 1:
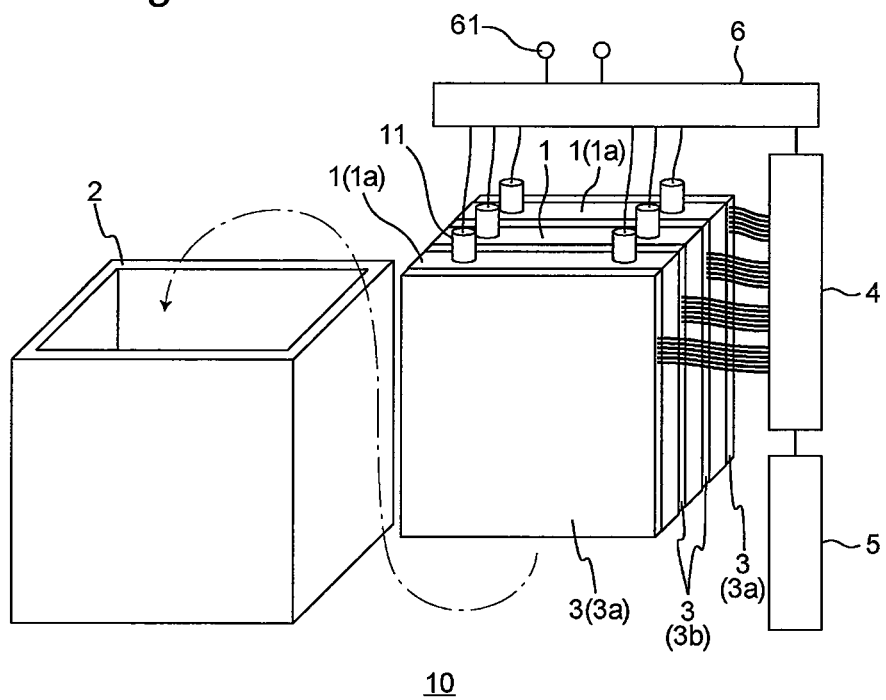
FIG. 1 is an exploded schematic diagram of an example of a secondary battery according to the disclosure.

Hereinafter, a secondary battery and a pressure sensitive device of the disclosure will be described with reference to the drawings. It should be noted that the various elements illustrated in the drawings are merely schematic for understanding of the disclosure, and dimensional ratios, appearances, and the like may be different from actual ones. Incidentally, "up and down direction", "left and right direction" and "front and back direction" used directly or indirectly in the present specification correspond to the directions matching with the "up and down direction", "left and right direction" and "front and back direction" in the drawings, respectively. In addition, unless otherwise stated, the same reference sign or symbol indicates the same member or the same meaning.

The various numerical ranges referred to in the present specification are intended to include the upper and lower numerical limits themselves unless otherwise stated. In other words, for example, in the case of a numerical range of 1 to 10, the numerical range can be interpreted as including the lower limit value "1" and the upper limit value "10".

[Secondary Battery]

A secondary battery 10 of the disclosure includes a battery cell 1, a case 2 which houses the battery cell, and a heater 3, for example, as illustrated in FIG. 1. In the disclosure, the secondary battery 10 may be all secondary batteries which can extract a power by a chemical reaction. The "secondary battery" in the present specification refers to a battery capable of being repeatedly charged and discharged and can also be called a "power storage device". The secondary battery is not particularly limited, and examples thereof include a lithium-ion battery, a nickel-cadmium battery, and a nickel battery. FIG. 1 is an exploded schematic diagram of an example of the secondary battery according to the disclosure.

The secondary battery 10 of the disclosure usually further includes a measurement unit 4 which detects and measures the pressure distribution of the heater 3 as illustrated in FIG. 1. The secondary battery 10 of the disclosure preferably further includes a power supply unit 5 which supplies a power to the heater 3 and/or an output control unit 6 which controls a power to be output from the battery cell 1.

<Battery Cell>

The battery cell 1 is a constituent unit of a battery and is a minimum unit capable of extracting a power. In the secondary battery of the disclosure, the number of battery cells 1 housed in one case is "three" in FIG. 1, but is not particularly limited, and may be one or more, and is usually two to 100. A preferable battery cell in the disclosure is a battery cell of a lithium-ion battery.

The overall shape of the battery cell 1 is not particularly limited. The overall shape of the battery cell 1 may usually be a sheet shape as illustrated in FIG. 1 or a cylindrical shape. In a case where two or more battery cells are housed in the case, all the two or more battery cells usually have the same shape but may be, for example, a battery cell mixture including one or more sheet-shaped battery cells and one or more cylindrical battery cells. In the disclosure, all the two or more battery cells preferably have a sheet shape.

The battery cell 1 is fabricated by enclosing one or more positive electrodes, one or more negative electrodes, a separator disposed between the positive electrode and the negative electrode, and an electrolyte in an outer package. The outer package may be a soft pouch or a hard case. The outer package is preferably a soft pouch, particularly a soft pouch formed of a so-called laminated film from the viewpoint of further improving the detection sensitivity to high rate deterioration and electrolytic solution deterioration (hereinafter collectively referred to as "battery deterioration"), particularly high rate deterioration.

The positive electrode and negative electrode enclosed in the sheet-shaped battery cell may configure a planar laminated structure or a spiral structure together with the separator. In the secondary battery of the disclosure, it is preferable that the positive electrode and the negative electrode configure a planar laminated structure from the viewpoint of further improving the detection sensitivity to battery deterioration, particularly high rate deterioration. The planar laminated structure is a structure in which a positive electrode and a negative electrode which have a planar shape are laminated with a separator interposed therebetween. The spiral structure is a structure in which a positive electrode and a negative electrode are laminated with a separator interposed therebetween and this laminate is spirally wound.

<Case>

The case 2 houses the battery cell 1 and the heater 3 (including 3a and 3b) to be described later inside. The case 2 is usually a hard case and is particularly formed of a hard material. Examples of the hard material include polymer materials such as polyimide resin, polyolefin resin (for example, polypropylene resin), polyester resin (for example, polyethylene terephthalate resin), polycarbonate resin, and polyphenylene sulfide resin; and metal materials such as aluminum, stainless steel, steel, and copper. The case 2 is preferably formed of a polymer material from the viewpoint of further improving the detection sensitivity to battery deterioration, particularly high rate deterioration.

The shape and dimensions of the case 2 are not particularly limited as long as the battery cell 1 and heater 3 to be housed can be fixed inside by being sandwiched. In particular, the shape of the case 2 may be, for example, a rectangular parallelepiped shape without a lid as illustrated in FIG. 1 or a rectangular parallelepiped shape without a lid and a bottom.

<Heater>

The heater 3 is provided between a battery cell 1a in contact with the case 2 among the battery cells 1 and the case 2 and/or between two battery cells adjacent to each other and exerts a pressure sensitive sensor function to detect the pressure distribution between these and also a heater function based on the detection result. The "battery cell in contact with the case 2" is the battery cell 1a of which the surface (main surface) having the largest area comes into contact with the case when the heater is hypothetically omitted in the secondary battery of the disclosure. The heater provided between the "battery cell 1a in contact with the case 2" and the case 2 is denoted by a reference sign "3a" in FIG. 1. "Two battery cells adjacent to each other" are a set of battery cells of which the surfaces (main surfaces) having the largest area come into contact with each other when the heater is hypothetically omitted in the secondary battery of the disclosure. The heater provided between "two battery cells adjacent to each other" is denoted by a reference sign "3b" in FIG. 1. The heater 3 is preferably provided at least "between two battery cells adjacent to each other" from the viewpoint of further improving the detection sensitivity to battery deterioration, particularly high rate deterioration. From the same viewpoint, the heater 3 (3a and 3b) is more preferably provided between all the sets of battery cells adjacent to each other as illustrated in FIG. 1. From the same viewpoint, the heater 3 (3a and 3b) is still more preferably provided between all the battery cells 1a in contact with the case 2 and the case 2 and between all the sets of battery cells adjacent to each other as illustrated in FIG. 1.

The heater 3 (including 3a and 3b) is a heater which additionally serves as a pressure sensitive sensor and, in other words, can be referred to as a "heater with pressure sensitive sensor function" or a "pressure sensitive heater". In other words, the heater 3 exerts not only a heater function but also a pressure sensitive sensor function. Hence, when the heater of the disclosure is used, it is possible to detect the pressure distribution (pressing position and pressing force) by the pressure sensitive sensor function and to selectively and locally heat the region (preferably only the pressing position) including at least the pressing position based on this pressure distribution.

The heater 3 has a sheet shape and is sandwiched in the predetermined disposition described above. For example, in a case where the heater 3 is provided between the battery cell 1a in contact with the case 2 and the case 2, this heater 3 is sandwiched between these while being in surface contact with the battery cell 1a and the case 2. In addition, for example, in a case where the heater 3 is provided between two battery cells adjacent to each other, this heater 3 is sandwiched between these while being in surface contact with these two battery cells. Here, "sandwiching" means being supported in a sandwiched state. In the disclosure, a fixing means such as an adhesive may be used when "sandwiching" the heater 3, but it is preferable that the heater 3 be supported in a state of being simply sandwiched without a fixing means from the viewpoint of further improving the detection sensitivity to battery deterioration, particularly high rate deterioration. "Surface contact" means that the contact between the heater and the case or the battery cell is achieved between the surfaces thereof.

The structure of the heater 3 is not particularly limited as long as the heater can exert the heater function and the pressure sensitive sensor function to detect the pressure distribution (namely, the pressing position and the pressing force). The heater function is usually based on a resistance heating type (a resistance heating method) and heats the battery cell by generating Joule heat. The pressure sensitive sensor function is usually based on a capacitance type (a capacitance method) and detects the pressure distribution based on a change in the capacitance between the first electrode and second electrode to be described later. To detect the pressure distribution means to measure the pressing position and the pressing force. The capacitance type is not particularly limited as long as it can detect the pressure distribution based on a change in an electrostatic capacitance and includes, for example, a direct capacitance type (a direct capacitance method), a RC delay time type (a RC delay time method), and an impedance type (an impedance method) to be described later. When detecting the pressure distribution, the pressing position and the pressing force are the position and the force at which the battery cell presses the heater by the local or overall swelling (volume increase) of the battery cell, respectively. Detailed embodiments of the heater 3 will be described in detail later. The heater 3 includes heaters 30A to 30H according to the first to ninth embodiments to be described later.

<Measurement Unit>

The measurement unit 4 is electrically connected to each heater 3 and measures the pressure distribution of each heater 3. The measurement unit 4 preferably measures the temperature of the heater 3 also by providing a temperature sensor (39 in FIG. 3) inside each heater 3.

The measurement unit 4 usually includes a determination unit (not illustrated) inside or outside thereof, and the determination unit performs the determination of high rate deterioration or electrolytic solution deterioration based on the pressure distribution and temperature measured for each heater 3 and the output power of the battery cell 1 as will be described later. The output of the battery cell 1 can be detected by the output control unit 6. The measurement unit 4 is electrically connected to each heater 3 and the power supply unit 5 to be described later by wire in FIG. 1 and the like but may be electrically connected to them by a wireless communication system. The wireless communication system is not particularly limited, and examples thereof include Bluetooth system (registered trademark) and Wi-Fi system.

<Power Supply Unit>

The power supply unit 5 is electrically connected to the measurement unit 4 and is configured to supply a power to a predetermined heater 3 (for example, the first electrode and/or second electrode to be described later) in a case where it is determined that high rate deterioration has occurred. At this time, the battery cell determined to have undergone high rate deterioration can be identified based on the pressure distribution and the like measured by the measurement unit 4, and the power can be selectively supplied only to a predetermined heater in contact with this battery cell.

In a preferred embodiment, it is possible to identify the battery cell determined to have undergone high rate deterioration and the high rate deterioration site in this battery cell by the pressure distribution and the like measured by the measurement unit 4 and to selectively supply the power to a predetermined first electrode and/or second electrode of a predetermined heater 3 so as to locally and mainly heat the high rate deterioration site.

<Output Control Unit>

The output control unit 6 is electrically connected to the measurement unit 4 and also electrically connected to each battery cell 1 via a battery terminal 11. The output control unit 6 is configured to suppress the output current from each battery cell 1 in a case where it is determined that the electrolytic solution deterioration has occurred. At this time, the battery cell determined to have undergone electrolytic solution deterioration can be identified based on the pressure distribution and the like measured by the measurement unit 4, and only the output current from this battery cell can be selectively suppressed. To suppress the output current means to lower the output from the battery cell. Specifically, for example, the control is performed using a protection circuit. The protection circuit is basically used for the purpose of protecting the battery from overcharge, overdischarge, and overcurrent and monitors the charging voltage using a dedicated IC. In addition, as a simple method for preventing overcurrent, an overcurrent protection element called PTC (element of which the resistance can be changed with temperature rise) is incorporated in some cases. This is achieved by using these protection circuits. In addition, as a safety measure, there are a control method in which the current path is mechanically interrupted using a current interrupt device (CID) by detecting the internal pressure and a method in which the current path is interrupted by a method called separator meltdown that the separator melts when the temperature of the cell rises, the hole which is the ion path of the separator closes, and the current in the cell stops.

The output control unit 6 usually includes an output terminal 61 for electrically connecting the output control unit 6 to the connector unit.

<Control Operation of Secondary Battery (Measurement Unit)>

Figure 2:
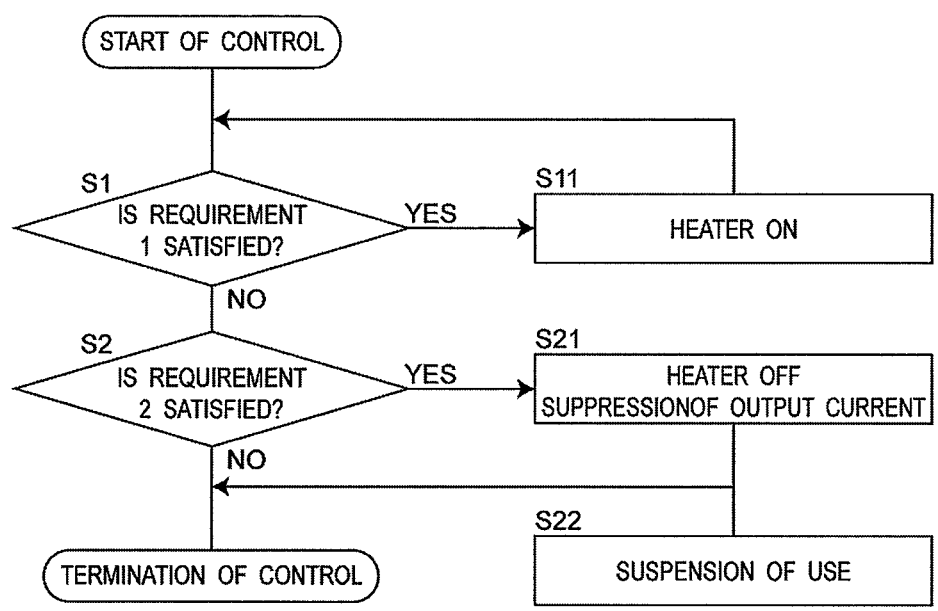
FIG. 2 is an example of a flowchart for explaining the control operation of a measurement unit (particularly determination unit) in the secondary battery according to the disclosure.

The measurement unit 4 (particularly the determination unit) in the secondary battery of the disclosure operates in accordance with the flowchart illustrated in FIG. 2, for example. FIG. 2 is an example of the flowchart for explaining the control operation of the measurement unit in the secondary battery according to the disclosure.

In detail, the determination unit of the measurement unit 4 determines high rate deterioration or electrolytic solution deterioration according to the following criteria (1) and/or (2) based on the temperature and pressure of each heater 3 measured by the measurement unit 4 and the output voltage of each battery cell 1 measured by the output control unit 6 (steps S1 and S2). Incidentally, such determination is continuously or intermittently (discontinuously) performed at the time of charge and discharge of the secondary battery.

(1) It is determined that high rate deterioration has occurred in a case where a requirement 1 is satisfied that the temperature of the heater 3 is a predetermined temperature or less, the pressure of the heater 3 is a predetermined pressure or more, and the output voltage of the battery cells 1 is a predetermined level or less; and/or (2) it is determined that electrolytic solution deterioration has occurred in a case where a requirement 2 is satisfied that the temperature of the heater 3 is a predetermined temperature or more, the pressure of the heater 3 is a predetermined pressure or more, and the output current of the battery cells 1 is a predetermined level or more.

In more detail, the determination on high rate deterioration associated with the case of (1) above is first performed.

In the case of (1) above, the temperature and pressure of the heater 3 used for the determination are the temperature and pressure of the heater in contact with the battery cell (particularly the main surface thereof) to be the target of this determination and are the temperature and pressure of the same heater. The temperature and pressure of the heater 3 may be usually measured for each heater. The output voltage of the battery cell 1 is the output voltage of the battery cell to be the target of this determination. The output voltage of the battery cell 1 may be usually measured for each battery cell. Moreover, the temperature and pressure of the heater 3 and the output voltage of the battery cell 1 used for the determination are not particularly limited, but may be usually the values measured at the same clock time.

In the case of (1) above, the temperature of the heater 3 may be the temperature at the substantially central portion of the heater 3 and can be measured by a temperature sensor. The "predetermined temperature" (reference temperature) of the heater temperature is usually a temperature lower than the "predetermined temperature" (reference temperature) of the heater temperature in the case of (2) above and may be, for example, 20° C. or less, particularly −50° C. to 20° C.

In the case of (1) above, the pressure of the heater 3 may be an average value (for example, an average value at arbitrary ten places) in the pressure distribution by the heater 3. The "predetermined pressure" (reference pressure) of the heater pressure may be decided according to the standard of the secondary battery and may be, for example, $1.05 \times P$ $(N/m^2)$ or more, particularly $1.1 \times P$ to $2.0 \times P$ $(N/m^2)$ with respect to the initial pressure P $(N/m^2)$. The initial pressure P may be an average value of heater pressures at arbitrary ten places measured in the fully charged state of the secondary battery immediately after manufacture (immediately after shipment).

In the case of (1) above, the "imbalance level of the pressure distribution of the heater 3" may be adopted instead of the "pressure of the heater 3" as one of the determination requirements for high rate deterioration. In detail, as one of the determination requirements for high rate deterioration, the fact that the "maximum pressure of the heater 3 is equal to or more than a predetermined pressure" may be adopted instead of the fact that the "pressure of the heater 3 is equal to or more than a predetermined pressure". Specifically, the maximum pressure of the heater 3 may be the maximum value in the pressure distribution by the heater 3. The "predetermined pressure" (reference pressure) of the maximum pressure of the heater may be decided according to the standard of the secondary battery and may be, for example, $1.05 \times P$ $(N/m^2)$ or more, particularly $1.1 \times P$ to $2.0 \times P$ $(N/m^2)$ with respect to the initial pressure P $(N/m^2)$. The initial pressure P may be an average value of heater pressures at arbitrary 10 places measured immediately after discharge from the fully charged state of the secondary battery immediately after manufacture (immediately after shipment).

In the case of (1) above, the output voltage of the battery cell 1 may be a voltage to be output at the time of discharge. The "predetermined level" (reference level) of the output voltage of the battery cell may be decided according to the standard of the secondary battery and may be, for example, $0.5 \times E$ (V) or less, particularly $0.1 \times E$ to $0.5 \times E$ (V) with respect to the initial voltage E (V). The initial voltage E may be the maximum output voltage measured immediately after discharge from the fully charged state of the secondary battery immediately after manufacture (immediately after shipment).

In such a case of (1), when it is determined that high rate deterioration has occurred, the power is supplied from the power supply unit 5 to the heater 3 so that a current flows and the battery cell is heated (heater ON; step S11). As a result, the swelling of the battery cell caused by high rate deterioration is diminished, high rate deterioration can be more sufficiently suppressed, and thus the activation of battery cells is efficiently achieved. The power supply unit 5 usually supplies the power to the later-described first electrode and/or second electrode of the heater 3.

At this time, the battery cell determined to have undergone high rate deterioration is identified based on the pressure distribution and the like measured by the measurement unit 4. By supplying the power only to the predetermined heater in contact with the battery cell identified, only the predetermined battery cell can be selectively heated without heating the entire secondary battery, and thus the heating efficiency is more sufficiently excellent. Hence, the activation of battery cells is more efficiently achieved, and as a result, the output voltage of battery cells can be more sufficiently increased. Moreover, the site at which high rate deterioration is not required to be suppressed is hardly heated and thus hardly becomes a cause of a new failure. As a result, the activation of battery cells is achieved and the output voltage of battery cells can be increased.

Preferred aspects are as follows. The battery cell determined to have undergone high rate deterioration and the high rate deterioration site in this battery cell are identified based on the pressure distribution and the like measured by the measurement unit 4. It is possible to supply the power to a predetermined first electrode and/or second electrode of a predetermined heater 3 so as to locally and mainly heat the high rate deterioration site identified. Hence, the heating efficiency is far more sufficiently excellent. Moreover, the site at which high rate deterioration is not required to be suppressed is far less likely to be heated and thus hardly becomes of a cause of new failure. As a result, the activation of battery cells is achieved and the output voltage of battery cells can be far more effectively increased.

In the case of (1) above (case of satisfying requirement 1), after the power is supplied from the power supply unit 5 to the heater 3 for a predetermined time, the measurement of the temperature and pressure (or the maximum pressure) of the heater 3 and the output voltage of the battery cell 1 and the determination (determination as to whether requirement 1 is satisfied) of high rate deterioration based on the measurement values of these are repeated until the requirement 1 is not satisfied.

If the requirement 1 is not satisfied any longer or the requirement 1 is not satisfied from the beginning, the determination on electrolytic solution deterioration associated with the case of (2) above is subsequently performed.

In the case of (2) above, the temperature and pressure of the heater 3 used for the determination are the temperature and pressure of the heater in contact with the battery cell (particularly the main surface thereof) to be the target of this determination and are the temperature and pressure of the same heater. The temperature and pressure of the heater 3 may be usually measured for each heater. The output current of the battery cell 1 is the output current of the battery cell to be the target of this determination. The output current of the battery cell 1 may be usually measured for each battery cell. Moreover, the temperature and pressure of the heater 3 and the output current of the battery cell 1 which are used for the determination are not particularly limited, but may be usually the values measured at the same clock time.

In the case of (2) above, the temperature of the heater 3 may be the temperature at the substantially central portion of the heater 3 and can be measured by a temperature sensor. The "predetermined temperature" (reference temperature) of the heater temperature in the case of (2) above is usually a temperature higher than the "predetermined temperature" (reference temperature) of the heater temperature in the case of (1) above and may be, for example, 20° C. or more, particularly 20° C. to 150° C.

In the case of (2) above, the pressure of the heater 3 may be an average value (for example, an average value at arbitrary ten places) in the pressure distribution by the heater 3. The "predetermined pressure" (reference pressure) of the heater pressure in the case of (2) above is usually higher than the "predetermined pressure" (reference pressure) of the heater pressure in the case of (1) above. The "predetermined pressure" (reference pressure) of the heater pressure in the case of (2) above may be decided according to the standard of the secondary battery and may be, for example, 2.0×P (N/m$^2$) or more, particularly 2.0×P to 5.0×P (N/m$^2$) with respect to the initial pressure P (N/m$^2$). The initial pressure P may be an average value of heater pressures at arbitrary 10 places measured immediately after discharge from the fully charged state of the secondary battery immediately after manufacture (immediately after shipment).

In the case of (2) above, the "imbalance level of the pressure distribution of the heater 3" may be adopted instead of the "pressure of the heater 3" as one of the determination requirements for battery deterioration. In detail, as one of the determination requirements for battery deterioration, the fact that the "maximum pressure of the heater 3 is equal to or more than a predetermined pressure" may be adopted instead of the fact that the "pressure of the heater 3 is equal to or more than a predetermined pressure". Specifically, the maximum pressure of the heater 3 may be the maximum value in the pressure distribution by the heater 3. The "predetermined pressure" (reference pressure) of the maximum pressure of the heater in the case of (2) above is usually higher than the "predetermined pressure" (reference pressure) of the maximum pressure of the heater in the case of (1) above. The "predetermined pressure" (reference pressure) of the maximum pressure of the heater in the case of (2) above may be decided according to the standard of the secondary battery and may be, for example, 2.0×P (N/m$^2$) or more, particularly 2.0×P to 5.0×P (N/m$^2$) with respect to the initial pressure P (N/m$^2$). The initial pressure P may be an average value of heater pressures at arbitrary 10 places measured immediately after discharge from the fully charged state of the secondary battery immediately after manufacture (immediately after shipment).

In the case of (2) above, the output current of the battery cell 1 may be a current to be output at the time of discharge. The "predetermined level" (reference level) of the output current of the battery cell may be decided according to the standard of the secondary battery and may be, for example, 0.5×I (A) or less, particularly 0.1×I to 0.5×I (A) with respect to the initial current I (A). The initial current I may be the maximum output current measured immediately after discharge from the fully charged state of the secondary battery immediately after manufacture (immediately after shipment).

In such a case of (2), when it is determined that battery deterioration has occurred, the output control unit 6 suppresses the output current from the battery cell 1 while the power supply from the power supply unit 5 to the heater 3 is stopped (heater OFF+ suppression of output current; step S21). Thereafter, the use of the secondary battery can be sufficiently and safely suspended (step S22). The specific method for suppressing the output current is as described above.

At this time, the battery cell determined to have undergone electrolytic solution deterioration is identified based on the pressure distribution and the like measured by the measurement unit 4, and only the output current from this battery cell identified is selectively suppressed, whereby the secondary battery can be safely and continuously used (termination of control in FIG. 2). It is possible to selectively suppress only the output current from the battery cell identified without suppressing the output current from all the battery cells and thus to continuously use the secondary battery while minimizing a decrease in the output current of the entire secondary battery. As a result, it is possible to safely extend the lifetime of the secondary battery.

The determination on high rate deterioration associated with the case of (1) above and the determination on electrolytic solution deterioration associated with the case of (2) above are preferably performed successively in this order as described above but may be performed successively in the reverse order or the determination on either of these may be performed independently.

Embodiments of Heater

Embodiments of the heater are described in the following first to ninth embodiments.

First Embodiment

A heater 30A according to a first embodiment is a heater in which a direct capacitance type is adopted in the pressure sensitive sensor function. The direct capacitance type is a method in which the electrostatic capacitance between the first electrode and the second electrode and the change thereof are measured and the pressing force is directly attained from the measured values. The pressing position is the position at which the capacitance has changed.

Figure 3:
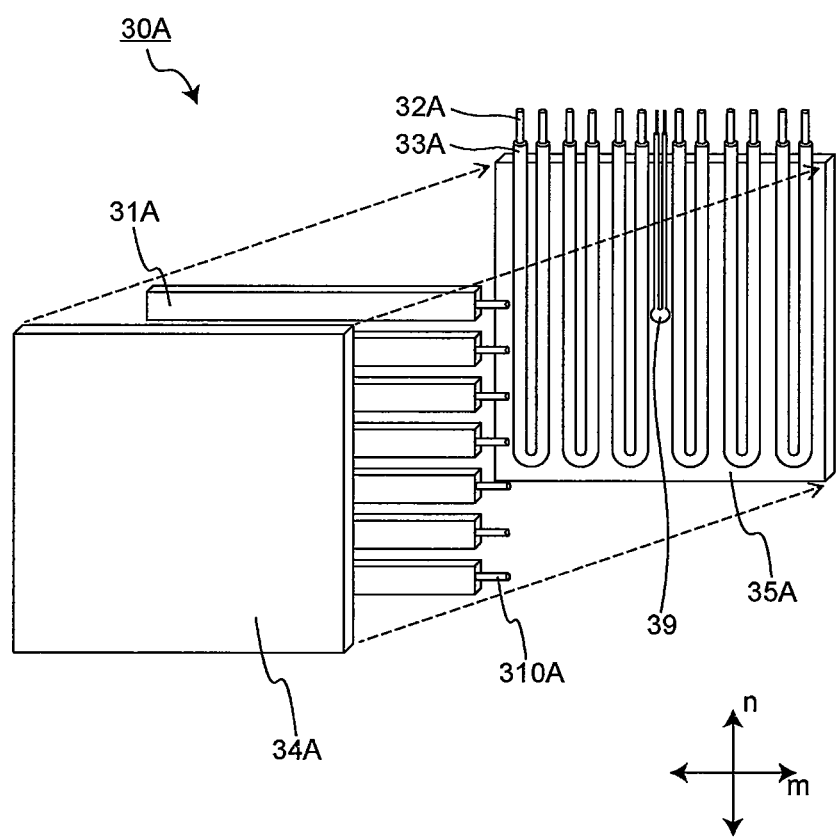
FIG. 3 is an exploded schematic diagram of a heater according to a first embodiment.
Figure 4A:
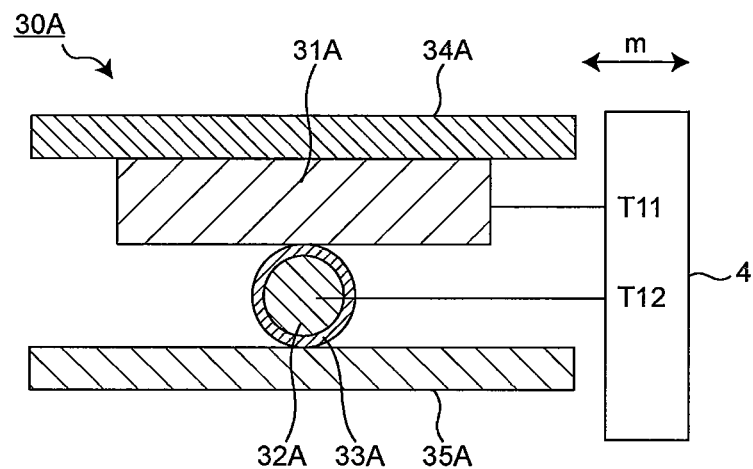
FIG. 4A is a partially enlarged sectional view schematically illustrating a configuration of the heater according to a first embodiment.
Figure 4B:
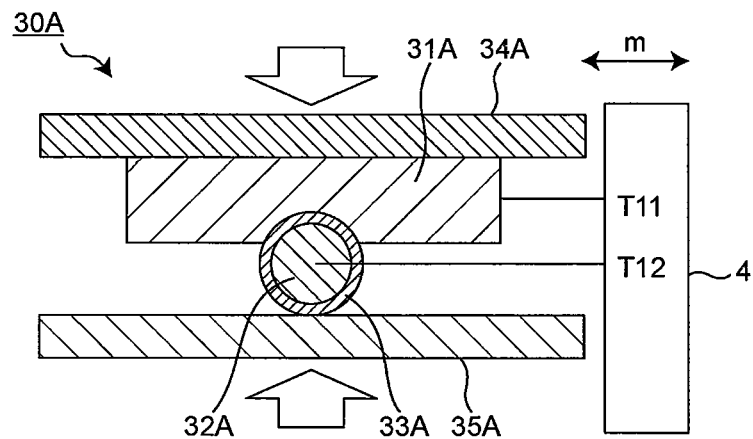
FIG. 4B is a partially enlarged sectional view schematically illustrating the configuration of the heater when a pressing force is applied to the heater according to the first embodiment.

The heater 30A according to the first embodiment includes
a plurality of first electrodes 31A which extend in a first direction m and exhibit elasticity,
a plurality of second electrodes 32A extending in a second direction n intersecting the first direction m, and
a plurality of dielectrics 33A provided on surfaces of the plurality of second electrodes
as illustrated in FIGS. 3, 4A, and 4B. FIG. 3 is an exploded schematic diagram of the heater according to the first embodiment. FIG. 4A is a partially enlarged sectional view schematically illustrating the configuration of the heater according to the first embodiment. FIG. 4B is a partially enlarged sectional view schematically illustrating the configuration of the heater when a pressing force is applied to the heater according to the first embodiment.

The heater 30A includes the measurement unit 4 in FIGS. 4A and 4B, but it is preferable that the heater 30A further include the power supply unit 5 and/or output control unit 6 described above. The heater 30A is usually fabricated by disposing the first electrodes 31A, the second electrodes 32A, and the dielectrics 33A between two protective sheets 34A and 35A.

Figure 5:
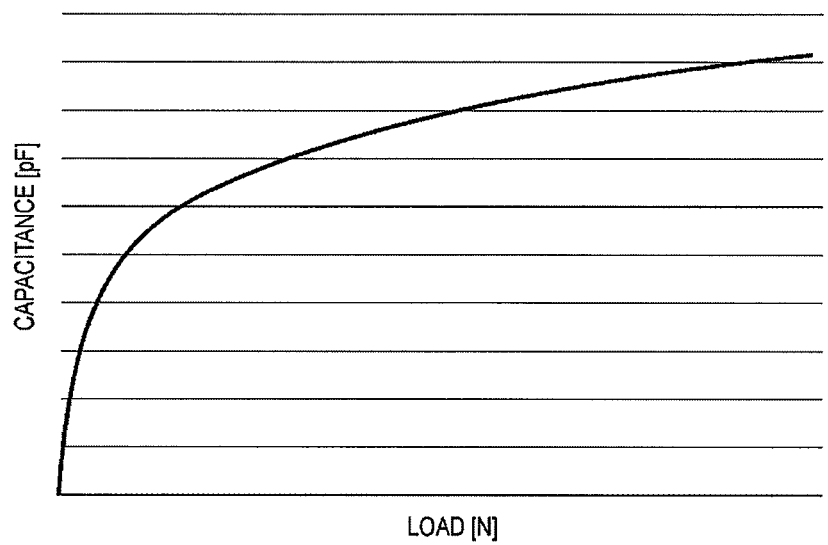
FIG. 5 is an example of a graph illustrating a schematic relation between capacitance C [pF] and pressing force F [N] (load) in heaters according to the first embodiment and a third embodiment and a pressure sensitive device according to a tenth embodiment.

In the heater of the first embodiment, the pressure sensitive sensor function is exerted as follows. As illustrated in FIG. 4B, when the pressing force is applied to the heater 30A, the area (hereinafter, simply referred to as the "area of contact region" in some cases) of the contact region between the first electrode 31A and the dielectric 33A expands based on the elasticity of the first electrode 31A. As a result, the capacitance C [pF] between the first electrode 31A and the second electrode 32A changes. The capacitance C [pF] and the pressing force F [N] applied to the heater are each expressed by the following formulas and, as a result, the pressing force is detected by the measurement unit. FIG. 5 illustrates a graph indicating the schematic relation between the capacitance C [pF] and the pressing force F [N] (load). In the first embodiment, the pressing force is detected based on the change in the area of the contact region as described above, the change in this area relatively more greatly ($C \propto S$, $C \propto 1/d$) contributes to the capacity change than the change in the distance between electrodes in the conventional pressure sensitive sensor, and the measurement range of pressing force is relatively wide. In particular, in a case where the pressing force is low, the change in the capacitance based on the change in the distance between electrodes is significantly small.

$$C = \frac{\varepsilon S}{d} \quad \text{[Formula 1]}$$

$$F = E \cdot eS \quad \text{[Formula 2]}$$

[Where, $\varepsilon$ [pF/m] is the dielectric constant of the dielectric, S [m$^2$] is the contact area between the first electrode and the dielectric, d [m] is the thickness of the dielectric, E [Pa] is the Young's modulus of the first electrode, and e is the strain of the first electrode.]

The pressing force may be applied to the heater 30A of the first embodiment from either electrode side of the first electrode 31A or the second electrode 32A, and thus the use direction (front and back direction) of the heater at the time of use is not particularly limited. This is because even when the pressing force is applied from the first electrode 31A side, a force acts from the protective sheet 35A side as well by the reaction of the pressing force as illustrated in FIG. 4B.

The first electrode 31A exhibits elastic property and conductive property and functions as a so-called electrode. The elastic property is a property that an object is locally deformed by an external force (normal pressing force applied to the heater: for example, pressing force of about 0.1 to 400 N/cm$^2$) but returns to the original shape when the force is removed. Specifically, the first electrode 31A is only required to exhibit elastic property so that the area of the contact region between the first electrode 31A and the dielectric 33A is expanded by the pressing force applied to the heater. In detail, the first electrode 31A may have a lower elastic modulus than the dielectric 33A so as to be deformed more than the dielectric 33A when being pressed. The elastic modulus of the first electrode 31A is preferably, for example, about $10^4$ Pa to $10^8$ Pa from the viewpoint of further improving the detection sensitivity to battery deterioration, particularly high rate deterioration, and for example, one example thereof is about $10^6$ Pa. The measurement range of the pressing force is wider as the elastic modulus of the first electrode 31A is greater in the above range. The pressure sensitivity is more favorable as the elastic modulus of the first electrode 31A is smaller in the above range. When the pressure sensitivity is improved, for example, even significantly low pressing force which has been hardly detected in the past can be detected. Along with this, it is possible to accurately detect the start of pressing force application.

The resistivity of the first electrode 31A is not particularly limited as long as the first electrode 31A exhibits conductive property as an electrode, is usually higher than the resistivity of the second electrode 32A to be described later, and is, for example, $1 \times 10^{-7}$ Ωm or more, particularly $1 \times 10^{-7}$ to $1 \times 10^2$ Ωm. The resistivity can be adjusted by changing the relative proportions between the conductive filler and resin materials (for example, a rubber material) to be described later.

The first electrode 31A corresponds to an elastic electrode member and can also be called a stretchable member. The first electrode 31A may be formed of any material as long as it exhibits both properties of the elastic property and the conductive property as described above. For example, the first electrode 31A may be formed of a conductive resin containing a resin material (particularly a rubber material) and a conductive filler dispersed in the resin material. The preferred first electrode 31A is formed of a conductive rubber containing a rubber material and a conductive filler dispersed in the rubber material from the viewpoint of further improving the detection sensitivity to battery deterioration, particularly high rate deterioration. As the first electrode 31A is formed of the conductive rubber, the pressing force can be effectively detected and, for example, even significantly low pressing force can be accurately detected. The resin material may be, for example, at least one resin material selected from the group consisting of styrene-based resin, silicone-based resin (for example, polydimethylpolysiloxane (PDMS)), acrylic-based resin, rotaxane-based resin, urethane-based resin, and a rubber material. The rubber material may be, for example, at least one rubber material selected from the group consisting of silicone rubber, isoprene rubber, butadiene rubber, styrene-butadiene rubber, chloroprene rubber, nitrile rubber, polyisobutylene, ethylene propylene rubber, chlorosulfonated polyethylene, acrylic rubber, fluororubber, epichlorohydrin rubber, and urethane rubber. The conductive filler may be formed to contain at least one material selected from the group consisting of Au (gold), Ag (silver), Cu (copper), C (carbon), ZnO (zinc oxide), $In_2O_3$ (indium (III) oxide), and $SnO_2$ (tin(IV) oxide). In addition, a conductive layer may be used instead of or in addition to the conductive filler. Specifically, the first electrode 31A may be a first electrode formed by providing a conductive layer on the surface of the resin structure (particularly rubber structure material) containing the above-described resin material (particularly rubber material) by application of conductive ink or the like.

The thickness of the first electrode 31A is not particularly limited as long as the capacitance between the first electrode 31A and the second electrode 32A is changed by the pressing force from the outside and is usually 100 μm to 10 cm, preferably 500 μm to 1 cm, and for example, one example thereof is more preferably 1 mm.

Figure 6:
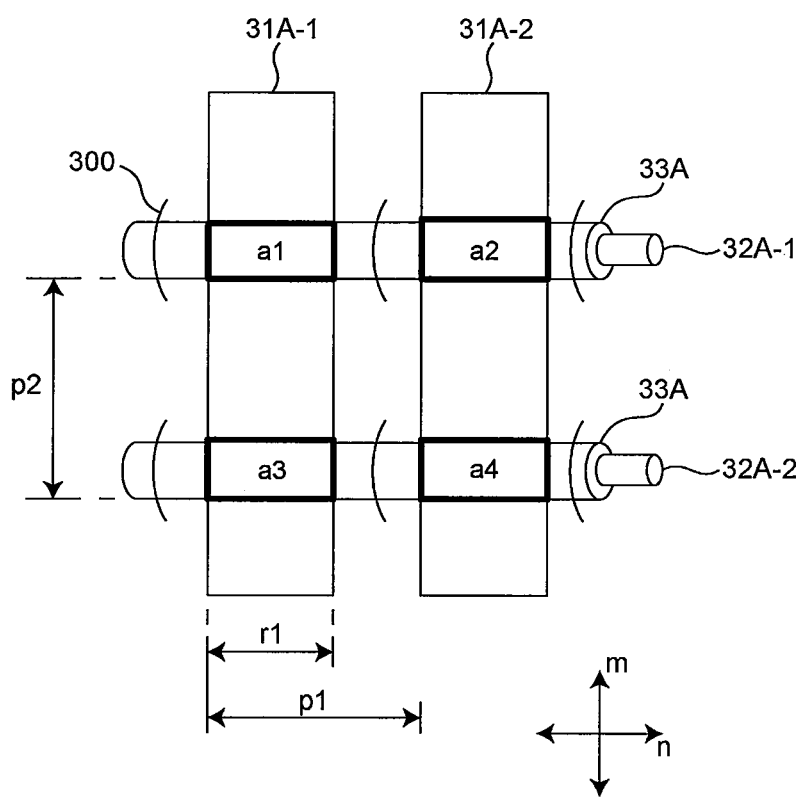
FIG. 6 is an example of a schematic plan view of a first electrode and a second electrode of heaters according to the first embodiment and the third embodiment and the pressure sensitive device according to the tenth embodiment as seen through in a thickness direction thereof.

The first electrode 31A has an elongated shape (for example, a linear shape) (FIG. 3 and the like). The first electrode 31A and the second electrode 32A have an elongated shape, and thus the heater 30A constitutes a matrix structure as illustrated in FIG. 6. In other words, the heater 30A can cause the individual parts at which the plurality of first electrodes 31A extending in the first direction m and the plurality of second electrodes 32A extending in the second direction n overlap each other in planar view to function as a sensor unit (namely, sensing element/sensing unit). The angle (the smaller angle) formed by the first direction m and the second direction n is not particularly limited as long as these directions intersect each other in planar view and is usually 30° to 90°, preferably 90°. The planar view means a plan view as viewed from the thickness direction of the heater. FIG. 6 is an example of a schematic plan view of the first electrode and second electrode of the heater according to the first embodiment as seen through in the thickness direction of the heater.

When a plurality of members having an elongated shape are used as the first electrodes 31A, the distance (pitch) p1 (FIG. 6) between these adjacent members having an elongated shape is usually 1 to 30 mm, is preferably 2 mm to 10 mm from the viewpoint of further improving the detection sensitivity to battery deterioration, particularly high rate deterioration, and for example, one example thereof is more preferably 5 mm. A width r1 (FIG. 6) of the first electrode 31A is usually 1 to 20 mm, is preferably 2 mm to 10 mm from the viewpoint of further improving the detection sensitivity to battery deterioration, particularly high rate deterioration, and for example, one example thereof is more preferably 5 mm.

The first electrode 31A is preferably connected to the ground (0 V) of the measurement unit from the viewpoint of noise prevention at the time of measurement of the pressing force.

The first electrode 31A can be obtained by the following method. For example, a composite material is first obtained by containing a conductive filler in a desired resin material (rubber material) solution or raw material solution. Subsequently, the composite material is applied onto a substrate for peeling, dried, and cured (crosslinked) if desired, and then peeled off from the substrate for peeling to obtain a first electrode.

The first electrode 31A can also be obtained by another following method. For example, a desired resin material (rubber material) solution or raw material solution is first applied onto a substrate for peeling, dried, and cured (crosslinked) if desired. Subsequently, ink containing a conductive filler is applied to the surface of the resin layer (for example, a rubber layer) obtained to form a conductive layer, and the layers are then peeled off from the substrate for peeling to obtain a first electrode.

The second electrode 32A is disposed close to the first electrode 31A. In other words, the second electrode 32A is disposed so as to indirectly come into contact with the first electrode 31A via the dielectric 33A. The second electrode 32A may be disposed so as to indirectly come into contact with the first electrode 31A via the dielectric 33A and the air layer.

The second electrode 32A exhibits at least conductive property and functions as a so-called electrode. It is preferable that the heater of the first embodiment exert a heater function by applying a direct voltage (a direct-current voltage) or an alternating voltage (an alternating-current voltage) only to the second electrode 32A. From this point of view, it is preferable that the second electrode 32A have an appropriately great resistivity enough to effectively generate Joule heat while exhibiting conductive property as an electrode. The resistivity of the second electrode 32A is, for example, $1 \times 10^{-9}$ to $1 \times 10^{-5}$ Ωm, preferably $1 \times 10^{4}$ to $5 \times 10^{-6}$ Ωm.

The second electrode 32A usually exhibits flexibility but may exhibit elastic property. The flexibility is a property that an object is flexed and deformed as a whole by an external force (normal pressing force applied to the heater: for example, pressing force of about 0.1 to 400 $N/cm^2$) but returns to the original shape when the force is removed. In a case where the second electrode 32A exhibits flexibility, the second electrode 32A has an elastic modulus of, for example, more than about $10^8$ Pa, particularly more than $10^8$ Pa and $10^{12}$ Pa or less, and, for example, one example of the elastic modulus is about $1.2 \times 10^{11}$ Pa.

The second electrode 32A may be formed of any material as long as it exhibits at least conductive property. In a case where the second electrode 32A exhibits flexibility, the second electrode 32A may be formed of, for example, a metal body, may be formed of a glass body and a conductive layer formed on the surface thereof and/or a conductive filler dispersed therein, or may be formed of a resin body and a conductive layer formed on the surface thereof and/or a conductive filler dispersed in the resin body. The metal body is an electrode member formed of a metal, that is, the second electrode 32A may be substantially formed of a metal. The metal body is formed to contain at least one metal selected from the group consisting of Au (gold), Ag (silver), Cu (copper), Ni—Cr alloy (nichrome), C (carbon), ZnO (zinc oxide), $In_2O_3$ (indium(III) oxide), and $SnO_2$ (tin(IV) oxide). The glass body is not particularly limited as long as it has a network structure of silicon oxide and may be formed to contain, for example, at least one glass material selected from the group consisting of quartz glass, soda-lime glass, borosilicate glass, and lead glass. The resin body may be formed to contain at least one resin material selected from the group consisting of styrene-based resin, silicone-based resin (for example, polydimethylpolysiloxane (PDMS)), acrylic-based resin, rotaxane-based resin, and urethane-based resin. The conductive layers formed on the glass body and resin body may be layers formed by depositing at least one metal selected from the group of metals similar to the metals which can constitute the metal body or may be layers formed by applying conductive ink or the like. The conductive filler dispersed in the glass body and resin body may be formed to contain at least one metal selected from the group of metals similar to the metals which can constitute the metal body. The second electrode 32A is preferably formed of a metal body, particularly nichrome or copper from the viewpoint of further improving the detection sensitivity to battery deterioration, particularly high rate deterioration.

Figure 7:
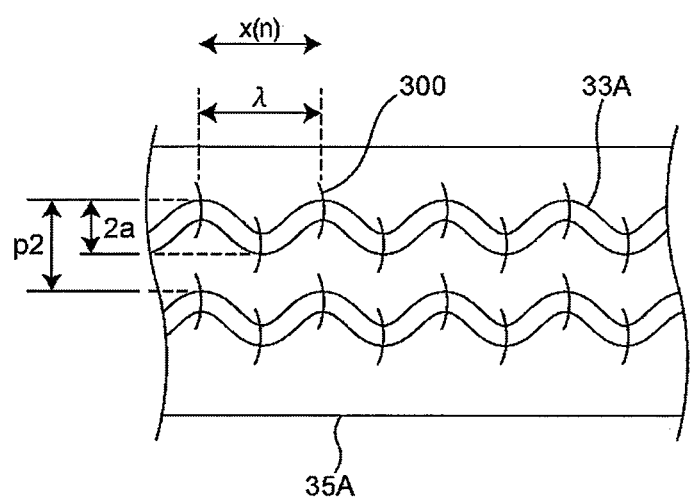
FIG. 7 is a diagram schematically illustrating an example of a planar view shape of the second electrode in the heater according to the first embodiment and the pressure sensitive device according to the tenth embodiment and an example of a restraint member for restricting position deviation of the second electrode, and is a sketch of a protective sheet 35A and the second electrode as viewed from the first electrode side.

The second electrode 32A is usually an elongated member having an elongated shape (for example, a linear shape). When the second electrode 32A is an elongated member and is formed of a metal body, the second electrode 32A preferably corresponds to a metal line or a metal wire (for example, copper wire) from the viewpoint of further improving the detection sensitivity to battery deterioration, particularly high rate deterioration. The elongated member as the second electrode 32A is preferably disposed in a linear shape from the viewpoint of improving the sandwiching property of the heater between flat surfaces. The elongated member as the second electrode 32A may be disposed without applying a tension to the elongated member from the viewpoint of improving the mountability of the heater on a curved surface. At this time, for example, the elongated member may be disposed in a wavy shape along the constant main direction x (second direction n) as illustrated in FIG. 7. FIG. 7 is a diagram schematically illustrating an example of a planar view shape (for example, an elongated shape and a wavy shape) of the second electrode in an example of the heater according to the first embodiment and is a sketch of a protective sheet 35A to be described later and the second electrode 32A as viewed from the second electrode side. The planar view shape means the shape as viewed from upper surface and also includes, for example, a see-through shape when the heater of FIG. 4A is viewed from a direction (for example, upward direction in FIG. 4A) perpendicular to the sheet shape of this heater.

The second electrodes 32A each have a U-shape on the protective sheet 35A, for example, as illustrated in FIGS. 3 and 9, but are not particularly limited as long as they intersect the first electrodes 31A in planar view, and may have an I-shape or a curved line such as an S-shape.

The sectional shape of the second electrode 32A is not particularly limited as long as the area of the contact region is expanded by the application of a pressing force and may be a circular shape for example, as illustrated in FIG. 4A or may be an elliptical shape, a triangular shape or the like.

The sectional dimension of the second electrode 32A is not particularly limited as long as the capacitance between the second electrode 32A and the first electrode 31A can be measured, is usually 1 μm to 10 mm, is preferably 100 μm to 1 mm from the viewpoint of further improving the detection sensitivity to battery deterioration, particularly high rate deterioration, and for example, one example thereof is more preferably 300 μm. When the sectional dimension of the second electrode 32A is decreased, the change in the area of the contact region increases and the pressure sensitivity is improved. When the sectional dimension of the elongated member is increased, the measurement range of pressing force becomes wider. The sectional dimension of the second electrode 32A is the maximum dimension in the sectional shape. In detail, the sectional dimension of the second electrode 32A is the diameter in a section perpendicular to the elongated direction when the second electrode 32A has a circular section.

A plurality of second electrodes 32A are usually used. At this time, patterning is possible by detecting the capacity change between each of the plurality of second electrodes 32A and each of the first electrodes 31A by the measurement unit. Patterning is to detect the pressing position as well as the pressing force.

When a plurality of elongated members are used as the second electrode 32A, the distance (pitch) p2 (FIGS. 6 and 7) between the adjacent elongated members is usually 1 to 30 mm, is preferably 2 mm to 10 mm from the viewpoint of further improving the detection sensitivity to battery deterioration, particularly high rate deterioration, and for example, one example thereof is more preferably 5 mm. When a plurality of elongate members are disposed in a wavy shape and used as the second electrodes 32A, a wavelength λ of the wavy shape (FIG. 7) is usually 1 to 40 mm, is preferably 2 mm to 20 mm from the viewpoint of further improving the detection sensitivity to battery deterioration, particularly high rate deterioration, and for example, one example thereof is more preferably 10 mm. In addition, an amplitude a of the wavy shape (FIG. 7) is usually 1 to 20 mm, is preferably 2 mm to 10 mm from the viewpoint of further improving the detection sensitivity to battery deterioration, particularly high rate deterioration, and for example, one example thereof is more preferably 5 mm.

The dielectric 33A completely covers the entire surface of the second electrode 32A in FIG. 4A, but the covering region of the dielectric 33A is not particularly limited as long as the dielectric 33A at least partially covers the surface of the second electrode 32A. The fact that the dielectric 33A at least partially covers the surface of the second electrode 32A refers to a state in which the dielectric 33A covers at least the part between the first electrode 31A and the second electrode 32A on the surface of the second electrode 32A. In other words, the dielectric 33A is only required to cover at least a part of the surface of the second electrode 32A as long as it exists between the first electrode 31A and the second electrode 32A. The fact that the dielectric 33A "covers" means that the dielectric 33A is integrated while being closely attached in a film form to the surface of the second electrode 32A.

The dielectric 33A preferably completely covers the entire surface of the second electrode 32A from the viewpoint of further simplification of the heater structure. The dielectric 33A preferably completely covers the entire surface of the second electrode 32A from the viewpoint of further simplification of the heater structure and easiness of procurement of heater materials. In a case where the dielectric 33A completely covers the entire surface of the second electrode 32A, the dielectric 33A constitutes an insulating film of the second electrode 32A and the dielectric 33A and the second electrode 32A are usually integrated. The dielectric 33A and second electrode 32A integrated may correspond to an insulation-coated metal wire or may be, for example, an enamel wire or an element wire. When an insulation-coated metal wire is used, the heater can be configured simply by disposing the insulation-coated metal wire between the first electrode 31A and the protective sheet 35A without performing a photolithography process such as etching, thus simplification of the heater structure can be far more sufficiently achieved, and further the manufacturing cost is low.

The dielectric 33A may be formed of any material as long as it exhibits at least the properties as a "dielectric". For example, the dielectric 33A may be formed to contain a resin material, a ceramic material, and/or a metal oxide material. By way of example only, the dielectric 33A may be formed of at least one resin material selected from the group consisting of polypropylene resin, polyester resin (for example, polyethylene terephthalate resin), polyimide resin, polyphenylene sulfide resin, polyvinyl formal resin, polyurethane resin, polyamideimide resin, polyamide resin, fluororesin and the like or may be formed of at least one metal oxide material selected from the group consisting of $Al_2O_3$, $Ta_2O_5$ and the like. The dielectric 33A is usually formed of a material having a resistance value higher than the impedance of the capacity in a desired frequency band.

The dielectric 33A usually exhibits rigid property. The rigid property is a property that an object resists deformation by an external force (normal pressing force applied to the heater: for example, pressing force of about 0.1 to 400 $N/cm^2$). The dielectric 33A is usually not deformed by normal pressing force as described above. The dielectric 33A may have a higher elastic modulus than the first electrode 31A so as to be less likely to be deformed than the first electrode 31A when a pressing force is applied to the heater. For example, in a case where the elastic modulus of the first electrode 31A is about $10^4$ Pa to $10^8$ Pa, the dielectric 33A may have a higher elastic modulus than this.

The thickness of the dielectric 33A is not particularly limited as long as the capacitance between the first electrode 31A and the second electrode 32A is changed by the pressing force from the outside, is usually 20 nm to 2 mm, preferably 20 nm to 1 mm from the viewpoint of further improving the detection sensitivity to battery deterioration, particularly high rate deterioration, and for example, one example thereof is more preferably 10 μm.

In a case where the dielectric 33A is formed of a resin material, the dielectric 33A can be formed by a coating method in which a resin material solution is applied and dried, and by an electrodeposition method in which electrodeposition is performed in a resin material solution.

In a case where the dielectric 33A is formed of a metal oxide material, the dielectric 33A can be formed by an anodic oxidation method and the like.

The heater 30A is usually fabricated by disposing the first electrodes 31A, the second electrodes 32A, and the dielectrics 33A between two protective sheets 34A and 35A. The protective sheets 34A and 35A may be formed of any material as long as they do not hinder the change in the capacitance between the first electrode 31A and the second electrode 32A. The protective sheets 34A and 35A are preferably external force transmissive members exhibiting excellent external force transmissibility from the viewpoint of improving the sandwiching property between the flat surfaces of the heater and further improving the detection sensitivity to battery deterioration, particularly high rate deterioration. The external force transmissibility refers to a property having both flexibility and thinness enough to transmit the external force to the other sheet surface as it is even when the external force (normal pressing force applied to the heater: for example, pressing force of about 0.1 to 400 $N/cm^2$) is applied to one sheet surface. The external force transmissive member may be formed of, for example, resin materials similar to those described in the description of the dielectric 33A and is formed of polyimide resin as one example. The thicknesses of the protective sheets 34A and 35A are each independently usually 2 mm or less, preferably 0.05 to 2 mm, for example 0.125 mm.

The heater 30A may further include a restraint member 300 which limits the position deviation of the second electrode 32A (for example, the dielectric 33A and second electrode 32A integrated) in the heater (FIG. 6 and FIG. 7). The restraint member 300 is not necessarily required to fix the second electrode 32A at a predetermined position in the heater but is only required to have a restraint force enough to hold the second electrode 32A at a predetermined position. As the heater includes a restraint member, the position deviation of the second electrode 32A can be prevented and, as a result, the pressing force at a predetermined position can be reliably detected.

The restraint member 300 restrains the second electrode 32A to the protective sheet 35A in FIGS. 6 and 7 but is only required to restrain the second electrode 32A to at least either of the first electrode 31A or the protective sheet 35A. In other words, the restraint member 300 may restrain the second electrode 32A to either of the first electrode 31A or the protective sheet 35A or to both of these. The fact that the restraint member 300 restrains the second electrode 32A to both of these means that the first electrode 31A, the second electrode 32A, and the protective sheet 35A are integrated in a state in which the second electrode 32A is disposed between the first electrode 31A and the protective sheet 35A.

Specific examples of the restraint member 300 include a threadlike member, a partition, and an adhesive. The restraint member 300 is preferably a threadlike member. When the restraint member 300 is a threadlike member, it is possible to achieve further simplification of the heater structure while preventing the position deviation of the second electrode 32A.

The threadlike member is not particularly limited as long as it is a member which is long, thin, and flexible enough to sew the second electrode 32A on the first electrode 31A and/or the protective sheet 35A as illustrated in FIGS. 6 and 7 and may exhibit either property of conductivity or non-conductivity. The threadlike member is only required to sew the second electrode 32A on at least either of the first electrode 31A or the protective sheet 35A. In other words, the threadlike member may sew the second electrode 32A on either of the first electrode 31A or the protective sheet 35A or on both of these. The fact that the threadlike member sews the second electrode 32A on both of these means that the first electrode 31A, the second electrode 32A, and the protective sheet 35A are integrated by sewing the second electrode 32A in a state in which the second electrode 32A is disposed between the first electrode 31A and the protective sheet 35A.

A specific example of the threadlike member may be, for example, one obtained by stretching a natural or synthetic fiber long and thin and twisting this stretched fiber or may be a fishing line or a metal thread. The threadlike member may sew the second electrode 32A at regular positions, for example, as illustrated in FIGS. 6 and 7 or may sew the second electrode 32A at arbitrary random positions.

Sewing of the second electrode 32A on the first electrode 31A and/or the protective sheet 35A by the threadlike member may be achieved by parallel stitch (running stitch) or may be achieved by machine sewing using a needle thread and a bobbin thread. In a case where the sewing of the second electrode 32A by the threadlike member is achieved by machine sewing, the threadlike member is composed of a needle thread and a bobbin thread, and the needle thread and the bobbin thread are engaged. In a case where the second electrode 32A is sewed on either of the first electrode 31A or the protective sheet 35A, the engaging portion between the needle thread and the bobbin thread is positioned in the first electrode 31A or the protective sheet 35A. In a case where the second electrode 32A is sewed on both of the first electrode 31A and the protective sheet 35A, the engaging portion between the needle thread and the bobbin thread is positioned between the first electrode 31A and the protective sheet 35A.

The partition is a member which stands between the first electrode 31A and the protective sheet 35A in a substantially parallel manner in the thickness direction to partition the space between these and form a compartment. The second electrode 32A is held in a predetermined compartment by the partition. The partition may be formed of, for example, resin materials (particularly a rubber material (namely, an elastomer material)) similar to those described in the description of the first electrode 31A, and one example thereof includes silicone rubber. The partition may be formed in a dot shape or may be continuously formed in a linear shape in a planar view shape. The partition may function as a spacer to be described below.

The heater 30A may further include a spacer between the first electrode 31A and the protective sheet 35A to secure a gap between these. As the heater 30A has the spacer, the first electrode 31A quickly returns to the original shape after the pressing force is removed and the detection speed and response speed of the pressing force are improved. The spacer may be formed in a dot shape or may be continuously formed in a linear shape in a planar view shape. The spacer may be formed of, for example, resin materials (particularly a rubber material (namely, an elastomer material)) similar to those described in the description of the first electrode 31A, and one example thereof includes silicone rubber.

The measurement unit 4 is a circuit which measures the pressure distribution based on the change in the capacitance between the first electrode 31A and the second electrode 32A. The measurement unit 4 is electrically connected to wiring 310A (FIG. 1) drawn from the first electrode 31A and wiring drawn from the second electrode 32A via terminals T11 and T12, respectively. The measurement unit 4 may be a control circuit, an integrated circuit, and the like. The first electrode 31A is preferably connected to the ground of the measurement unit 4 from the viewpoint of stabilizing the pressure distribution detection by decreasing the influence of noise. In other words, it is preferable that the terminal T11 of the measurement unit 4 to which the wiring drawn from the first electrode 31A is electrically connected be further connected to the ground.

A plurality of second electrodes 32A are usually used, and thus the measurement unit 4 has a plurality of terminals to be electrically connected to the wiring drawn from each of the plurality of second electrodes 32A.

Method for Performing Pressure Sensing-Heating by Pressure Sensitive Sensor Function and Heater Function in First Embodiment In the heater 30A of the first embodiment, the pressure distribution is measured by measuring the change in the capacitance between the terminals T11 and T12 based on the change in the area of the contact region without deforming the dielectric 33A. The change in the area of the contact region is relatively greater than, for example, the change in the distance between electrodes in the conventional pressure sensitive sensor, and thus the pressure distribution in a relatively wide range can be measured with a relatively simple structure in the first embodiment.

In more detail, in the heater 30A of the first embodiment, the individual parts at which the plurality of first electrodes 31A extending in the first direction m and the plurality of second electrodes 32A extending in the second direction n overlap each other in planar view are used as the sensor unit (namely, sensing element/sensing unit) (for example, a1 to a4) as described above (FIG. 6). The measurement unit 4 measures the pressure distribution over time by measuring (or sensing) each capacitance (namely, capacitance of each sensor unit) between one of the plurality of first electrodes 31A and one of the plurality of second electrodes 32A. In other words, the capacitance of each sensor unit is measured before application of a pressing force. Thereafter, when the measurement (sensing) is performed after application of the pressing force, the sensor unit in which the capacitance has changed is the pressing position. For example, in the heater of FIG. 6, when there is a change in the capacitance between a first electrode 31A-1 and a second electrode 32A-1 but there is no change in the capacitance between the first electrode 31A-1 and a second electrode 32A-2, the capacitance between a first electrode 31A-2 and the second electrode 32A-1, and the capacitance between the first electrode 31A-2 and the second electrode 32A-2, the pressing position is the sensor unit a1. The pressing force can be detected from the capacitance measured before and after application of pressing force and the relation between the capacitance and the pressing force (load), for example, as illustrated in FIG. 5. The manner of changes in the output value when a load is applied to, for example, each of ten sensor units (elements) in such a heater and simultaneous measurement is performed is illustrated in FIG. 8. From FIG. 8, it is apparent that the sensitivity of the heater of the first embodiment as a pressure sensitive sensor is extremely high.

In the heater function of the heater 30A of the first embodiment, the pressing position detected based on the pressure sensitive distribution in the pressure sensitive sensor function is locally heated. In detail, Joule heat is generated in a predetermined first electrode among the plurality of first electrodes 31A and/or a predetermined second electrode among the plurality of second electrodes 32A by applying a direct-current voltage or an alternating voltage to the predetermined first electrode and/or the predetermined second electrode, the battery cell is locally heated. "Locally" means "not entirely", and it is only required that heating of a part of the region including at least a pressing position P in the battery cell is achieved.

In more detail, for example, in a case where swelling has occurred in the region (pressing position) P of the battery cell 1 and it is desired to heat this region P as illustrated in FIG. 9, a direct-current voltage or an alternating voltage is applied to a first electrode 31A-b or a second electrode 32A-b according to the pressing position. By this, Joule heat is generated in each of the first electrode 31A-b and the second electrode 32A-b and the region including at least the pressing position P in the battery cell can be locally heated. FIG. 9 illustrates the schematic appearance of a battery cell equipped with the heater according to the first embodiment. The heater illustrated in FIG. 9 is similar to the heater of FIG. 3 except that the numbers of the first electrodes 31A and second electrodes 32A are different and the temperature sensor and the protective sheet 34A are omitted. Incidentally, the protective sheet 34A is omitted in FIG. 9.

Moreover, for example, in FIG. 9, when an alternating voltage is applied to (or between) the first electrode 31A-b and the second electrode 32A-b according to the pressing position, Joule heat is generated in the first electrode 31A-b and the second electrode 32A-b and the region including at least the pressing position P in the battery cell can be locally heated.

In the heater of the first embodiment, both the pressure sensitive sensor function and the heater function can be exerted by alternately switching these functions by a time-division method. In the disclosure, the "time-division method" is a method in which processing for the pressure sensitive sensor function and processing for the heater function in one heater are alternately performed with a time shift. In detail, the measurement of pressure distribution (capacitance) as processing for the pressure sensitive sensor function and the voltage application to the first electrode and/or the second electrode as processing for the heater function are alternately performed.

In the first embodiment, the processing time for the pressure sensitive sensor function and the processing time for the heater function are not particularly limited as long as the pressing position can be heated while measuring the pressure distribution (namely, pressing position and pressing force) in the pressure sensitive sensor function. The processing time for the pressure sensitive sensor function may be, for example, 1 μsec to several minutes, particularly 1 millisecond to 1 minute per one time. The processing time for the heater function may be, for example, 1 μsec to several tens of minutes, particularly 1 millisecond to 10 minutes per one time.

Second Embodiment: Highly Pressure Sensitive Heater

Figure 10A:
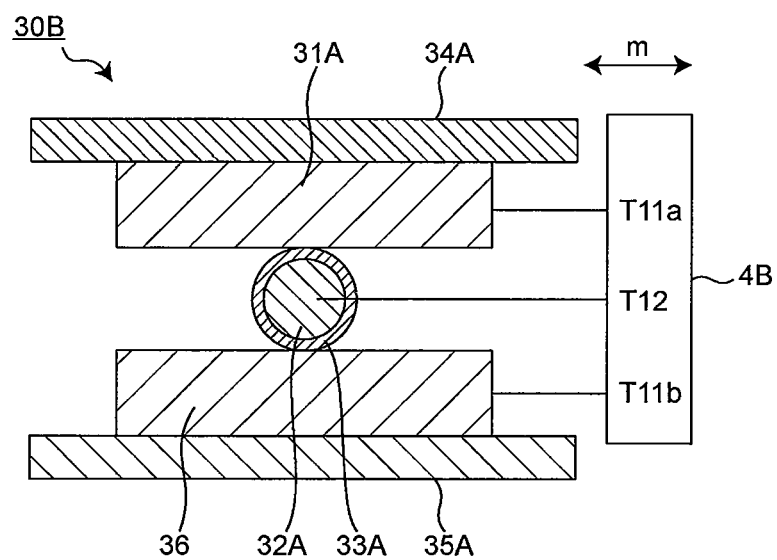
FIG. 10A is a partially enlarged sectional view schematically illustrating a configuration of a heater according to a second embodiment.
Figure 10B:
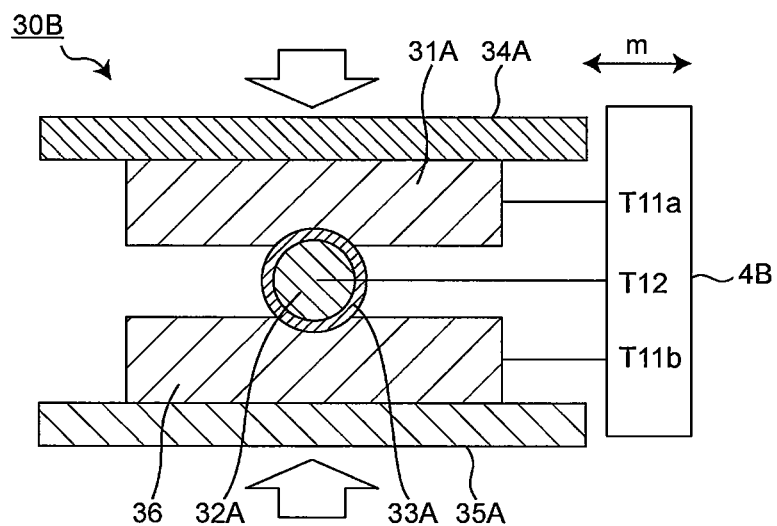
FIG. 10B is a partially enlarged sectional view schematically illustrating the configuration of the heater when a pressing force is applied to the heater according to the second embodiment.

A configuration of a heater 30B of a second embodiment is schematically illustrated in FIGS. 10A and 10B. FIG. 10A is a partially enlarged sectional view schematically illustrating the configuration of the heater according to the second embodiment. FIG. 10B is a partially enlarged sectional view schematically illustrating the configuration of the heater when a pressing force is applied to the heater according to the second embodiment.

The heater 30B is an embodiment having a configuration in which a conductive member 36 is disposed between the dielectric 33A and the protective sheet 35A and is similar to the heater 30A of the first embodiment except the following matters.

(1B-1) In the heater 30B, the conductive member 36 is disposed immediately below the integrated body of the second electrode 32A and the dielectric 33A. The conductive member 36 may be selected from a similar range to that of the first electrode 31A of the heater 30A. In other words, the conductive member 36 may have an elastic modulus and a resistivity in similar ranges to those of the first electrode 31A of the heater 30A. The first electrode 31A and the conductive member 36 are preferably formed of conductive rubber. The conductive member 36 may have an elongated shape similar to the first electrode 31A but preferably has a sheet shape which covers all the overlapping portions at which the plurality of first electrodes 31A and the plurality of second electrodes 32A overlap each other in planar view without being divided. Here, the conductive rubber may be similar to the conductive rubber described as a constituent material of the first electrode 31A in the heater 30A. The thickness of the conductive member 36 is usually 100 μm to 10 cm, preferably 500 μm to 1 cm, and for example, one example thereof is more preferably 1 mm.

(1B-2) The second electrode 32A includes a dielectric 33A which completely covers the entire surface. It is preferable that a plurality of second electrodes 32A be used and each of the plurality of second electrodes 32A include the dielectric 33A which completely covers the entire surface.

A measurement unit 4B is similar to the measurement unit 4 of the first embodiment except the following matters.

(2B-1) The measurement unit 4B is electrically connected to wiring drawn from the first electrode 31A and the conductive member 36 and wiring drawn from the second electrode 32A via terminals T11a, T11b, and T12, respectively. For example, the first electrode 31A and the conductive member 36 are electrically connected to each other via the measurement unit 4B. The first electrode 31A and the conductive member 36 are preferably connected to the ground of the measurement unit 4B from the viewpoint of stabilizing the pressing force detection by decreasing the influence of noise. In other words, it is preferable that the terminals T11a and T11b of the measurement unit 4B to which the wiring drawn from the first electrode 31A and the conductive member 36 are electrically connected be further connected to the ground.

In FIG. 10A, the measurement unit 4B has only one terminal T12 to be electrically connected to the wiring drawn from one second electrode 32A among the plurality of second electrodes 32A. However, the measurement unit 4B usually has a plurality of terminals T12 to be electrically connected to the wiring drawn from each of the plurality of second electrodes 32A. In other words, each of all the second electrodes 32A is connected to the measurement unit 4B via the wiring and the terminal.

In the heater 30B of the second embodiment, the pressing force can be measured by measuring the change in the capacitance between the terminals of various combinations in the thickness direction of the heater.

The pressing force can be measured by measuring, for example, one or more changes selected from the group consisting of a change in the capacitance between the terminals T11a and T11b, a change in the capacitance between the terminals T11a and T12, and a change in the capacitance between the terminals T12 and T11b.

From the viewpoint of improving the pressure sensitivity, it is preferable to measure the pressing force by measuring two or more changes selected from the above group, preferably, a change in the capacitance between the terminals T11a and T12 and a change in the capacitance between the terminals T12 and T11b.

In the heater 30B of the second embodiment, the measurement range of the pressing force can be further widened by using those having different elastic moduli (for example, Young's modulus) as the first electrode 31A and the conductive member 36. For example, in a case where the elastic modulus of the first electrode 31A is relatively low and the elastic modulus of the conductive member 36 is relatively high, the conductive member 36 is deformed as illustrated in FIG. 10B after the first electrode 31A is crushed, and thus the measurement range of the pressing force is further widened.

In the heater 30B of the second embodiment, the pressing force is measured by measuring the change in the capacitance between the terminals based on the change in the area of the contact region without deforming the dielectric 33A, and thus a relatively wide range of the pressing force can be measured with a relatively simple structure. In the second embodiment, the "area of the contact region" is the sum of the area of the contact region between the first electrode 31A and the dielectric 33A and the area of the contact region between the conductive member 36 and the dielectric 33A.

In the heater 30B of the second embodiment, the conductive member 36 is used, thus the influence of noise is minor, and the pressing force can be far more stably detected.

The pressure sensitive sensor function, the heater function, and the method for performing pressure sensing-heating by these functions in the heater 30B of the second embodiment are similar to those in the heater 30A of the first embodiment except that the conductive member 36 is newly disposed as described above and thus the detection sensitivity to battery deterioration, particularly high rate deterioration is further improved as described above.

Third Embodiment: Highly Efficient Heat-Generating Heater

Figure 11:
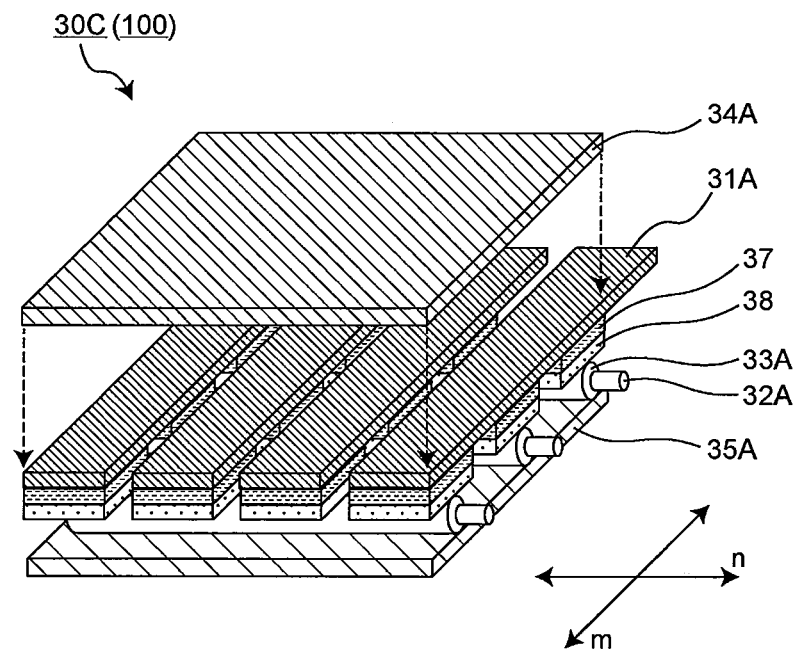
FIG. 11 is an exploded schematic diagram of the heater according to the third embodiment and the pressure sensitive device according to the tenth embodiment.
Figure 12A:
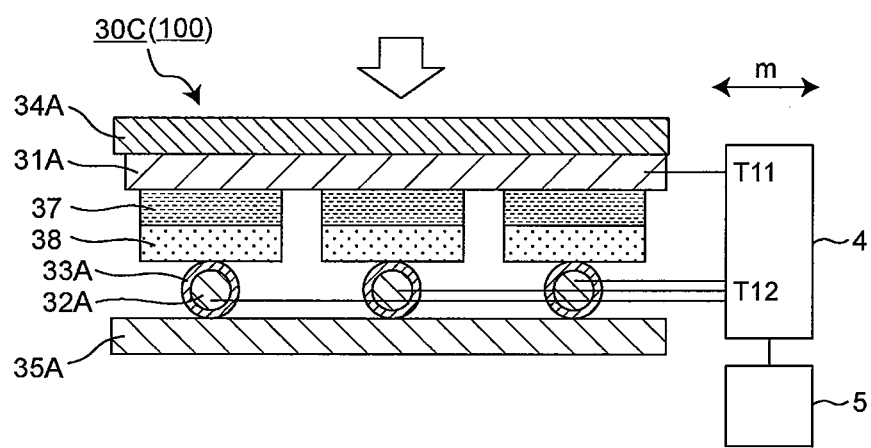
FIG. 12A is a partially enlarged sectional view schematically illustrating the configuration of the heater according to the third embodiment and the pressure sensitive device according to the tenth embodiment.
Figure 12B:
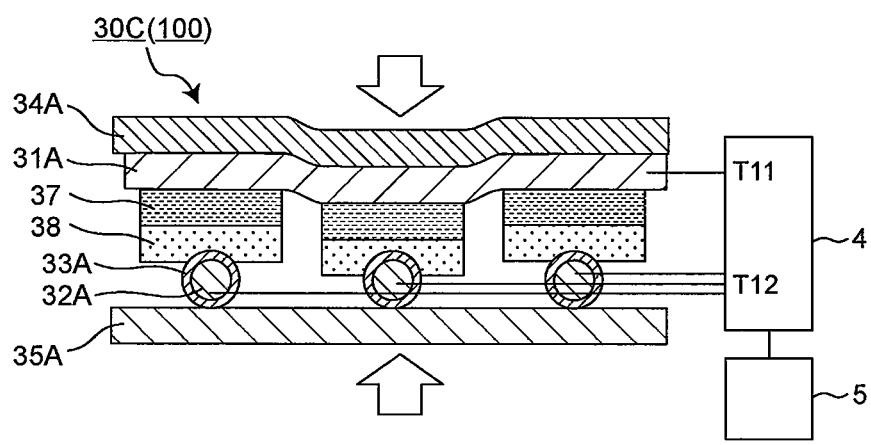
FIG. 12B is a partially enlarged sectional view schematically illustrating the configuration of the heater and the pressure sensitive device when a pressing force is applied to each of the heater according to the third embodiment and the pressure sensitive device according to the tenth embodiment.

A configuration of a heater 30C of a third embodiment is schematically illustrated in FIGS. 11, 12A, and 12B. FIG. 11 is an exploded schematic diagram of the heater according to the third embodiment. FIG. 12A is a partially enlarged sectional view schematically illustrating the configuration of the heater according to the third embodiment. FIG. 12B is a partially enlarged sectional view schematically illustrating the configuration of the heater when a pressing force is applied to the heater according to the third embodiment.

The heater 30C is an embodiment having a configuration in which a conductive heating element 37 and a conductive elastic body 38 are disposed between the first electrode 32A and the dielectric 33A and is similar to the heater 30A of the first embodiment except the following matters.

(1C-1) In the heater 30C, the conductive elastic body 38 and the conductive heating element 37 are sequentially disposed immediately above the integrated body of the second electrode 32A and the dielectric 33A. It is preferable that both the conductive elastic body 38 and the conductive heating element 37 be individually disposed at individual parts (namely, overlapping portions) at which the plurality of first electrodes 31A extending in the first direction m and the plurality of second electrodes 32A extending in the second direction n overlap each other in planar view as illustrated in FIGS. 11, 12A, and 12B. The conductive elastic body 38 and the conductive heating element 37 each independently may be individually disposed as described above, may have an elongated shape extending in the first direction m similarly to the first electrode 31A of the first embodiment, or may have a sheet shape which covers all the overlapping portions without being divided.

(1C-2) The conductive elastic body 38 may be selected from a similar range to that of the first electrode 31A of the first embodiment. In other words, the conductive elastic body 38 may have an elastic modulus and a resistivity in similar ranges to those of the first electrode 31A of the heater 30A. The conductive elastic body 38 is preferably formed of conductive rubber. Here, the conductive rubber may be similar to the conductive rubber described as a constituent material of the first electrode 31A in the first embodiment. The thickness of the conductive elastic body 38 is usually 1 μm to 10 cm, preferably 5 μm to 1 cm, and for example, one example thereof is more preferably 5 mm. The elastic modulus of the conductive elastic body 38 is preferably, for example, about $10^4$ Pa to $10^8$ Pa, and for example, one example thereof is about $10^6$ Pa. The resistivity of the conductive elastic body 38 may be usually higher than the resistivity of the first electrode 31A and may be, for example, $1 \times 10^{-7}$ Ωm or more, particularly $1 \times 10^{-7}$ to $1 \times 10^3$ Ωm.

The conductive elastic body 38 is disposed at each of a plurality of facing portions at which the plurality of first electrodes 31A and the plurality of second electrodes 32A intersect each other. In other words, the conductive elastic body 38 may be individually disposed at individual parts (namely, overlapping portions or facing portions) at which the plurality of first electrodes 31A and the plurality of second electrodes 32A overlap each other in planar view as illustrated in FIGS. 12A and 12B, may be disposed while having an elongated shape extending in the first direction m similarly to the first electrode 31A, or may be disposed while having one sheet shape which covers all the overlapping portions (or facing portions) without being divided. It is preferable that the conductive elastic body 38 be individually disposed at each overlapping portion (or each facing portion) from the viewpoint of further improving the detection sensitivity to the pressure distribution. The conductive elastic body 38 is disposed between the conductive heating element 37 and the dielectric 33A in the thickness direction of the heater 30C and is preferably disposed to be in contact with the conductive heating element 37.

(1C-3) The conductive heating element 37 is formed of a material which self-heats by the application of voltage. It is preferable that the material forming the conductive heating element 37 have an appropriately great resistivity enough to effectively generate Joule heat while exhibiting conductive property. The resistivity of the conductive heating element 37 is usually higher than the resistivities of the first electrode 31A and second electrode 32A described above, is, for example, $1 \times 10^{-7}$ to $1 \times 10^{-2}$ Ωm, and may be preferably $1 \times 10^{-8}$ to $1 \times 10^{-3}$ Ωm. The conductive heating element 37 preferably exhibits flexibility from the viewpoint of further improving the detection sensitivity to battery deterioration, particularly high rate deterioration. Here, the flexibility is a property that an object is flexed and deformed as a whole by an external force (normal pressing force applied to the heater: for example, pressing force of about 0.1 to 400 N/cm$^2$) but returns to the original shape when the force is removed similarly to above. In a case where the conductive heating element 37 exhibits flexibility, the conductive heating element 37 has an elastic modulus of, for example, more than about $10^8$ Pa, particularly more than $10^8$ Pa and $10^{12}$ Pa or less, and, for example, one example of the elastic modulus is about $1.2 \times 10^{11}$ Pa.

The conductive heating element 37 may be formed of any material as long as it has at least a resistivity as the above. For example, the conductive heating element 37 may be formed to contain a metal alloy system, a ceramic material, a resin material, and/or a metal oxide material. By way of example only, the conductive heating element 37 may contain at least one metal alloy system selected from the group consisting of Ni—Cr and Fe—Cr alloy systems and the like as the metal alloy system, may be formed of at least one ceramic material selected from the group consisting of silicon carbide (SiC), a molybdenum silicide-based material (MoSi$_2$), lanthanum chromite (LaCrO$_3$), a zirconia-based material (ZrO$_2$), a carbon-based material (C) and the like that are ceramic heating elements, or may be formed of at least one metal oxide material selected from the group consisting of Al$_2$O$_3$, and Ta$_2$O$_5$ and the like. The thickness of the conductive heating element 37 is usually 5 μm to 10 cm, preferably 20 μm to 1 cm, and for example, one example thereof is more preferably 0.5 mm.

Figure 12C:
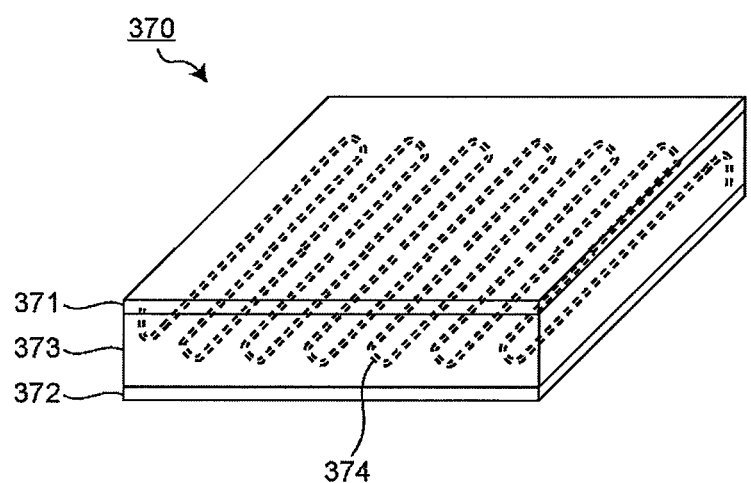
FIG. 12C is a schematic appearance diagram illustrating an example of conductive heating elements according to the third embodiment and the tenth embodiment.

The schematic appearance diagram of an electric heating member 370 as an example of the conductive heating element 37 is illustrated in FIG. 12C. In the electric heating member 370, an insulator 373 is disposed between two conductive layers (371, 372) and an electric heating wire 374 electrically connects the two conductive layers (371, 372) to each other while being contained (or embedded) in the insulator 373. As the content of the electric heating wire 374 in the insulator 373 is higher, the heat generation rate and heat generation efficiency of the electric heating member 370 are higher. In order to secure the content of the electric heating wire 374 required to achieve predetermined heat generation, the electric heating wire 374 may have a meandering shape, for example, as illustrated in FIG. 12C or a spiral shape in the insulator 373.

The conductive layers (371, 372) may be layers which exhibit at least conductive property and can function as so-called electrodes. The resistivity of the conductive layers is, for example, $1 \times 10^{-9}$ to $1 \times 10^{-5}$ Ωm, preferably $1 \times 10^{-8}$ to $5 \times 10^{-6}$ Ωm. The conductive layers (371, 372) usually exhibit flexibility but may exhibit elastic property. The flexibility is a property that an object is flexed and deformed as a whole by an external force (normal pressing force applied to the heater of the secondary battery: for example, pressing force of about 0.1 to 400 N/cm$^2$) but returns to the original shape when the force is removed. In a case where the conductive layers exhibit flexibility, the conductive layers have an elastic modulus of, for example, more than about 10$^8$ Pa, particularly more than 10$^8$ Pa and 10$^{12}$ Pa or less, and, for example, one example of the elastic modulus is about 1.2×10$^{11}$ Pa. The conductive layers (371, 372) may be formed of any material as long as they exhibit at least conductive property. The conductive layers (371, 372) may be formed of a material selected from a similar range of materials as that for the first electrode 31A. The conductive layers (371, 372) are preferably formed of a metal body, particularly copper (for example, copper foil) from the viewpoint of further improving the heat generation rate and heat generation efficiency. The thicknesses of the conductive layers (371, 372) are not particularly limited as long as the electric heating member 370 generates heat and are each independently usually 1 μm to 1 mm, preferably 10 μm to 100 μm.

The insulator 373 may be formed of any material as long as it exhibits at least the properties as an "insulator". The resistivity of the insulator 373 is, for example, 10$^3$ Ωm or more, preferably 10$^6$ to 10$^{15}$ Ωm. The insulator 373 may be formed of a material selected from a similar range of materials as that for the dielectric 33A. The insulator 373 is preferably formed of a ceramic material, particularly aluminum oxide from the viewpoint of further improving safety, heat generation rate, and heat generation efficiency. The thickness of the insulator 373 is usually 10 μm to 10 mm, preferably 100 μm to 1 mm.

It is preferable that the electric heating wire 374 have an appropriately great resistivity enough to effectively generate Joule heat while exhibiting conductive property. The resistivity of the electric heating wire 374 is, for example, 1×10$^{-9}$ to 1×10$^{-5}$ Ωm, preferably 1×10$^{-8}$ to 5×10$^{-6}$ Ωm.

The electric heating member 370 can be obtained by, for example, disposing the electric heating wire 374 inside a molded body formed of a predetermined raw material (for example, a ceramic raw material (namely, inorganic fine particles)) of the insulator 373 and a binder, firing this molded body, and forming the conductive layers (371, 372) on this fired molded body by a vapor deposition method or the like.

The conductive heating element 37 is disposed at each of a plurality of facing portions at which the plurality of first electrodes 31A and the plurality of second electrodes 32A intersect each other. In other words, the conductive heating element 37 may be individually disposed at individual parts (namely, overlapping portions or facing portions) at which the plurality of first electrodes 31A and the plurality of second electrodes 32A overlap each other in planar view as illustrated in FIGS. 12A and 12B, may be disposed while having an elongated shape extending in the first direction m similarly to the first electrode 31A, or may be disposed while having one sheet shape which covers all the overlapping portions (or facing portions) without being divided. It is preferable that the conductive heating element 37 be individually disposed at each overlapping portion (or each facing portion) from the viewpoint of local heating. The conductive heating element 37 is disposed between the first electrode 31A and the dielectric 33A (usually between the first electrode 31A and the conductive elastic body 38 to be described later) in the thickness direction of the heater 30C and is preferably disposed to be in contact with the first electrode 31A.

(1C-4) The first electrode 31A of the third embodiment is similar to the first electrode 31A of the first embodiment except that the first electrode 31A of the third embodiment may not exhibit elastic property and may exhibit higher conductivity property than the first electrode 31A of the first embodiment. For example, in the third embodiment, the first electrode 31A preferably exhibits flexibility usually from the viewpoint of further improving the detection sensitivity to battery deterioration, particularly high rate deterioration. Here, the flexibility is a property that an object is flexed and deformed as a whole by an external force (normal pressing force applied to the heater: for example, pressing force of about 0.1 to 400 N/cm$^2$) but returns to the original shape when the force is removed similarly to above. In a case where the first electrode 31A of the third embodiment exhibits flexibility, the first electrode 31A has an elastic modulus of, for example, more than about 10$^8$ Pa, particularly more than 10$^8$ Pa and 10$^{12}$ Pa or less, and, for example, one example of the elastic modulus is about 1.2×10$^{11}$ Pa. In addition, for example, in a case where the first electrode 31A of the third embodiment exhibits higher conductive property, the resistivity of this first electrode 31A, is, for example, 1×10$^{-9}$ to 1×10$^{-5}$ Ωm, preferably 1×10$^{-8}$ to 5×10$^{-6}$ Ωm.

The first electrode 31A of the third embodiment may be formed of any material as long as it has the resistivity described above. The first electrode 31A of the third embodiment may be formed of a similar material to that for the second electrode 32A of the first embodiment. The first electrode 31A of the third embodiment is preferably formed of a metal body, particularly copper from the viewpoint of further improving the detection sensitivity to battery deterioration, particularly high rate deterioration.

Method for Performing Pressure Sensing-Heating by Pressure Sensitive Sensor Function and Heater Function in Third Embodiment The pressure sensitive sensor function (method for measuring pressure distribution) in the third embodiment is similar to the pressure sensitive sensor function in the first embodiment except that the area of the contact region between the conductive elastic body 38 and the dielectric 33A is measured instead of the area of the contact region between the first electrode 31A and the dielectric 33A.

For example, in the heater 30C of the third embodiment, the pressure distribution is measured by measuring the change in the capacitance between the terminals T11 and T12 based on the change in the area of the contact region between the conductive elastic body 38 and the dielectric 33A without deforming the dielectric 33A. In the third embodiment as well, the change in the area of the contact region is relatively greater than, for example, the change in the distance between electrodes in the conventional pressure sensitive sensor, and thus the pressure distribution in a relatively wide range can be measured with a relatively simple structure.

In more detail, in the heater 30C of the third embodiment, the individual parts at which the plurality of first electrodes 31A extending in the first direction m and the plurality of second electrodes 32A extending in the second direction n overlap each other in planar view are used as the sensor unit (namely, sensing element/sensing unit) (for example, a1 to a4) as described above (see FIG. 6 as in the first embodiment). In the third embodiment as well, the measurement unit 4 measures the pressure distribution over time by measuring (or sensing) each capacitance (namely, capacitance of each sensor unit) between one of the plurality of first electrodes 31A and one of the plurality of second electrodes 32A. In other words, the capacitance of each sensor unit is measured before application of a pressing force. Thereafter, when the measurement (sensing) is performed after application of the pressing force, the sensor unit in which the capacitance has changed is the pressing position. For example, in the heater of FIG. 6, when there is a change in the capacitance between a first electrode 31A-1 and a second electrode 32A-1 but there is no change in the capacitance between the first electrode 31A-1 and a second electrode 32A-2, the capacitance between a first electrode 31A-2 and the second electrode 32A-1, and the capacitance between the first electrode 31A-2 and the second electrode 32A-2, the pressing position is the sensor unit a1. The pressing force can be detected from the capacitance measured before and after application of pressing force and the relation between the capacitance and the pressing force (load), for example, as illustrated in FIG. 5. The manner of changes in the output value when a load is applied to, for example, each of ten sensor units (elements) in such a heater and simultaneous measurement is performed is illustrated in FIG. 8. From FIG. 8, it is apparent that the sensitivity of the heater of the third embodiment as a pressure sensitive sensor is extremely high.

In the heater function of the heater 30C of the third embodiment, the pressing position detected based on the pressure sensitive distribution in the pressure sensitive sensor function is locally heated. In detail, an alternating voltage is applied to (or between) a predetermined first electrode among the plurality of first electrodes 31A and a predetermined second electrode among the plurality of second electrodes 32A. This causes the conductive heating element 37 at a predetermined position at which the predetermined first electrode and the predetermined second electrode intersect each other to generate heat, and the predetermined position in the battery cell is locally heated. "Locally" means "not entirely", and it is only required that heating of a part of the region including at least a pressing position P in the battery cell is achieved.

In more detail, for example, in a case where swelling has occurred in the region (pressing position) P of the battery cell 1 and it is desired to heat this region P as illustrated in FIG. 9, an alternating voltage is applied to (or between) the first electrode 31A-b and the second electrode 32A-b according to the pressing position. By this, Joule heat is generated in the conductive heating element 37 between the first electrode 31A-b and the second electrode 32A-b at a higher efficiency, and the pressing position P in the battery cell can be selectively and locally heated. Such heating is achieved more locally and more efficiently. FIG. 9 corresponds not only to the first embodiment but also to the schematic appearance of the battery cell equipped with the heater according to the third embodiment.

In the heater of the third embodiment as well, both the pressure sensitive sensor function and the heater function can be exerted by alternately switching these functions by a time-division method as in the first embodiment. In the disclosure, the "time-division method" is a method in which processing for the pressure sensitive sensor function and processing for the heater function in one heater are alternately performed with a time shift. In detail, the measurement of pressure distribution (capacitance) as processing for the pressure sensitive sensor function and the voltage application to (or between) the first electrode and the second electrode as processing for the heater function are alternately performed.

In the third embodiment, the processing time for the pressure sensitive sensor function and the processing time for the heater function are not particularly limited as long as the pressing position can be selectively and locally heated while measuring the pressure distribution (pressing position and pressing force) in the pressure sensitive sensor function. The processing time for the pressure sensitive sensor function may be, for example, 1 μsec to several minutes, particularly 20 μsec to 1 minute per one time. The processing time for the heater function may be, for example, 1 millisecond to several tens of minutes, particularly 20 milliseconds to 10 minutes per one time.

Fourth Embodiment

Figure 13:
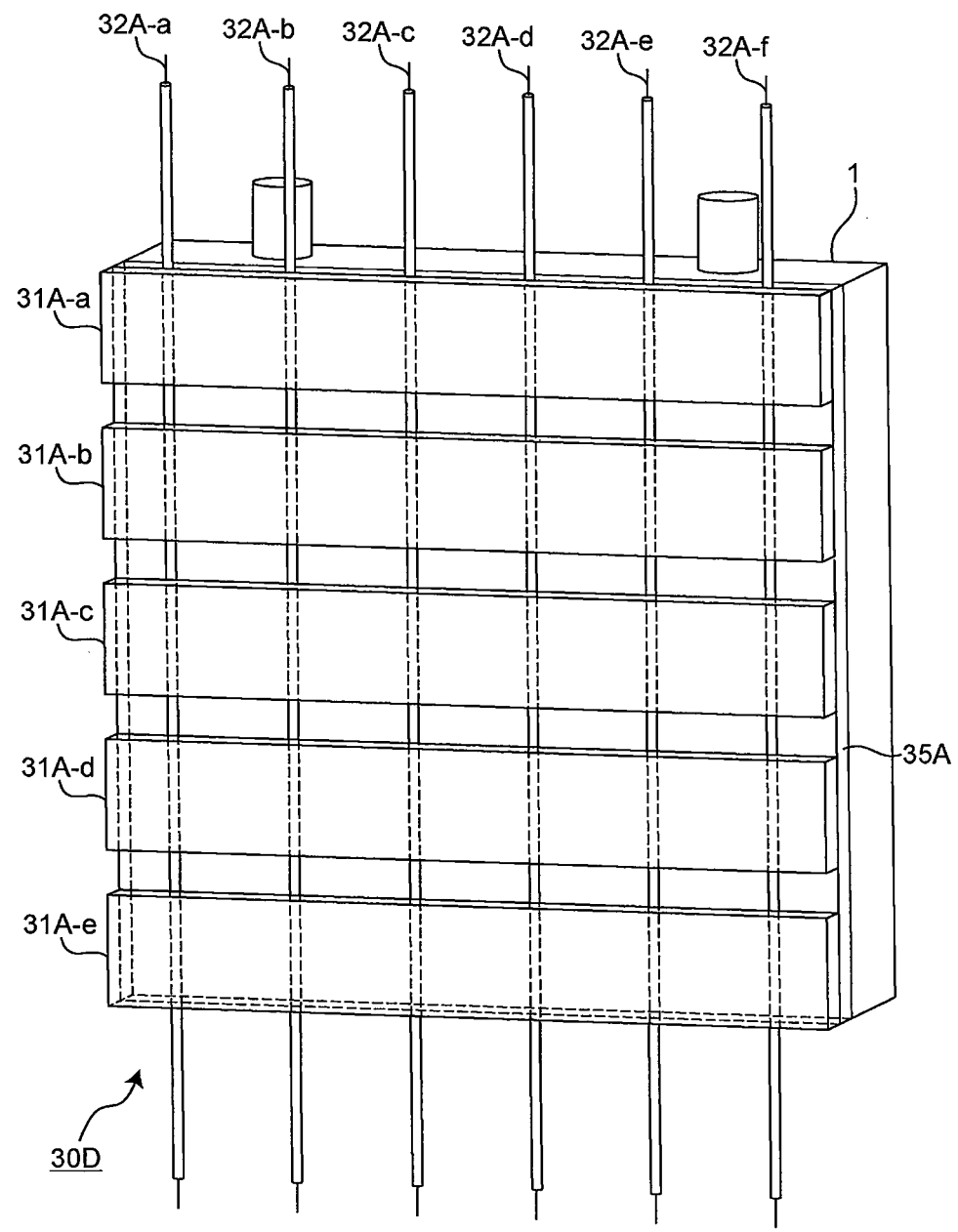
FIG. 13 illustrates a schematic appearance of a battery cell equipped with a heater according to a fourth embodiment.

A configuration of a heater 30D of a fourth embodiment is schematically illustrated in FIG. 13. FIG. 13 illustrates a schematic appearance of a battery cell 1 equipped with the heater 30D according to the fourth embodiment. Incidentally, the protective sheet 34A is omitted in FIG. 13.

The heater 30D is similar to the heater 30A of the first embodiment except that the second electrode 32A has an I-shape on the protective sheet 35A and thus the number of the second electrodes 32A can be increased.

The pressure sensitive sensor function, the heater function, and the method for performing pressure sensing-heating by these functions in the heater 30D of the fourth embodiment are similar to those in the heater 30A of the first embodiment except that the heater 30D further exerts the following effects.

The second electrode 32A has an I-shape and the number of the second electrodes 32A can be increased as described above, and thus the pressing position can be far more locally detected in the pressure sensitive sensor function. The battery cells can be heated far more selectively and locally in the heater function.

Fifth Embodiment

Figure 14:
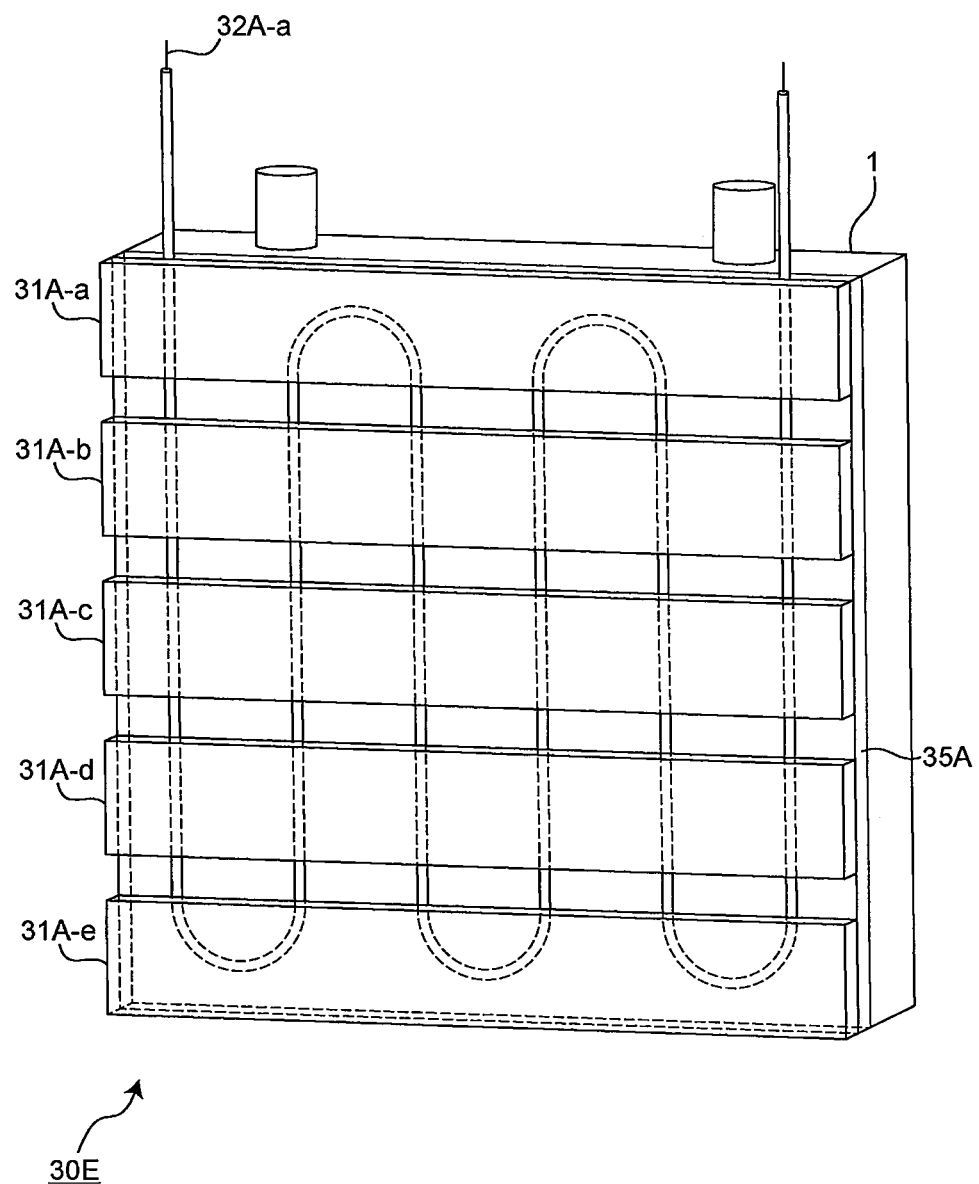
FIG. 14 illustrates a schematic appearance of a battery cell equipped with a heater according to a fifth embodiment.

A configuration of a heater 30E of a fifth embodiment is schematically illustrated in FIG. 14. FIG. 14 illustrates a schematic appearance of a battery cell 1 equipped with the heater 30E according to the fifth embodiment. Incidentally, the protective sheet 34A is omitted in FIG. 14.

The heater 30E is similar to the heater 30A of the first embodiment except that the second electrode 32A has a meandering shape on the protective sheet 35A and the heater 30E includes only one second electrode 32A-a as the second electrode 32A.

The pressure sensitive sensor function, the heater function, and the method for performing pressure sensing-heating by these functions in the heater 30E of the fifth embodiment are similar to those in the heater 30A of the first embodiment except that the heater 30E exerts the following effects.

It is possible to detect the pressing position for each region matching with each first electrode 31A in the pressure sensitive sensor function since only one second electrode 32A-a is used as the second electrode 32A. It is possible to locally heat each region matching with each first electrode 31A in the battery cell in the heater function.

Sixth Embodiment

Figure 15:
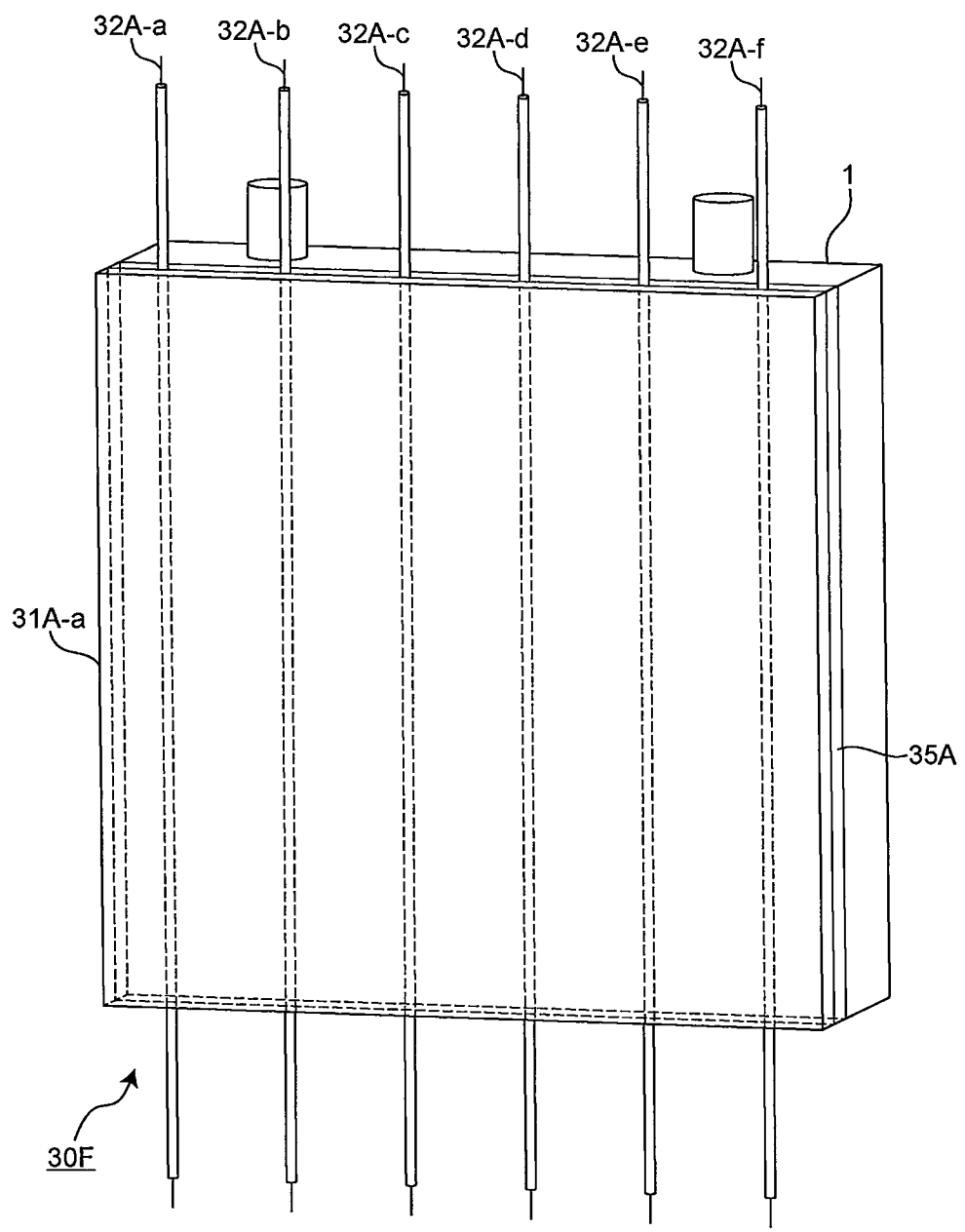
FIG. 15 illustrates a schematic appearance of a battery cell equipped with a heater according to a sixth embodiment.

A configuration of a heater 30F of a sixth embodiment is schematically illustrated in FIG. 15. FIG. 15 illustrates a schematic appearance of a battery cell 1 equipped with the heater 30F according to the sixth embodiment. Incidentally, the protective sheet 34A is omitted in FIG. 15.

The heater 30F is similar to the heater 30D of the fourth embodiment except that the heater 30F includes only one first electrode 31A-a as the first electrode 31A.

The pressure sensitive sensor function, the heater function, and the method for performing pressure sensing-heating by these functions in the heater 30F of the sixth embodiment are similar to those in the heater 30D of the fourth embodiment except that the heater 30F exerts the following effects.

It is possible to detect the pressing position for each region matching with each second electrode 32A (for example, 32A-a, 32A-b, 32A-c, 32A-d, 32A-e, 32A-f) in the pressure sensitive sensor function since only one first electrode 31A-a is used as the first electrode 31A. It is possible to locally heat each region matching with each second electrode 32A in the battery cell in the heater function.

Seventh Embodiment

Figure 16:
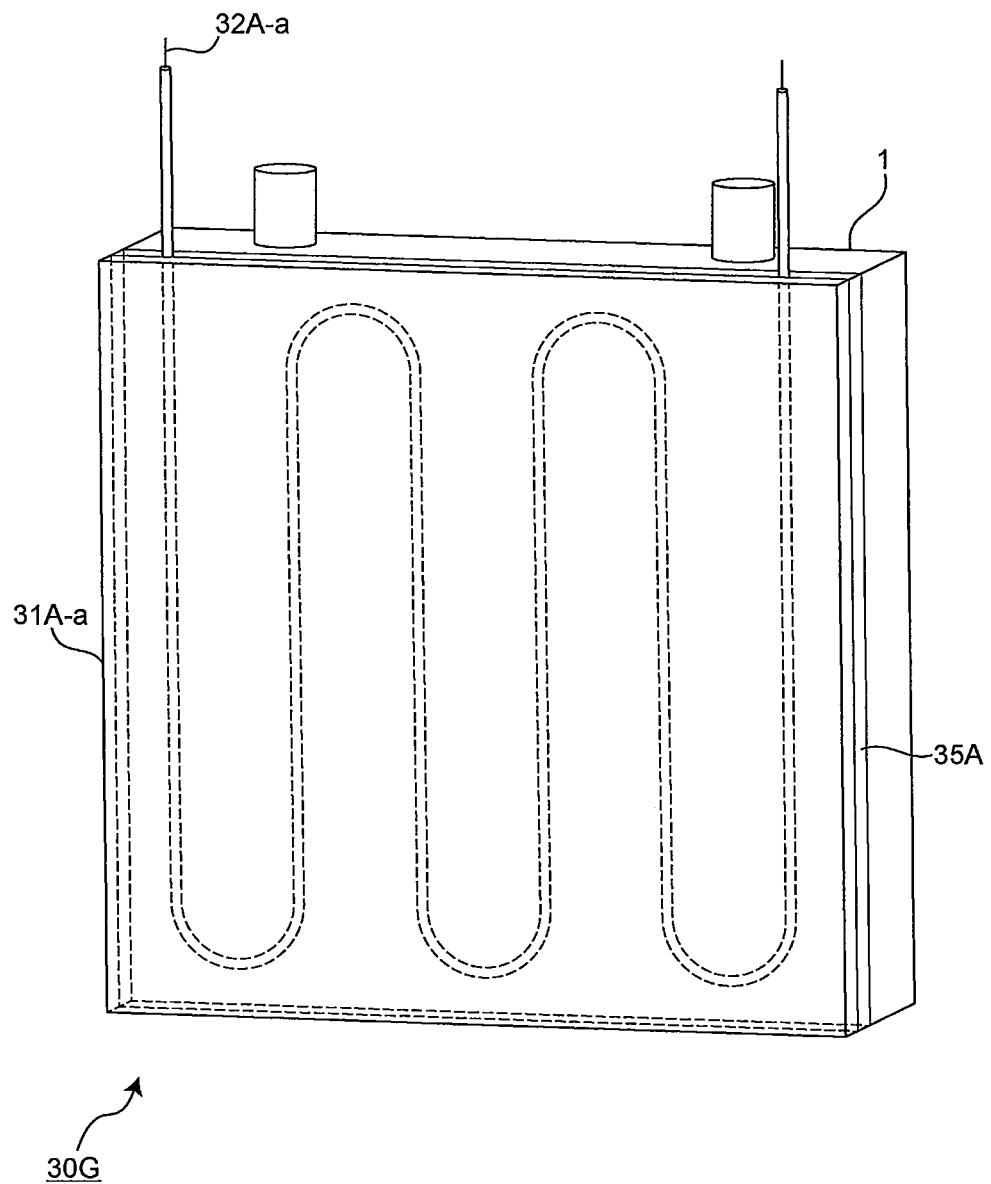
FIG. 16 illustrates a schematic appearance of a battery cell equipped with a heater according to a seventh embodiment.

A configuration of a heater 30G of a seventh embodiment is schematically illustrated in FIG. 16. FIG. 16 illustrates a schematic appearance of a battery cell 1 equipped with the heater 30G according to the seventh embodiment. Incidentally, the protective sheet 34A is omitted in FIG. 16.

The heater 30G is similar to the heater 30A of the first embodiment except that the heater 30G includes only one first electrode 31A-a as the first electrode 31A and only one second electrode 32A-a as the second electrode 32A and the second electrode 32A has a meandering shape on the protective sheet 35A.

The pressure sensitive sensor function, the heater function, and the method for performing pressure sensing-heating by these functions in the heater 30G of the seventh embodiment are similar to those in the heater 30A of the first embodiment except that the heater 30G exerts the following effects.

Only one first electrode 31A-a is used as the first electrode 31A and only one second electrode 32A-a is used as the second electrode 32A, thus it is difficult to measure the pressure distribution by the direct capacitance type described above, but it is possible to measure the pressure distribution by an RC delay time type (a RC delay time method) or an impedance type (an impedance method) as to be described later. In the heater function, it is difficult to perform local heating in a case where only one heater is used for one surface of the battery cell, but selective heating by each heater is possible by using two or more heaters for one surface of the battery cell. As a result, local heating for one surface of the battery cell is possible.

Eighth Embodiment

Figure 17:
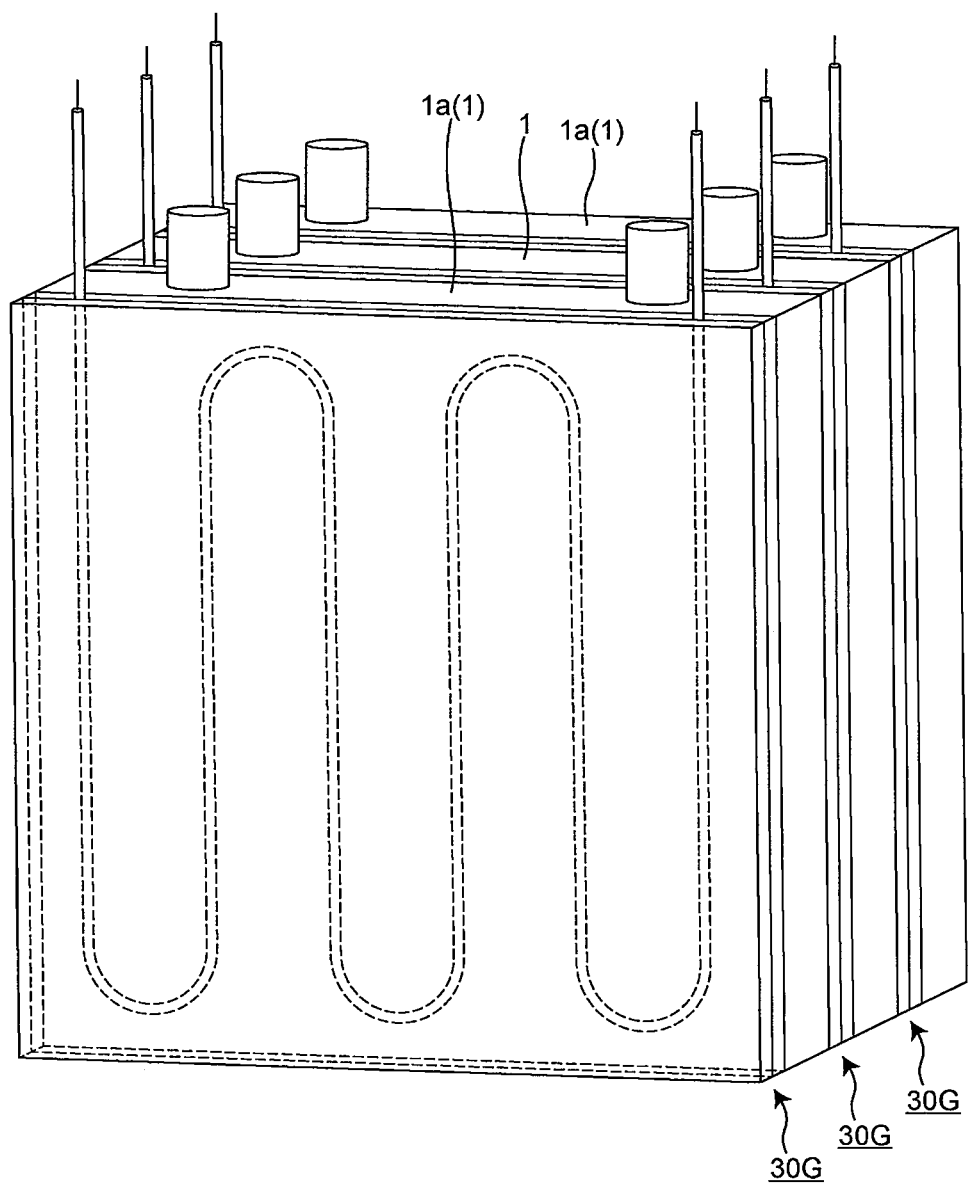
FIG. 17 is a schematic appearance of a secondary battery (eighth embodiment) including three heaters according to a seventh embodiment and three battery cells, in which a case is omitted.

An eighth embodiment relates to a secondary battery. A configuration of a secondary battery of the eighth embodiment is schematically illustrated in FIG. 17. FIG. 17 is a schematic appearance of a secondary battery which includes three heaters 30G according to the seventh embodiment and three battery cells 1 and in which the heater 30G is provided between the battery cell 1a in contact with the case and the case and between two sets of battery cells adjacent to each other. Incidentally, the case is omitted in the secondary battery according to FIG. 17.

Ninth Embodiment: RC Delay Time Type and Impedance Type

A ninth embodiment indicates that pressure distribution can be measured by a RC delay time type (a RC delay time method) or an impedance type (an impedance method). The RC delay time type and the impedance type are also methods included in the capacitance type. This is because the capacitance is used in the RC delay time type or the impedance type as well.

Figure 18:
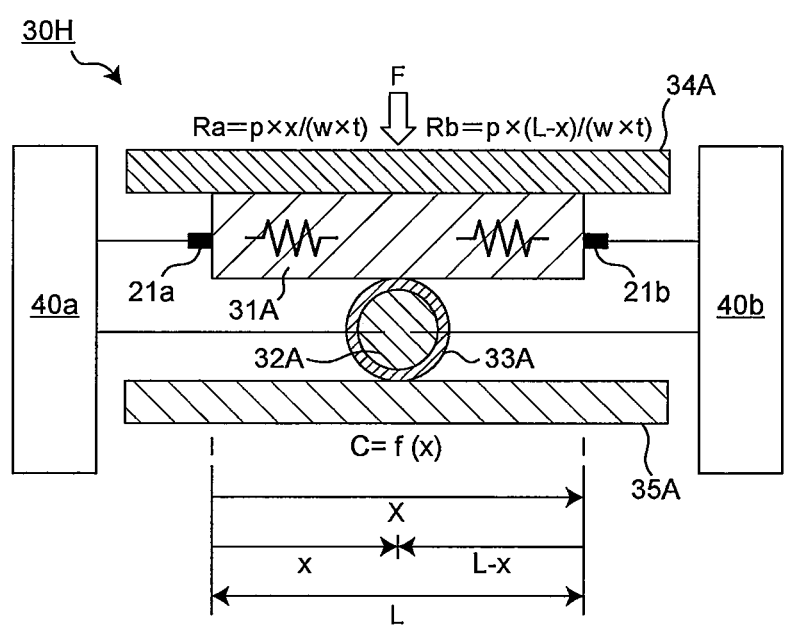
FIG. 18 is a partially enlarged sectional view of a heater for explaining the measurement principle of a pressure distribution in a heater by an RC delay time type or an impedance type (ninth embodiment).
Figure 19:
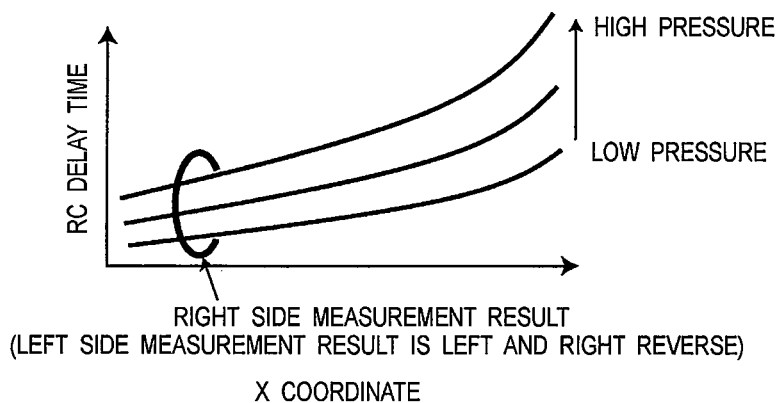
FIG. 19 is a graph of X coordinate of pressing position-RC delay time for explaining the measurement principle of a pressure distribution in a heater and a pressure sensitive device by the RC delay time type (ninth embodiment and twelfth embodiment).
Figure 20:
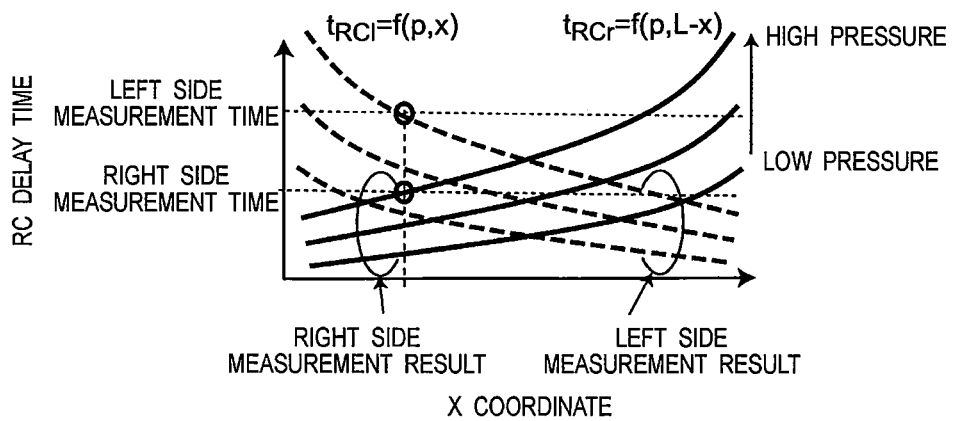
FIG. 20 is a graph of X coordinate of pressing position-RC delay time for explaining the measurement principle of a pressure distribution in the heater and the pressure sensitive device by the RC delay time type (ninth embodiment and twelfth embodiment).
Figure 21:
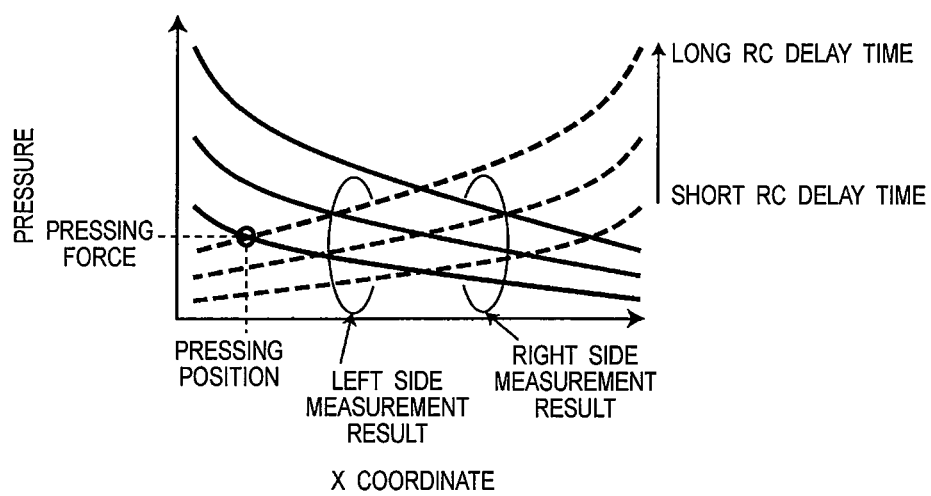
FIG. 21 is a graph of X coordinate of pressing position-pressure (pressing force) for explaining the measurement principle of a pressure distribution in the heater and the pressure sensitive device by the RC delay time type (ninth embodiment and twelfth embodiment).

In the ninth embodiment, the measurement mechanism of pressure distribution in the RC delay time type and the impedance type will be described with reference to FIGS. 18 to 21. FIG. 18 is a partially enlarged sectional view of a heater for explaining the measurement principle of pressure distribution by the RC delay time type or the impedance type. FIGS. 19 and 20 are graphs of X coordinate of pressing position-RC delay time for explaining the measurement principle of pressure distribution by the RC delay time type. FIG. 21 is a graph of X coordinate of pressing position-pressure (pressing force) for explaining the measurement principle of pressure distribution by the RC delay time type.

In the RC delay time type and the impedance type, the fact that the sensitivity to pressure change differs depending on whether the electrode is near or far from the pressing position due to the volume resistivity of the electrode utilized. This makes it possible to detect both the pressing position and the pressing force at the same time even with a relatively simple structure.

The heater 30H illustrated in FIG. 18 is similar to the heater 30A of the first embodiment except that the terminals 21 (for example, 21a, 21b) electrically connected to both ends of the first electrode 31A are illustrated and this heater has two measurement units 4 (for example, 40a, 40b). Incidentally, the second electrode 32A also has terminals (not illustrated) electrically connected to both ends. The measurement units 4 (for example, 40a, 40b) are usually electrically connected to (or between) the terminal 21 of the first electrode 31A and the terminal of the second electrode 32A.

The first electrode 31A has a predetermined volume resistivity. Hence, when the pressing force F is applied from the outside as illustrated in FIG. 18, the resistance value between the pressing position in the first electrode 31A and the first terminal 21 changes according to the distance between the pressing position to which this pressing force F is applied and the first terminal 21. Along with this, a predetermined parameter that can suggest the pressing position and the pressing force changes, and thus the pressing position and the pressing force (particularly the pressing position) can be detected. The pressing force F is applied from the first electrode 31A side in FIG. 18, but the pressing force F is not limited to this and may be applied from the second electrode 32A side.

The predetermined volume resistivity of the first electrode 31A means a volume resistivity enough to measure the RC delay time or impedance to be described later and the changes thereof by the measurement unit at the time of pressing deformation. The resistivity between the terminals (for example, between the terminals 21a and 21b) of the first electrode 31A is, for example, 100Ω to 10 MΩ, particularly 1 kΩ to 500 kΩ.

Examples of the predetermined parameter that can suggest the pressing position and the pressing force include the delay time (time constant) (referred to as "RC delay time" in the present specification) decided by the product of the resistance value and the capacitance and the impedance of the heater. In the disclosure, a method in which both the pressing position and the pressing force are measured by measuring the RC delay time is hereinafter referred to as "RC delay time type" in some cases. A method in which both the pressing position and the pressing force are measured by measuring the impedance is hereinafter referred to as "impedance type" in some cases.

RC Delay Time Type

In the RC delay time type, the RC delay time is a parameter having a correlation with the pressing position and the pressing force. In the X coordinate from the first terminal 21a of the first electrode 31A, for example, as illustrated in FIG. 18, the RC delay time more greatly changes as the pressing position is closer to the measurement unit 40b and the pressing force is greater (see FIG. 19). On the other hand, the RC delay time only slightly changes as the pressing position is farther from the measurement unit 40b even though the pressing force is great (see FIG. 19). Hence, the pressing position and the pressing force (particularly the pressing position) can be detected by measuring the RC delay time. FIG. 19 is a graph of X coordinate of pressing position-RC delay time for explaining the detection principle for detecting the pressing position and the pressing force by the RC delay time type. In FIG. 19, the right side measurement result is the result measured by the measurement unit 40b on the right side in FIG. 18.

In detail, both the pressing position and the pressing force can be detected based on the measured values by measuring the RC delay time at least two times at the time of pressing deformation (particularly at the time of one time of pressing deformation). The time required to measure the RC delay time is not particularly limited and is, for example, 0.01 to 1000 milliseconds, particularly 1 to 100 milliseconds.

Examples of the method for measuring the RC delay time at least two times include the following methods having different measurement paths:

RC delay time type 1: measurement through any one first terminal 21 among at least two first terminals 21 having different connection positions in the first electrode 31A is performed at least two times by changing the first terminal. This method requires at least two measurement paths.

RC delay time type 2: measurement through one first terminal 21 connected to the first electrode 31A is performed at least two times while changing the resistance value of the load resistance. This method only requires at least one measurement path. As one load resistance among at least two load resistances with different resistance values to be used for measurement, the load resistance built in the measurement unit may be used or the load resistance separately provided on the inside or outside of the measurement unit may be used. The remaining at least one load resistance is a resistance value derived from the electrode 31A and takes different values depending on the pressing position.

In the RC delay time type 1, the RC delay time is measured through one first terminal 21 (for example, the measurement by the first measurement unit 40a) and then the measurement is performed through the other first terminal (for example, measurement by the second measurement unit 40b) between the two first terminals 21 (21a, 21b) having different connection positions in the first electrode 31A at the time of pressing deformation (particularly at the time of one time of pressing deformation). For example, as illustrated in FIG. 18, when the pressing position is changed on the X coordinate and the RC delay time ($t_{RC1}$) is measured by the left side measurement unit 40a, the RC delay time ($t_{RC1}$), the pressing force p (=F), and the pressing position x have the correlation as denoted by the broken line in FIG. 20. When the RC delay time ($t_{RCr}$) is measured by the right side measurement unit 40b, the RC delay time ($t_{RCr}$), the pressing force p (=F), and the pressing position (L-x) have the correlation as denoted by the solid line in FIG. 20. When a specific pressure is applied at a specific position, $t_{RC1}$ and $t_{RCr}$ indicate the same pressing position from these correlations and the pressing force p (=F) and the pressing position x are attained.

In other words, when the correlation based on the left side measurement unit 40a and the correlation based on the right side measurement unit 40b are expressed in a graph of pressing position (X coordinate)-pressure (pressing force p (=F)), a graph as illustrated in FIG. 21 is attained. The pressing force p (=F) and the pressing position x are also attained by calculating the intersections of these.

In the RC delay time type 2, when the RC delay time is measured through one first terminal 21 (for example, 21a) connected to the first electrode 31A, the measurement is performed at least two times by changing the resistance value of the load resistance at the time of pressing deformation (particularly at the time of one time of pressing deformation). For example, as illustrated in FIG. 18, the RC delay time is measured at least two times by changing the resistance value of the load resistance at the time of one time of pressing deformation through one first terminal 21a only by the first measurement unit 40a. The load resistances are not illustrated in FIG. 18, but it is assumed that at least two load resistances having different resistance values are built in the first measurement unit 40a. In this way, the RC delay times (for example, $t_{RC11}$ and $t_{RC12}$) measured by changing the resistance value of the load resistance in one measurement path are all attained in the correlation between the pressing force p (=F) and the pressing position x as in the RC delay time type 1. By expressing correlations of these in the graph of pressing position (X coordinate)-pressure (pressing force p (=F)) as in the RC delay time type 1, the pressing force p (=F) and the pressing position x are attained as the intersections of these. In the RC delay time type 2, the use of minimum one measurement unit is sufficient and the use of measurement unit 40b in, for example, FIG. 18 is not required.

Impedance Type

In the impedance type, the impedance is a complex number represented by "R+jX", where R is the real part of impedance and X is the imaginary part of impedance. Such impedance is also a parameter having a correlation with the pressing position and the pressing force. In other words, the real part R is represented by R=ρx/(wt), and the imaginary part X is represented by X=1/(ωC). ρ is the volume resistivity of the first electrode 31A, x is the distance from the first terminal connecting the measurement unit, w is the width of the first electrode 31A, t is the thickness of the first electrode 31A, ω is 2×π×f, π is the ratio of the circumference of a circle to its diameter, f is the frequency, and C is the capacitance. Hence, the pressing force p (=F) and the pressing position x are attained by calculating x=Rwt/ρ and F=f$^{-1}$(1/(ωX)).

In detail, both the pressing position and the pressing force can be detected based on the measured values by measuring the impedance of the heater at least one time at the time of pressing deformation (particularly at the time of one time of pressing deformation). The time required to measure the impedance is not particularly limited and is, for example, 0.01 to 1000 milliseconds, particularly 1 to 100 milliseconds.

[Pressure Sensitive Device]

The disclosure also provides a pressure sensitive device. A pressure sensitive device 100 of the disclosure has a structure similar or analogous to the heater 30C of the third embodiment among the heaters constituting the secondary battery described above.

The pressure sensitive device of the disclosure can be referred to as a "heating device with pressure sensitive sensor function", a "heater with pressure sensitive sensor function", or a "pressure sensitive heater" since the pressure sensitive device additionally serves as a heating device (for example, a heater). In other words, the pressure sensitive device of the disclosure exerts not only a pressure sensitive sensor function but also a heater function. Hence, when the pressure sensitive device of the disclosure is used, the pressure distribution (pressing position and pressing force) is detected by the pressure sensitive sensor function, and it is possible to selectively and locally heat only the pressing position or the vicinity thereof based on this pressure distribution. As a result, problems associated with the shortage of installation space caused by mounting both a pressure sensitive device and a heating device and the increases in the number of wirings and the manufacturing cost can be easily solved. To detect the pressure distribution means to measure the pressing position and the pressing force. The pressure sensitive device includes devices used for all applications requiring a pressure sensitive sensor function and a heater function and examples thereof include electronic devices such as the above-mentioned heaters of secondary batteries, electric devices such as heaters of in-vehicle seats and office chair seat, home appliances such as electric carpets to be described later and heat-retaining devices for canned beverages.

The pressure sensitive sensor function of the pressure sensitive device of the disclosure is based on the capacitance type and detects pressure distribution by measuring the change in the capacitance between the first electrode and the second electrode based on the change in the area of the contact region between the conductive elastic body and dielectric to be described later. Hence, the pressure sensitive sensor function of the pressure sensitive device of the disclosure has a relatively wider measurement range of the pressing force and relatively higher measurement sensitivity in the case of lower pressing force than the conventional pressure sensitive sensor function by the change in the capacitance based on the change of the distance between electrodes. The capacitance type in the disclosure is not particularly limited as long as it can detect the pressure distribution by the change in the capacitance based on the change in the area of the contact region between the conductive elastic body and the dielectric and includes, for example, a direct capacitance type, a RC delay time type, and an impedance type to be described later. The heater function of the pressure sensitive device of the disclosure is based on the resistance heating type and performs heating by generating Joule heat.

Embodiments according to the pressure sensitive device of the disclosure are the following tenth to twelfth embodiments.

Tenth Embodiment

A pressure sensitive device 100 according to a tenth embodiment is a pressure sensitive device in which a direct capacitance type is adopted in the pressure sensitive sensor function. The direct capacitance type is a method in which the capacitance between the first electrode and the second electrode and the change thereof are measured and the pressing force is directly attained from the measured values. The pressing position is the position at which the capacitance has changed.

As illustrated in FIGS. 11, 12A, and 12B, the pressure sensitive device 100 according to the tenth embodiment includes:

a plurality of first electrodes 31A extending in a first direction m, a plurality of second electrodes 32A extending in a second direction n intersecting the first direction m, a plurality of dielectrics 33A provided on surfaces of the plurality of second electrodes, and a conductive heating element 37 and a conductive elastic body 38 that are disposed at each of a plurality of facing portions at which the plurality of first electrodes 31A and the plurality of second electrodes 32A intersect each other. FIG. 11 is an exploded schematic diagram of the pressure sensitive device according to the tenth embodiment. FIG. 12A is a partially enlarged sectional view schematically illustrating the configuration of the pressure sensitive device according to the tenth embodiment. FIG. 12B is a partially enlarged sectional view schematically illustrating the configuration of the pressure sensitive device when a pressing force is applied to the pressure sensitive device according to the tenth embodiment.

The pressure sensitive device 100 usually further includes a measurement unit 4 and a power supply unit 5 as illustrated in FIGS. 12A and 12B. The pressure sensitive device 100 is usually fabricated by disposing the first electrodes 31A, the second electrodes 32A, the dielectrics 33A, the conductive heating elements 37, and the conductive elastic bodies 38 between two protective sheets 34A and 35A.

In the pressure sensitive device of the tenth embodiment, the pressure sensitive sensor function is exerted as follows. As illustrated in FIG. 12B, when a pressing force is applied to the pressure sensitive device 100, the area of the contact region between the conductive elastic body 38 and the dielectric 33A expands based on the elasticity of the conductive elastic body 38. As a result, the capacitance C [pF] between the first electrode 31A and the second electrode 32A changes. The capacitance C (pF) and the pressing force F (N) applied to the pressure sensitive device are each represented by formulas [where, in the tenth embodiment, s [pF/m] is the dielectric constant of the dielectric, S [m$^2$] is the contact area between the conductive elastic body and the dielectric, d [m] is the thickness of the dielectric, E [Pa] is the Young's modulus of the conductive elastic body, and e is the strain of the conductive elastic body] similar to those represented in the description of the first embodiment, and, as a result, the pressing force is detected by the pressure sensitive device. The graph showing the schematic relation between the capacitance C [pF] and the pressing force F [N] (load) is similar to the graph illustrated in FIG. 5. In the tenth embodiment, the pressing force is detected based on the change in the area of the contact region as described above, the change in this area relatively more greatly ($C \propto S$, $C \propto 1/d$) contributes to the capacity change than the change in the distance between electrodes in the conventional pressure sensitive sensor, and the measurement range of the pressing force is relatively wide. In particular, in a case where the pressing force is low, the change in the capacitance based on the change in the distance between electrodes is significantly small.

The pressing force may be applied to the pressure sensitive device 100 of the tenth embodiment from either electrode side of the first electrode 31A or the second electrode 32A, and thus the use direction (front and back direction) of the pressure sensitive device 100 at the time of use is not particularly limited. This is because even when the pressing force is applied from the first electrode 31A side, a force acts from the protective sheet 35A side as well by the reaction of the pressing force.

In the tenth embodiment, the first electrode 31A exhibits at least conductive property and functions as a so-called electrode. The resistivity of the first electrode 31A is not particularly limited as long as the first electrode 31A exhibits conductive property as an electrode and is, for example, $1\times10^{-9}$ to $1\times10^{-5}$ Ωm, preferably $1\times10^{-8}$ to $5\times10^{-6}$ Ωm. The first electrode 31A usually exhibits flexibility but may exhibit elastic property. The flexibility is a property that an object is flexed and deformed as a whole by an external force (normal pressing force applied to the pressure sensitive device: for example, pressing force of about 0.1 to 100 N/cm$^2$) but returns to the original shape when the force is removed. In a case where the first electrode 31A exhibits flexibility, the first electrode 31A has an elastic modulus of, for example, more than about $10^8$ Pa, particularly more than $10^8$ Pa and $10^{12}$ Pa or less, and, for example, one example of the elastic modulus is about $1.2\times10^{11}$ Pa.

The first electrode 31A may be formed of any material as long as it exhibits at least conductive property. In a case where the first electrode 31A exhibits flexibility, the first electrode 31A may be formed of, for example, a metal body, may be formed of a glass body and a conductive layer formed on the surface thereof and/or a conductive filler dispersed therein, or may be formed of a resin body and a conductive layer formed on the surface thereof and/or a conductive filler dispersed in the resin body. The metal body is an electrode member formed of a metal, that is, the first electrode 31A may be substantially formed of a metal. The metal body is formed to contain at least one metal selected from the group consisting of Au (gold), Ag (silver), Cu (copper), Ni—Cr alloy (nichrome), C (carbon), ZnO (zinc oxide), $In_2O_3$ (indium(III) oxide), and $SnO_2$ (tin(IV) oxide). The glass body is not particularly limited as long as it has a network structure of silicon oxide and may be formed to contain, for example, at least one glass material selected from the group consisting of quartz glass, soda-lime glass, borosilicate glass, and lead glass. The resin body may be formed to contain at least one resin material selected from the group consisting of styrene-based resin, silicone-based resin (for example, polydimethylpolysiloxane (PDMS)), acrylic-based resin, rotaxane-based resin, and urethane-based resin. The conductive layers formed on the glass body and resin body may be layers formed by depositing at least one metal selected from the group of metals similar to the metals which can constitute the metal body or may be layers formed by applying conductive ink or the like. The conductive filler dispersed in the glass body and resin body may be formed to contain at least one metal selected from the group of metals similar to the metals which can constitute the metal body. The first electrode 31A is preferably formed of a metal body, particularly nichrome or copper from the viewpoint of further improving the detection sensitivity to pressure distribution.

The thickness of the first electrode 31A is not particularly limited as long as the capacitance between the first electrode 31A and the second electrode 32A is changed by the pressing force from the outside and is usually 100 μm to 10 cm, preferably 500 μm to 1 cm, and for example, one example thereof is more preferably 1 mm.

The first electrode 31A has an elongated shape (for example, a strip shape, a linear shape) (FIG. 11 and the like). The first electrode 31A and the second electrode 32A both have an elongated shape, and thus the pressure sensitive device 100 constitutes a matrix structure as illustrated in FIG. 6. In other words, the pressure sensitive device 100 can cause the individual parts (facing portions) at which the plurality of first electrodes 31A (for example, 31A-1, 31A-2) extending in the first direction m and the plurality of second electrodes 32A (for example, 32A-1, 32A-2) extending in the second direction n overlap each other in planar view to function as a sensor unit (namely, sensing element/sensing unit) (for example, a1 to a4). The angle (the smaller angle) formed by the first direction m and the second direction n is not particularly limited as long as these directions intersect each other in planar view and is usually 30° to 90°, preferably 90°. The planar view means a plan view as viewed from the thickness direction of the pressure sensitive device. FIG. 6 is an example of a schematic plan view of the first electrode and second electrode of the pressure sensitive device according to the tenth embodiment as seen through in the thickness direction of the pressure sensitive device.

When a plurality of members having an elongated shape are used as the first electrodes 31A, the distance (pitch) p1 (FIG. 6) between these adjacent members having an elongated shape is usually 1 to 30 mm, is preferably 2 mm to 10 mm from the viewpoint of further improving the detection sensitivity to pressure distribution, and for example, one example thereof is more preferably 5 mm. The width r1 (FIG. 6) of the first electrode 31A is usually 1 to 20 mm, is preferably 2 mm to 10 mm from the viewpoint of further improving the detection sensitivity to pressure distribution, and for example, one example thereof is more preferably 5 mm.

The first electrode 31A is preferably connected to the ground (0 V) of the measurement unit from the viewpoint of noise prevention at the time of measurement of the pressing force.

In a case where the first electrode 31A is formed of, for example, a metal body, the first electrode 31A can be obtained by a vapor deposition method or the like, or a metal foil or a metal wire may be used.

The second electrode 32A is disposed close to the first electrode 31A. In other words, the second electrode 32A is disposed so as to indirectly come into contact with the first electrode 31A via the dielectric 33A, the conductive heating element 37, and the conductive elastic body 38. The second electrode 32A may be disposed so as to indirectly come into contact with the first electrode 31A via the dielectric 33A, the air layer, the conductive heating element 37, and the conductive elastic body 38.

The second electrode 32A exhibits at least conductive property and functions as a so-called electrode. The resistivity of the second electrode 32A is, for example, $1\times10^{-9}$ to $1\times10^{-5}$ Ωm, preferably $1\times10^{-8}$ to $5\times10^{-6}$ Ωm.

The second electrode 32A usually exhibits flexibility but may exhibit elastic property. The flexibility is a property that an object is flexed and deformed as a whole by an external force (normal pressing force applied to the pressure sensitive device: for example, pressing force of about 0.1 to 100 N/cm$^2$) but returns to the original shape when the force is removed. In a case where the second electrode 32A exhibits flexibility, the second electrode 32A has an elastic modulus of, for example, more than about $10^8$ Pa, particularly more than $10^8$ Pa and $10^{12}$ Pa or less, and, for example, one example of the elastic modulus is about $1.2\times10^{11}$ Pa.

The second electrode 32A may be formed of any material as long as it exhibits at least conductive property. In the tenth embodiment, the second electrode 32A may be formed of a material selected from a similar range of materials as that for the first electrode 31A. The second electrode 32A is preferably formed of a metal body, particularly nichrome or copper from the viewpoint of further improving the detection sensitivity to pressure distribution.

The second electrode 32A is usually an elongated member having an elongated shape (for example, a strip shape, a linear shape). When the second electrode 32A is an elongated member and is formed of a metal body, the second electrode 32A preferably corresponds to a metal line or a metal wire (for example, copper wire) from the viewpoint of further improving the detection sensitivity to pressure distribution. The elongated member as the second electrode 32A is preferably disposed in a linear shape from the viewpoint of use (mounting) on the flat surface of the pressure sensitive device. In addition, the elongated member is preferably disposed in a curved shape when being used on a curved surface. The elongated member as the second electrode 32A may be disposed without applying a tension to the elongated member from the viewpoint of use (mounting) on the curved surface of the pressure sensitive device. At this time, for example, the elongated member may be disposed in a wavy shape along the constant main direction x (second direction n) as illustrated in FIG. 7. FIG. 7 is a diagram schematically illustrating an example of a planar view shape (for example, an elongated shape and a wavy shape) of the second electrode in an example of the pressure sensitive device according to the tenth embodiment and is a sketch of the protective sheet 35A to be described later and the second electrode 32A as viewed from the second electrode side. The planar view shape means the shape as viewed from upper surface and also includes, for example, a see-through shape when the pressure sensitive device of FIG. 12A is viewed from a direction (for example, upward direction in FIG. 12A) perpendicular to the sheet shape of this pressure sensitive device.

Figure 22:
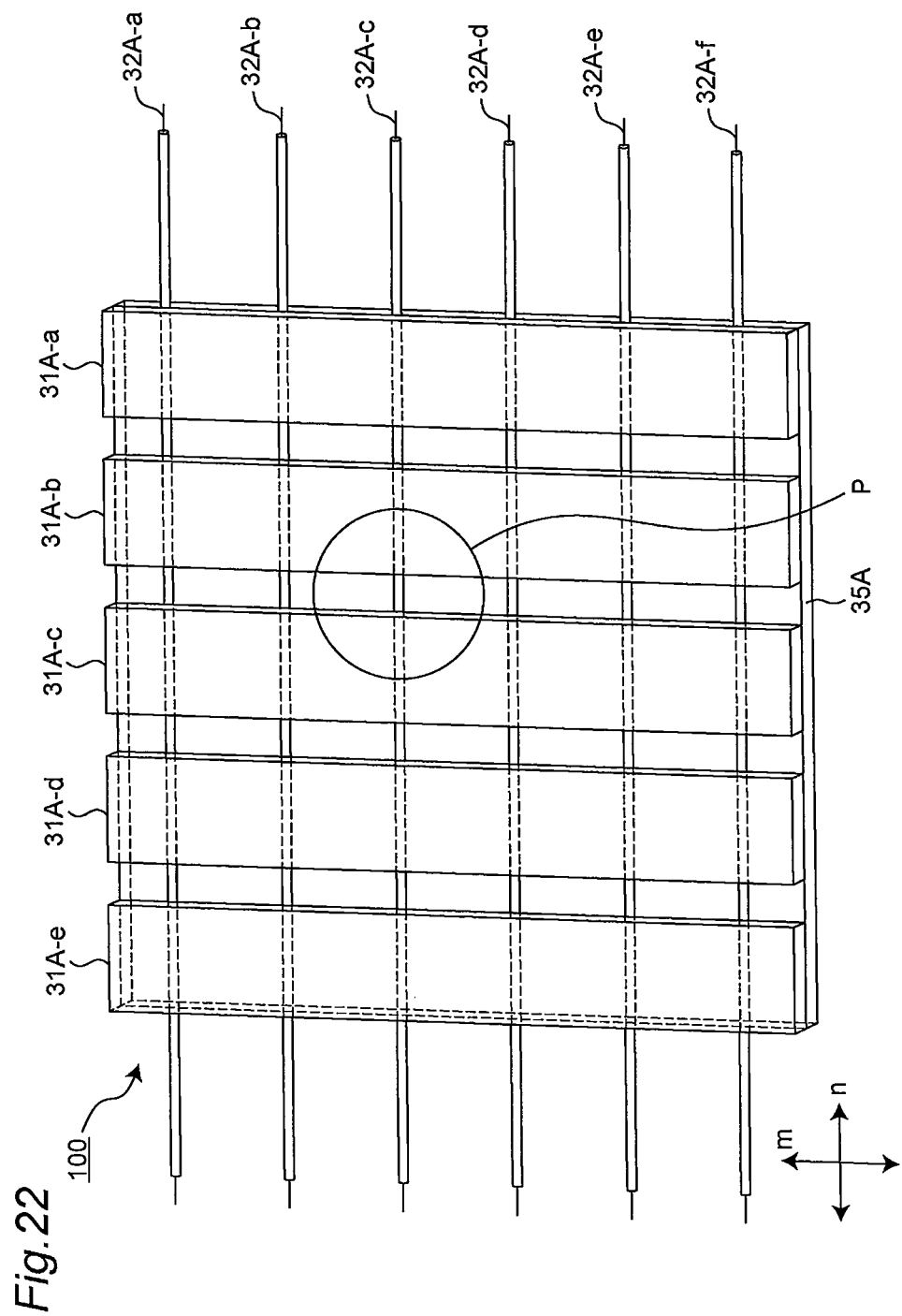
FIG. 22 is a schematic appearance diagram of the pressure sensitive device according to the tenth embodiment.

The second electrodes 32A each have an I-shape on the protective sheet 35A, for example, as illustrated in FIG. 11 and FIG. 22 to be described later, but is not particularly limited as long as they intersect the first electrodes 31A in planar view, and may have, for example, a U-shape formed by bending one end on the protective sheet 35A.

The sectional shape of the second electrode 32A is not particularly limited as long as the area of the contact region is expanded by the application of the pressing force and may be a circular shape, for example, as illustrated in FIG. 12A or may be an elliptical shape, a triangular shape or the like.

The sectional dimension of the second electrode 32A is not particularly limited as long as the capacitance between the second electrode 32A and the first electrode 31A can be measured, is usually 1 μm to 10 mm, is preferably 100 μm to 1 mm from the viewpoint of further improving the detection sensitivity to pressure distribution, and for example, one example thereof is more preferably 300 μm. When the sectional dimension of the second electrode 32A is decreased, the change in the area of the contact region increases and the pressure sensitivity is improved. When the sectional dimension of the elongated member is increased, the measurement range of pressing force becomes wider. The sectional dimension of the second electrode 32A is the maximum dimension in the sectional shape. In detail, the sectional dimension of the second electrode 32A is the diameter in a section perpendicular to the elongated direction when the second electrode 32A has a circular section.

A plurality of second electrodes 32A and a plurality of first electrodes 31A are usually used. At this time, patterning is possible by detecting the capacity change between each of the plurality of second electrodes 32A and each of the plurality of first electrodes 31A by the measurement unit. Patterning is to detect the pressing position as well as the pressing force.

When a plurality of elongated members are used as the second electrodes 32A, the distance (pitch) p2 (FIGS. 6 and 7) between these adjacent elongated members is usually 1 to 30 mm, is preferably 2 mm to 10 mm from the viewpoint of further improving the detection sensitivity to pressure distribution, and for example, one example thereof is more preferably 5 mm. When a plurality of elongate members are disposed in a wavy shape and used as the second electrodes 32A, the wavelength X, of the wavy shape (FIG. 7) is usually 1 to 40 mm, is preferably 2 mm to 20 mm from the viewpoint of further improving the detection sensitivity to pressure distribution, and for example, one example thereof is more preferably 10 mm. In addition, the amplitude a of the wavy shape (FIG. 7) is usually 1 to 20 mm, is preferably 2 mm to 10 mm from the viewpoint of further improving the detection sensitivity to pressure distribution, and for example, one example thereof is more preferably 5 mm.

The dielectric 33A is provided on the surface of each of the second electrodes 32A. The dielectric 33A completely covers the entire surface of each of the second electrodes 32A as illustrated in FIG. 12A, but the covering region of the dielectric 33A is not particularly limited as long as the dielectric 33A at least partially covers the surface of the second electrode 32A. The fact that the dielectric 33A at least partially covers the surface of the second electrode 32A refers to a state in which the dielectric 33A covers at least the part between the conductive elastic body 38 and the second electrode 32A on the surface of the second electrode 32A. In other words, the dielectric 33A is only required to cover at least a part of the surface of the second electrode 32A as long as it exists between the conductive elastic body 38 and the second electrode 32A. The fact that the dielectric 33A "covers" means that the dielectric 33A is integrated while being closely attached in a film form to the surface of the second electrode 32A.

The dielectric 33A preferably completely covers the entire surface of the second electrode 32A from the viewpoint of further simplification of the pressure sensitive device structure. The dielectric 33A preferably completely covers the entire surface of the second electrode 32A from the viewpoint of further simplification of the pressure sensitive device structure and easiness of procurement of pressure sensitive device materials. In a case where the dielectric 33A completely covers the entire surface of the second electrode 32A, the dielectric 33A constitutes an insulating film of the second electrode 32A and the dielectric 33A and the second electrode 32A are usually integrated. The dielectric 33A and second electrode 32A integrated may correspond to an insulation-coated metal wire or may be, for example, an enamel wire or an element wire. When an insulation-coated metal wire is used, the pressure sensitive device can be configured simply by disposing the insulation-coated metal wire between the conductive elastic body 38 and the protective sheet 35A to be described later without performing a photolithography process such as etching, thus simplification of the pressure sensitive device structure can be far more sufficiently achieved, and further the manufacturing cost is low.

The dielectric 33A may be formed of any material as long as it exhibits at least the properties as a "dielectric". For example, the dielectric 33A may be formed to contain a resin material, a ceramic material, and/or a metal oxide material. By way of example only, the dielectric 33A may be formed of at least one resin material selected from the group consisting of polypropylene resin, polyester resin (for example, polyethylene terephthalate resin), polyimide resin, polyphenylene sulfide resin, polyvinyl formal resin, polyurethane resin, polyamideimide resin, polyamide resin and the like or may be formed of at least one metal oxide material selected from the group consisting of $Al_2O_3$, $Ta_2O_5$ and the like. The dielectric 33A is usually formed of a material having a resistance value higher than the impedance of the capacity in a desired frequency band.

The dielectric 33A usually exhibits rigid property. The rigid property is a property that an object resists deformation by an external force (normal pressing force applied to the pressure sensitive device: for example, pressing force of about 0.1 to 100 $N/cm^2$). The dielectric 33A is usually not deformed by normal pressing force as described above. The dielectric 33A may have a higher elastic modulus than the conductive elastic body 38 so that the dielectric 33A is less likely to be deformed than the conductive elastic body 38 when a pressing force is applied to the pressure sensitive device. For example, in a case where the elastic modulus of the conductive elastic body 38 is about $10^4$ Pa to $10^8$ Pa, the dielectric 33A may have an elastic modulus higher than this.

The thickness of the dielectric 33A is not particularly limited as long as the capacitance between the first electrode 31A and the second electrode 32A is changed by the pressing force from the outside, is usually 20 nm to 2 mm, preferably 20 nm to 1 mm from the viewpoint of further improving the detection sensitivity to pressure distribution, and for example, one example thereof is more preferably 10 μm.

In a case where the dielectric 33A is formed of a resin material, the dielectric 33A can be formed by a coating method in which a resin material solution is applied and dried, and by an electrodeposition method in which electrodeposition is performed in a resin material solution.

In a case where the dielectric 33A is formed of a metal oxide material, the dielectric 33A can be formed by an anodic oxidation method and the like.

The conductive heating element 37 is disposed at each of a plurality of facing portions at which the plurality of first electrodes 31A and the plurality of second electrodes 32A intersect each other. In other words, the conductive heating element 37 may be individually disposed at individual parts (namely, overlapping portions or facing portions) at which the plurality of first electrodes 31A and the plurality of second electrodes 32A overlap each other in planar view as illustrated in FIGS. 11, 12A and 12B, may be disposed while having an elongated shape extending in the first direction m similarly to the first electrode 31A, or may be disposed while having one sheet shape which covers all the overlapping portions (or facing portions) without being divided. It is preferable that the conductive heating element 37 be individually disposed at each overlapping portion (or each facing portion) from the viewpoint of local heating. The conductive heating element 37 is disposed between the first electrode 31A and the dielectric 33A (usually between the first electrode 31A and the conductive elastic body 38 to be described later) in the thickness direction of the pressure sensitive device 100 and is preferably disposed to be in contact with the first electrode 31A.

The conductive heating element 37 is formed of a material which self-heats by the application of voltage. It is preferable that the material forming the conductive heating element 37 have an appropriately great resistivity enough to effectively generate Joule heat while exhibiting conductive property. The resistivity of the conductive heating element 37 is usually higher than the resistivities of the first electrode 31A and second electrode 32A described above, is, for example, $1\times10^{-7}$ to $1\times10^{-2}$ Ωm, and may be preferably $1\times10^{-8}$ to $1\times10^{-3}$ Ωm. The conductive heating element 37 preferably exhibits flexibility from the viewpoint of further improving the detection sensitivity to pressure distribution. Here, the flexibility is a property that an object is flexed and deformed as a whole by an external force (normal pressing force applied to the pressure sensitive device: for example, pressing force of about 0.1 to 100 $N/cm^2$) but returns to the original shape when the force is removed. In a case where the conductive heating element 37 exhibits flexibility, the conductive heating element 37 has an elastic modulus of, for example, more than about $10^8$ Pa, particularly more than $10^8$ Pa and $10^{12}$ Pa or less, and, for example, one example of the elastic modulus is about $1.2\times10^{11}$ Pa.

The conductive heating element 37 may be formed of any material as long as it has at least a resistivity as the above. For example, the conductive heating element 37 may be formed to contain a metal alloy system, a ceramic material, a resin material, and/or a metal oxide material. By way of example only, the conductive heating element 37 may be formed of at least one metal alloy-based material selected from the group consisting of Ni—Cr and Fe—Cr alloy systems and the like in the case of a metal alloy system, may be formed of at least one ceramic material selected from the group consisting of silicon carbide (SiC), a molybdenum silicide-based material ($MoSi_2$), lanthanum chromite ($LaCrO_3$), a zirconia-based material ($ZrO_2$), a carbon-based material (C) and the like, or may be formed of at least one metal oxide material selected from the group consisting of $Al_2O_3$, and $Ta_2O_5$ and the like.

The thickness of the conductive heating element 37 is usually 1 μm to 10 mm, preferably 10 μm to 1 mm.

The schematic appearance diagram of an electric heating member 370 as an example of the conductive heating element 37 is illustrated in FIG. 12C. In the electric heating member 370, an insulator 373 is disposed between two conductive layers (371, 372) and an electric heating wire 374 electrically connects the two conductive layers (371, 372) to each other while being contained (or embedded) in the insulator 373. As the content of the electric heating wire 374 in the insulator 373 is higher, the heat generation rate and heat generation efficiency of the electric heating member 370 are higher. In order to secure the content of the electric heating wire 374 required to achieve predetermined heat generation, the electric heating wire 374 may have a meandering shape, for example, as illustrated in FIG. 12C or a spiral shape in the insulator 373.

The conductive layers (371, 372) may be layers which exhibit at least conductive property and can function as so-called electrodes. The resistivity of the conductive layers is, for example, $1\times10^{-9}$ to $1\times10^{-5}$ Ωm, preferably $1\times10^{0.8}$ to $5\times10^{-6}$ Ωm. The conductive layers (371, 372) usually exhibit flexibility but may exhibit elastic property. The flexibility is a property that an object is flexed and deformed as a whole by an external force (normal pressing force applied to the pressure sensitive device: for example, pressing force of about 0.1 to 100 $N/cm^2$) but returns to the original shape when the force is removed. In a case where the conductive layers exhibit flexibility, the conductive layers have an elastic modulus of, for example, more than about $10^8$ Pa, particularly more than $10^8$ Pa and $10^{12}$ Pa or less, and, for example, one example of the elastic modulus is about $1.2\times10^{11}$ Pa. The conductive layers (371, 372) may be formed of any material as long as they exhibit at least conductive property. The conductive layers (371, 372) may be formed of a material selected from a similar range of materials as that for the first electrode 31A. The conductive layers (371, 372) are preferably formed of a metal body, particularly copper (for example, copper foil) from the viewpoint of further improving the heat generation rate and heat generation efficiency. The thicknesses of the conductive layers (371, 372) are not particularly limited as long as the electric heating member 370 generates heat and are each independently usually 1 μm to 1 mm, preferably 10 μm to 100 μm.

The insulator 373 may be formed of any material as long as it exhibits at least the properties as an "insulator". The resistivity of the insulator 373 is, for example, $10^8$ Ωm or more, preferably $10^8$ to $10^{17}$ Ωm. The insulator 373 may be formed of a material selected from a similar range of materials as that for the dielectric 33A. The insulator 373 is preferably formed of a ceramic material (particularly, oxides containing valve metals such as Al and Zr (for example, aluminum oxide, zirconium oxide); titania; hafnia) or a resin material from the viewpoint of further improving safety, heat generation rate, and heat generation efficiency, The thickness of the insulator 373 is usually 1 μm to 10 mm, preferably 10 μm to 1 mm.

It is preferable that the electric heating wire 374 have an appropriately great resistivity enough to effectively generate Joule heat while exhibiting conductive property. The resistivity of the electric heating wire 374 is, for example, $1\times10^{-9}$ to $1\times10^{-5}$ Ωm, preferably $1\times10^{-8}$ to $5\times10^{-6}$ Ωm.

The electric heating member 370 can be obtained by, for example, disposing the electric heating wire 374 inside a molded body formed of a predetermined raw material (for example, a ceramic raw material (namely, inorganic fine particles)) of the insulator 373 and a binder, firing this molded body, and forming the conductive layers (371, 372) on this fired molded body by a vapor deposition method or the like.

The conductive elastic body 38 is disposed at each of a plurality of facing portions at which the plurality of first electrodes 31A and the plurality of second electrodes 32A intersect each other similarly to the conductive heating element 37. In other words, the conductive elastic body 38 may be individually disposed at individual parts (namely, overlapping portions or facing portions) at which the plurality of first electrodes 31A and the plurality of second electrodes 32A overlap each other in planar view as illustrated in FIGS. 11, 12A and 12B, may be disposed while having an elongated shape extending in the first direction m similarly to the first electrode 31A, or may be disposed while having one sheet shape which covers all the overlapping portions (or facing portions) without being divided. It is preferable that the conductive elastic body 38 be individually disposed at each overlapping portion (or each facing portion) from the viewpoint of further improving the detection sensitivity to the pressure distribution. The conductive elastic body 38 is disposed between the conductive heating element 37 and the dielectric 33A in the thickness direction of the pressure sensitive device 100 and is preferably disposed to be in contact with the conductive heating element 37.

The conductive elastic body 38 exhibits elastic property and conductive property. The elastic property is a property that an object is locally deformed by an external force (normal pressing force applied to the pressure sensitive device: for example, pressing force of about 0.1 to 100 N/cm$^2$) but returns to the original shape when the force is removed. Specifically, the conductive elastic body 38 is only required to exhibit elastic property so that the area of the contact region between the conductive elastic body 38 and the dielectric 33A is expanded by the pressing force applied to the pressure sensitive device. In detail, the conductive elastic body 38 may have a lower elastic modulus than the dielectric 33A so as to be deformed more than the dielectric 33A when being pressed. The elastic modulus of the conductive elastic body 38 is preferably, for example, about $10^4$ Pa to $10^8$ Pa from the viewpoint of further improving the detection sensitivity to pressure distribution, and for example, one example thereof is about $10^6$ Pa. The measurement range of the pressing force is wider as the elastic modulus of the conductive elastic body 38 is greater in the above range. The pressure sensitivity is more favorable as the elastic modulus of the conductive elastic body 38 is smaller in the above range. When the pressure sensitivity is improved, for example, even significantly low pressing force which has been hardly detected in the past can be detected. Along with this, it is possible to accurately detect the start of pressing force application.

The resistivity of the conductive elastic body 38 is usually higher than the resistivity of the first electrode 31A and is, for example, $1\times10^{-7}$ Ωm or more, particularly $1\times10^{-7}$ to $1\times10^{-2}$ Ωm. The resistivity can be adjusted by changing the relative proportions between the conductive filler and resin materials (for example, a rubber material) to be described later.

The conductive elastic body 38 corresponds to an elastic electrode member and can also be called a stretchable member. The conductive elastic body 38 may be formed of any material as long as it exhibits both properties of the elastic property and the conductive property as described above. For example, the conductive elastic body 38 may be formed of a conductive resin containing a resin material (particularly a rubber material) and a conductive filler dispersed in the resin material. The preferred conductive elastic body 38 is formed of conductive rubber containing a rubber material and a conductive filler dispersed in the rubber material from the viewpoint of further improving the detection sensitivity to pressure distribution. As the conductive elastic body 38 is formed of conductive rubber, the pressing force can be effectively detected and, for example, even significantly low pressing force can be accurately detected. The resin material may be, for example, at least one resin material selected from the group consisting of styrene-based resin, silicone-based resin (for example, polydimethylpolysiloxane (PDMS)), acrylic-based resin, rotaxane-based resin, urethane-based resin, and a rubber material. The rubber material may be, for example, at least one rubber material selected from the group consisting of silicone rubber, isoprene rubber, butadiene rubber, styrene-butadiene rubber, chloroprene rubber, nitrile rubber, polyisobutylene, ethylene propylene rubber, chlorosulfonated polyethylene, acrylic rubber, fluororubber, epichlorohydrin rubber, and urethane rubber. The conductive filler may be formed to contain at least one material selected from the group consisting of Au (gold), Ag (silver), Cu (copper), C (carbon), ZnO (zinc oxide), In$_2$O$_3$ (indium(III) oxide), and SnO$_2$ (tin(IV) oxide). In addition, a conductive layer may be used instead of or in addition to the conductive filler. Specifically, the first electrode 31A may be a first electrode formed by providing a conductive layer on the surface of the resin structure (particularly rubber structure material) containing the above-described resin material (particularly rubber material) by application of conductive ink or the like.

The thickness of the conductive elastic body 38 is usually 100 μm to 10 cm, preferably 500 μm to 1 cm, and for example, one example thereof is more preferably 1 mm.

The conductive elastic body 38 can be obtained by the following method. For example, a composite material is first obtained by containing a conductive filler in a desired resin material (rubber material) solution or raw material solution. Subsequently, the composite material is applied onto a substrate for peeling, dried, and cured (crosslinked) if desired, and then peeled off from the substrate for peeling to obtain a conductive elastic body.

The conductive elastic body 38 can also be obtained by another following method. For example, a desired resin material (rubber material) solution or raw material solution is first applied onto a substrate for peeling, dried, and cured (crosslinked) if desired. Subsequently, ink containing a conductive filler is applied to the surface of the resin layer (for example, a rubber layer) obtained to form a conductive layer, and the layers are then peeled off from the substrate for peeling to obtain a conductive elastic body 38.

The pressure sensitive device 100 is usually fabricated by disposing the first electrodes 31A, the second electrodes 32A, the dielectrics 33A, the conductive heating elements 37, and the conductive elastic bodies 38 between two protective sheets 34A and 35A. The protective sheets 34A and 35A may be formed of any material as long as they do not hinder the change in the capacitance between the first electrode 31A and the second electrode 32A. The protective sheets 34A and 35A are preferably external force transmissive members exhibiting excellent external force transmissibility from the viewpoint of further improving the detection sensitivity to pressure distribution. The external force transmissibility refers to a property having both flexibility and thinness enough to transmit the external force to the other sheet surface as it is even when an external force (normal pressing force applied to the pressure sensitive device: for example, pressing force of about 0.1 to 100 N/cm$^2$) is applied to one sheet surface. The external force transmissive member may be formed of, for example, resin materials similar to those described in the description of the dielectric 33A and is formed of a cotton cloth as one example. The thicknesses of the protective sheets 34A and 35A are each independently usually 2 mm or less, preferably 0.01 to 2 mm, for example 0.1 mm. The melting point of the resin material constituting the protective sheets 34A and 35A is usually 150° C. or more, preferably 180° C. to 300° C.

The pressure sensitive device 100 may further include a restraint member 300 which limits the position deviation of the second electrode 32A (for example, the dielectric 33A and second electrode 32A integrated) in the pressure sensitive device (FIG. 6 and FIG. 7). The restraint member 300 is not necessarily required to fix the second electrode 32A at a predetermined position in the pressure sensitive device but is only required to have a restraint force enough to hold the second electrode 32A at a predetermined position. As the pressure sensitive device has the restraint member, the position deviation of the second electrode 32A can be prevented and, as a result, the pressing force at a predetermined position can be reliably detected.

The restraint member 300 restrains the second electrode 32A (for example, dielectric 33A) to the protective sheet 35A in FIGS. 6 and 7 but is only required to restrain the second electrode 32A to at least either of the conductive elastic body 38 or the protective sheet 35A. In other words, the restraint member 300 may restrain the second electrode 32A to either of the conductive elastic body 38 or the protective sheet 35A or to both of these. The fact that the restraint member 300 restrains the second electrode 32A to both of these means that the conductive elastic body 38, the second electrode 32A, and the protective sheet 35A are integrated in a state in which the second electrode 32A is disposed between the conductive elastic body 38 and the protective sheet 35A.

Specific examples of the restraint member 300 include a threadlike member, a partition, and an adhesive. The restraint member 300 is preferably a threadlike member. When the restraint member 300 is a threadlike member, it is possible to achieve further simplification of the pressure sensitive device structure while preventing the position deviation of the second electrode 32A.

The threadlike member is not particularly limited as long as it is a member which is long, thin, and flexible enough to sew the second electrode 32A on the conductive elastic body 38 and/or the protective sheet 35A as illustrated in FIGS. 6 and 7 and may exhibit either property of conductivity or nonconductivity. The threadlike member is only required to sew the second electrode 32A on at least either of the conductive elastic body 38 or the protective sheet 35A. In other words, the threadlike member may sew the second electrode 32A on either of the conductive elastic body 38 or the protective sheet 35A or on both of these. The fact that the threadlike member sews the second electrode 32A on both of these means that the conductive elastic body 38, the second electrode 32A, and the protective sheet 35A are integrated by sewing the second electrode 32A in a state in which the second electrode 32A is disposed between the conductive elastic body 38 and the protective sheet 35A.

A specific example of the threadlike member may be, for example, one obtained by stretching a natural or synthetic fiber long and thin and twisting this stretched fiber or may be a fishing line or a metal thread. The threadlike member may sew the second electrode 32A at regular positions, for example, as illustrated in FIGS. 6 and 7 or may sew the second electrode 32A at arbitrary random positions.

Sewing of the second electrode 32A on the conductive elastic body 38 and/or the protective sheet 35A by the threadlike member may be achieved by parallel stitch (running stitch) or may be achieved by machine sewing using a needle thread and a bobbin thread. In a case where the sewing of the second electrode 32A by the threadlike member is achieved by machine sewing, the threadlike member is composed of a needle thread and a bobbin thread, and the needle thread and the bobbin thread are engaged. In a case where the second electrode 32A is sewed on either of the conductive elastic body 38 or the protective sheet 35A, the engaging portion between the needle thread and the bobbin thread is positioned in the conductive elastic body 38 or the protective sheet 35A. In a case where the second electrode 32A is sewed on both of the conductive elastic body 38 and the protective sheet 35A, the engaging portion between the needle thread and the bobbin thread is positioned between the conductive elastic body 38 and the protective sheet 35A.

The partition is a member which stands between the conductive elastic body 38 and the protective sheet 35A in a substantially parallel manner in the thickness direction to partition the space between these and form a compartment. The second electrode 32A is held in a predetermined compartment by the partition. The partition may be formed of, for example, resin materials (particularly a rubber material (namely, an elastomer material)) similar to those described in the description of the conductive elastic body 38, and one example thereof includes silicone rubber. The partition may be formed in a dot shape or may be continuously formed in a linear shape in a planar view shape. The partition may function as a spacer to be described below.

The pressure sensitive device 100 may further include a spacer between the conductive elastic body 38 and the protective sheet 35A to secure a gap between these. As the pressure sensitive device 100 includes a spacer, the conductive elastic body 38 quickly returns to the original shape after the pressing force is removed and the speed to detect the pressing force and the speed to response to the pressing force are improved. The spacer may be formed in a dot shape or may be continuously formed in a linear shape in a planar view shape. The spacer may be formed of, for example, resin materials (particularly a rubber material (namely, an elastomer material)) similar to those described in the description of the conductive elastic body 38 to be describe later, and one example thereof includes silicone rubber.

The measurement unit 4 is a circuit which measures the pressure distribution based on the change in the capacitance between each first electrode 31A and each second electrode 32A. The measurement unit 4 is electrically connected to wiring drawn from each first electrode 31A and wiring drawn from each second electrode 32A via terminals T11 and T12 (FIG. 12A and the like), respectively. The measurement unit 4 may be a control circuit, an integrated circuit, and the like. The first electrode 31A is preferably connected to the ground of the measurement unit 4 from the viewpoint of stabilizing the pressure distribution detection by decreasing the influence of noise. In other words, it is preferable that the terminal T11 of the measurement unit 4 to which the wiring drawn from the first electrode 31A is electrically connected be further connected to the ground. The measurement unit 4 is electrically connected to the first electrode 31A, the second electrode 32A, and the power supply unit 5 to be described later by wire in FIG. 12A and the like but may be electrically connected to these by a wireless communication system. The wireless communication method is not particularly limited, and examples thereof include Bluetooth system, Wi-Fi system, and ZigBee system.

A plurality of the first electrodes 31A are usually used, and thus the measurement unit 4 has a plurality of terminals T11 to be electrically connected to the wiring drawn from each of the plurality of first electrodes 31A. A plurality of the second electrodes 32A are also usually used, and thus the measurement unit 4 has a plurality of terminals T12 to be electrically connected to the wiring drawn from each of the plurality of second electrodes 32A.

The measurement unit 4 may be preferably provided with a temperature sensor (not illustrated) to measure the internal temperature of the pressure sensitive device 100 and may exert a heater function in consideration of this temperature.

The measurement unit 4 usually includes a determination unit (not illustrated) inside or outside thereof, and thus the power supply unit 5 to be described later may be controlled so that the pressing position (or the vicinity thereof) is locally heated based on the pressure distribution. Control may be performed so that the pressing position (or the vicinity thereof) is not locally heated but the region other than the pressing position (or the vicinity thereof) is locally heated.

The power supply unit 5 is electrically connected to the measurement unit 4 and is configured to supply the power to the first electrode 31A and the second electrode 32A based on the pressure distribution measured by the measurement unit 4. Specifically, the power supply unit 5 is configured to apply an alternating voltage to (or between) one or more predetermined first electrodes 31A among the plurality of first electrodes 31A and one or more predetermined second electrodes 32A among the plurality of second electrode so that the pressing position (or the vicinity thereof) is locally heated based on the pressure distribution measured by the measurement unit 4.

Method for Driving Pressure Sensitive Device

In the pressure sensitive device 100 of the tenth embodiment, the pressure distribution is measured by measuring the change in the capacitance between the terminals T11 and T12 based on the change in the area of the contact region without deforming the dielectric 33A. The change in the area of the contact region is relatively greater than, for example, the change in the distance between electrodes in the conventional pressure sensitive sensor, and thus the pressure distribution in a relatively wide range can be measured with a relatively simple structure in the tenth embodiment.

In more detail, in the pressure sensitive sensor function of the pressure sensitive device 100 of the tenth embodiment, the individual parts (facing portions) at which the plurality of first electrodes 31A extending in the first direction m and the plurality of second electrodes 32A extending in the second direction n overlap each other in planar view are used as the sensor unit (namely, sensing element/sensing unit) (for example, a1 to a4) as described above (FIG. 6). The measurement unit 4 measures the pressure distribution over time by measuring (or sensing) each capacitance (namely, capacitance of each sensor unit) between one of the plurality of first electrodes 31A and one of the plurality of second electrodes 32A. In other words, the capacitance of each sensor unit is measured before application of a pressing force. Thereafter, when the measurement (sensing) is performed after application of the pressing force, the sensor unit in which the capacitance has changed is the pressing position. For example, in the pressure sensitive device of FIG. 6, when there is a change in the capacitance between a first electrode 31A-1 and a second electrode 32A-1 but there is no change in the capacitance between the first electrode 31A-1 and a second electrode 32A-2, the capacitance between a first electrode 31A-2 and the second electrode 32A-1, and the capacitance between the first electrode 31A-2 and the second electrode 32A-2, the pressing position is the sensor unit a1. The pressing force can be detected from the capacitance measured before and after application of pressing force and the relation between the capacitance and the pressing force (load), for example, as illustrated in FIG. 5. The manner of changes in the output value when a load is applied to, for example, each of ten sensor units (elements) in such a pressure sensitive device and simultaneous measurement is performed is illustrated in FIG. 8. From FIG. 8, it is apparent that the sensitivity of the pressure sensitive device of the tenth embodiment as a pressure sensitive sensor is extremely high.

In the heater function of the pressure sensitive device 100 of the tenth embodiment, the pressing position detected based on the pressure sensitive distribution in the pressure sensitive sensor function is locally heated. In detail, an alternating voltage is applied to (or between) one or more predetermined first electrodes among the plurality of first electrodes 31A and one or more predetermined second electrodes among the plurality of second electrodes 32A. This causes the conductive heating element 37 at a predetermined position (facing portion) at which the one or more predetermined first electrodes and the one or more predetermined second electrodes intersect each other to generate heat, and the predetermined position in the pressure sensitive device is locally heated. In the present specification, "locally" means "not entirely", and it is only required that heating of the pressing position (or the vicinity thereof) in the pressure sensitive device is achieved.

In more detail, for example, when objects to be heated such as a canned beverage and a person are placed in the region (pressing position) P of the pressure sensitive device 100 and the pressing position is detected as illustrated in FIG. 22, an alternating voltage is applied to the sensor unit matching with this pressing position (for example, between the first electrodes 31A-b and 31A-c and the second electrode 32A-c) or the sensor unit matching with this pressing position and the vicinity thereof (for example, between the first electrodes 31A-b and 31A-c and the second electrodes 32A-b, 32A-c, and 32A-d). By this, Joule heat is generated in the conductive heating element 37 between the first electrodes 31A-b and 31A-c and the second electrode 32A-c or between the first electrodes 31A-b and 31A-c and the second electrodes 32A-b, 32A-c, and 32A-d at a higher efficiency, and the pressing position P in the pressure sensitive device can be selectively and locally heated. Such heating is achieved more locally and more efficiently. FIG. 22 illustrates a schematic appearance of the pressure sensitive device according to the tenth embodiment. Incidentally, the protective sheet 34A is omitted in FIG. 22.

In the pressure sensitive device according to the tenth embodiment, both the pressure sensitive sensor function and the heater function can be exerted by alternately switching these functions by a time-division method. In the disclosure, the "time-division method" is a method in which processing for the pressure sensitive sensor function and processing for the heater function in one pressure sensitive device are alternately performed with a time shift. In detail, the measurement of pressure distribution (for example, measurement of capacitance and/or change thereof) as processing for the pressure sensitive sensor function and the application of alternating voltage to (or between) the first electrode and the second electrode as processing for the heater function are alternately performed.

In the tenth embodiment, the processing time for the pressure sensitive sensor function and the processing time for the heater function are not particularly limited as long as the pressing position can be selectively and locally heated while measuring the pressure distribution (pressing position and pressing force) in the pressure sensitive sensor function. The processing time for the pressure sensitive sensor function may be, for example, 1 microsecond to several minutes, particularly 1 millisecond to 1 minute per one time. The processing time for the heater function may be, for example, 1 second to several tens of minutes, particularly 1 second to 10 minutes per one time.

Eleventh Embodiment: Highly Sensitive Pressure Sensitive Device

Figure 23A:
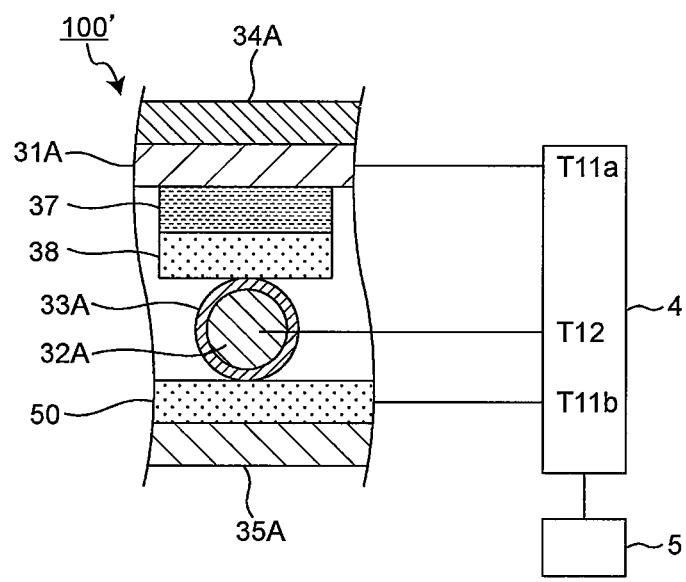
FIG. 23A is a partially enlarged sectional view schematically illustrating a configuration of a pressure sensitive device according to an eleventh embodiment.
Figure 23B:
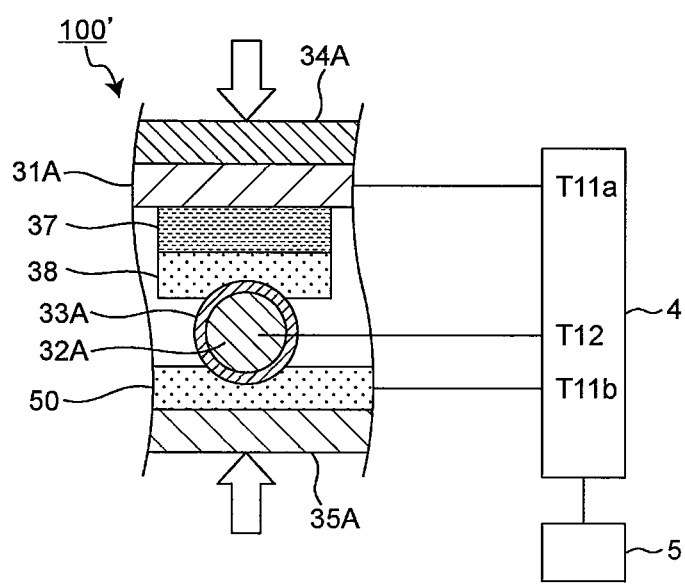
FIG. 23B is a partially enlarged sectional view schematically illustrating the configuration of the pressure sensitive device when a pressing force is applied to the pressure sensitive device according to the eleventh embodiment.

A configuration of a pressure sensitive device 100' of an eleventh embodiment is schematically illustrated in FIGS. 23A and 23B. FIG. 23A is a partially enlarged sectional view schematically illustrating the configuration of the pressure sensitive device according to the eleventh embodiment. FIG. 23B is a partially enlarged sectional view schematically illustrating the configuration of the pressure sensitive device when a pressing force is applied to the pressure sensitive device according to the eleventh embodiment.

The pressure sensitive device 100' is an embodiment of a configuration in which an "additional conductive elastic body 380" is disposed on the side opposite to the first electrode 31A side of the second electrode 32A and is similar to the pressure sensitive device 100 of the tenth embodiment except the following matters. In other words, the "additional conductive elastic body 380" is disposed between the dielectric 33A and the protective sheet 35A. Incidentally, in the eleventh embodiment, the "conductive elastic body 38" is referred to as the "first conductive elastic body 38" and the "additional conductive elastic body 380" is referred to as the "second conductive elastic body 380" in order to more clearly distinguish the "conductive elastic body 38" and the "additional conductive elastic body 380" from each other. The first conductive elastic body 38 in the eleventh embodiment corresponds to the conductive elastic body 38 in the tenth embodiment.

(1B-1) In the pressure sensitive device 100', the second conductive elastic body 380 is disposed immediately below the integrated body of the second electrode 32A and the dielectric 33A. The second conductive elastic body 380 may be selected from a similar range to that of the conductive elastic body 38 (namely, the first conductive elastic body 38) of the pressure sensitive device 100. In other words, the second conductive elastic body 380 may have an elastic modulus and a resistivity in similar ranges to those of the first conductive elastic body 38 of the pressure sensitive device 100. The first conductive elastic body 38 and the second conductive elastic body 380 are preferably formed of conductive rubber. The second conductive elastic body 380 may have an elongated shape similar to the first conductive elastic body 38 but preferably has a sheet shape which covers all the overlapping portions at which the plurality of first electrodes 31A and the plurality of second electrodes 32A overlap each other in planar view without being divided. Here, the conductive rubber may be similar to the conductive rubber described as a constituent material of the first conductive elastic body 38 of the pressure sensitive device 100. The thickness of the second conductive elastic body 380 is usually 100 µm to 10 cm, preferably 500 µm to 1 cm, and for example, one example thereof is more preferably 1 mm.

(1B-2) The second electrode 32A includes a dielectric 33A which completely covers the entire surface. It is preferable that a plurality of second electrodes 32A be used and each of the plurality of second electrodes 32A include the dielectric 33A which completely covers the entire surface.

The measurement unit 4 is similar to the measurement unit 4 of the tenth embodiment except the following matters.

(2B-1) The measurement unit 4 is electrically connected to wiring drawn from the first electrode 31A and the second conductive elastic body 380 and wiring drawn from the second electrode 32A via terminals T11a, T11b, and T12, respectively. For example, the first electrode 31A and the second conductive elastic body 380 are electrically connected to each other via the measurement unit 4. The first electrode 31A and the second conductive elastic body 380 are preferably connected to the ground of the measurement unit 4 from the viewpoint of stabilizing the pressing force detection by decreasing the influence of noise. In other words, it is preferable that the terminals T11a and T11b of the measurement unit 4 to which the wiring drawn from the first electrode 31A and the second conductive elastic body 380 are electrically connected be further connected to the ground.

In the pressure sensitive device 100' of the eleventh embodiment, the pressing force can be measured by measuring the change in the capacitance between the terminals of various combinations in the thickness direction of the pressure sensitive device.

The pressing force can be measured by measuring, for example, one or more changes selected from the group consisting of a change in the capacitance between the terminals T11a and T11b, a change in the capacitance between the terminals T11a and T12, and a change in the capacitance between the terminals T12 and T11b.

From the viewpoint of improving the pressure sensitivity, it is preferable to measure the pressing force by measuring two or more changes selected from the above group, preferably, a change in the capacitance between the terminals T11a and T12 and a change in the capacitance between the terminals T12 and T11b.

In the pressure sensitive device 100' of the eleventh embodiment, the measurement range of the pressing force can be further widened by using those having different elastic moduli (for example, Young's modulus) as the first conductive elastic body 38 and the second conductive elastic body 380. For example, in a case where the elastic modulus of the first conductive elastic body 38 is relatively low and the elastic modulus of the second conductive elastic body 380 is relatively high, the second conductive elastic body 380 is deformed as illustrated in FIG. 23B after the first conductive elastic body 38 is crushed, and thus the measurement range of the pressing force is further widened.

In the pressure sensitive device 100' of the eleventh embodiment, the pressing force is measured by measuring the change in the capacitance between the terminals based on the change in the area of the contact region without deforming the dielectric 33A, and thus a relatively wide range of the pressing force can be measured with a relatively simple structure. In the eleventh embodiment, the "area of the contact region" is the sum of the area of the contact region between the first conductive elastic body 38 and the dielectric 33A and the area of the contact region between the second conductive elastic body 380 and the dielectric 33A.

In the pressure sensitive device 100' of the eleventh embodiment, the second conductive elastic body 380 is used, thus the influence of noise is minor, and the pressing force can be far more stably detected.

The method for driving the pressure sensitive device 100' of the eleventh embodiment is similar to that of the pressure sensitive device 100 of the tenth embodiment except that the second conductive elastic body 380 is newly disposed as described above and thus the detection sensitivity to pressure distribution is further improved as described above.

Twelfth Embodiment: RC Delay Time Type and Impedance Type

A twelfth embodiment indicates that a pressure distribution can be measured by an RC delay time type or an impedance type. The RC delay time type and the impedance type are also methods included in the capacitance type. This is because the capacitance is used in the RC delay time type or the impedance type as well.

Figure 24:
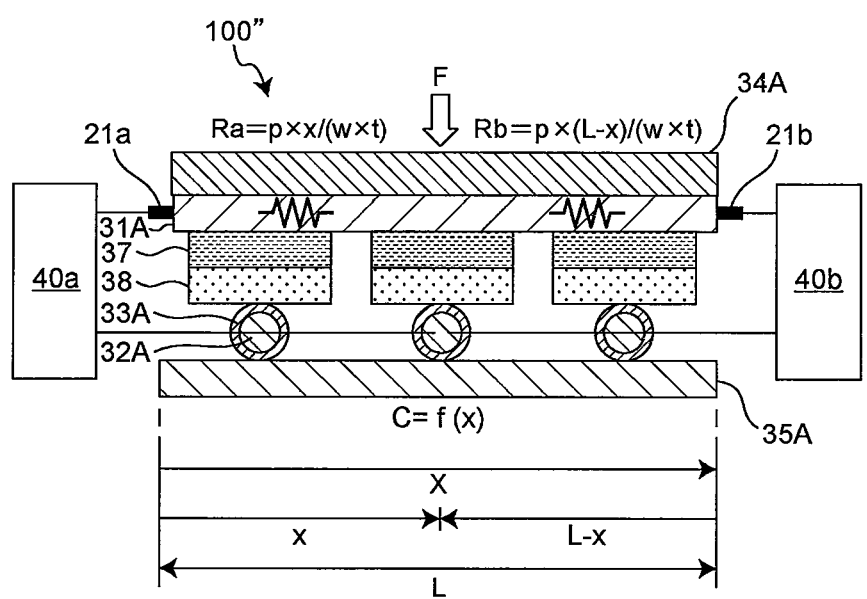
FIG. 24 is a partially enlarged sectional view of the pressure sensitive device for explaining the measurement principle of a pressure distribution by the RC delay time type or the impedance type (twelfth embodiment).

In the twelfth embodiment, the measurement mechanism of pressure distribution in the RC delay time type and the impedance type will be described with reference to FIG. 24 and FIGS. 19 to 21. FIG. 24 is a partially enlarged sectional view of a pressure sensitive device for explaining the measurement principle of pressure distribution by the RC delay time type or the impedance type. FIGS. 19 and 20 are graphs of X coordinate of pressing position-RC delay time for explaining the measurement principle of pressure distribution by the RC delay time type. FIG. 21 is a graph of X coordinate of pressing position-pressure (pressing force) for explaining the measurement principle of pressure distribution by the RC delay time type.

In the RC delay time type and the impedance type, the fact that the sensitivity to pressure change differs depending on whether the electrode is near or far from the pressing position due to the volume resistivity of the electrode utilized. This makes it possible to detect both the pressing position and the pressing force at the same time even with a relatively simple structure.

The pressure sensitive device 100" illustrated in FIG. 24 is similar to the pressure sensitive device 100 of the tenth embodiment except that first terminals 21 (for example, 21a, 21b) electrically connected to both ends of the first electrode 31A are illustrated and this pressure sensitive device has two measurement units 4 (for example, 40a, 40b). Incidentally, the second electrode 32A has second terminals (not illustrated) electrically connected to both ends. The measurement units 4 (for example, 40a, 40b) are usually electrically connected to (or between) the first terminals 21 and the second terminals.

The first electrode 31A has a predetermined volume resistivity. Hence, when the pressing force F is applied from the outside as illustrated in FIG. 24, the resistance value between the pressing position in the first electrode 31A and the first terminal 21 changes according to the distance between the pressing position to which this pressing force F is applied and the first terminal 21. Along with this, a predetermined parameter that can suggest the pressing position and the pressing force changes, and thus the pressing position and the pressing force (particularly the pressing position) can be detected. The pressing force F is applied from the first electrode 31A side in FIG. 24, but the pressing force F is not limited to this and may be applied from the second electrode 32A side.

The predetermined volume resistivity of the first electrode 31A means a volume resistivity enough to measure the RC delay time or impedance to be described later and the changes thereof by the measurement unit at the time of pressing deformation. The resistivity between the terminals (for example, between the terminals 21a and 21b) of the first electrode 31A is, for example, 100Ω to 10 MΩ, particularly 1 kΩ to 500 kΩ.

Examples of the predetermined parameter that can suggest the pressing position and the pressing force include the delay time (time constant) (referred to as "RC delay time" in the present specification) decided by the product of the resistance value and the capacitance and the impedance of the pressure sensitive device. In the disclosure, a method in which both the pressing position and the pressing force are measured by measuring the RC delay time is hereinafter referred to as "RC delay time type" in some cases. A method in which both the pressing position and the pressing force are measured by measuring the impedance is hereinafter referred to as "impedance type" in some cases.

RC Delay Time Type

The detailed description of the RC delay time type in the present embodiment is similar to the detailed description of the RC delay time type in the ninth embodiment except that FIG. 24 is used instead of FIG. 18 and the "heater" is replaced with the "pressure sensitive device". Incidentally, the right side measurement result in FIG. 19 is the result measured by the measurement unit 40b on the right side in FIG. 24.

Impedance Type

The detailed description of the impedance type in the present embodiment is similar to the detailed description of the impedance type in the ninth embodiment except that FIG. 24 is used instead of FIG. 18 and the "heater" is replaced with the "pressure sensitive device". Incidentally, the right side measurement result in FIG. 19 is the result measured by the measurement unit 40b on the right side in FIG. 24.

INDUSTRIAL APPLICABILITY

The secondary battery according to the disclosure can be used in all fields in which secondary batteries have been conventionally used. The secondary battery can be used in, for example, mobile equipment (for example, mobile phones, smartphones, smart watches, laptops, and digital cameras), vehicle equipment (for example, hybrid vehicles, electric vehicles, and electric motorcycles), and space industry equipment (for example, space exploration machines) as such fields.

The pressure sensitive device according to the disclosure additionally serves as a heating device and thus can be used in all applications in which heating devices have been conventionally used. Examples of such applications include home appliances (for example, electric carpets). For example, when the pressure sensitive device according to the disclosure is applied to an electric carpet, a person can be warmed by locally heating only the place at which the person is placed (or the vicinity thereof), and the pressure sensitive device is useful from the viewpoint of energy saving.

In addition, the pressure sensitive device according to the disclosure is useful from the viewpoint of energy saving since the canned beverage can be warmed by locally heating only the place at which the canned beverage is placed (or the vicinity thereof) when the canned beverage is placed on the pressure sensitive device.

REFERENCE SIGNS LIST

1: 1a: 1b: Battery cell
2: Case
3: 3a: 3b: 30A to 30H: Heater
4: 4A: 4B: Measurement unit
5: Power supply unit
6: Output control unit
10: Secondary battery
31A: First electrode
32A: Second electrode
33A: Dielectric
34A: 35A: Protective sheet
37: Conductive heating element
38: Conductive elastic body
100: 100': 100": Pressure sensitive device

The invention claimed is:

1. A secondary battery comprising:
one or more battery cells;
a case for housing the battery cells; and
a heater provided between a battery cell in contact with the case and the case and/or between two battery cells adjacent to each other among the battery cells,
wherein the heater serves as a pressure sensitive sensor that detects a pressure distribution between the battery cell in contact with the case and the case and/or between the two battery cells adjacent to each other.

2. The secondary battery according to claim 1, wherein the heater has a sheet shape, and
the heater is in surface contact with the battery cell in contact with the case and the case between the battery cell and the case, and/or is in surface contact with the two battery cells adjacent to each other between the two battery cells.

3. The secondary battery according to claim 1, wherein the heater is based on a resistance heating type, and
the pressure sensitive sensor is based on a capacitance type.

4. The secondary battery according to claim 1, further comprising:
a measurement unit for measuring the pressure distribution of the heater;
a power supply unit for supplying a power to the heater; and
an output control unit for controlling a power output from the battery cells.

5. The secondary battery according to claim 4, wherein the measurement unit further includes a determination unit, and
the determination unit performs determination of a high rate deterioration or an electrolyte deterioration based on the pressure distribution of the heater, a temperature of the heater, and the output power of the battery cells that are measured by the measurement unit.

6. The secondary battery according to claim 5, wherein the determination unit performs the determination based on the following criteria (1) and/or (2):
(1) it is determined that the high rate deterioration has occurred in a case where a temperature of the heater is a predetermined temperature or less, a pressure of the heater is a predetermined pressure or more, and an output voltage of the battery cells is a predetermined level or less; and/or
(2) it is determined that electrolytic solution deterioration has occurred in a case where a temperature of the heater is a predetermined temperature or more, a pressure of the heater is a predetermined pressure or more, and an output current of the battery cells is a predetermined level or more.

7. The secondary battery according to claim 6, wherein the determination unit supplies the power from the power supply unit to the heater to locally heat the battery cells in the case of (1), and
the determination unit controls the output current of the battery cells by the output control unit in the case of (2).

8. The secondary battery according to claim 4, wherein the heater includes:
a plurality of first electrodes that extend in a first direction and exhibit elasticity;
a plurality of second electrodes extending in a second direction intersecting the first direction; and
a plurality of dielectrics provided on surfaces of the plurality of second electrodes,
wherein the measurement unit measures the pressure distribution by measuring a capacitance between one of the plurality of first electrodes and one of the plurality of second electrodes.

9. The secondary battery according to claim 8, wherein the plurality of first electrodes, the plurality of second electrodes, and the plurality of dielectrics are disposed between two protective sheets in the heater.

10. The secondary battery according to claim 8, wherein Joule heat is generated in a predetermined first electrode among the plurality of first electrodes and/or a predetermined second electrode among the plurality of second electrodes by applying a direct voltage or an alternating voltage to the predetermined first electrode and/or the predetermined second electrode, and the battery cell is locally heated.

11. The secondary battery according to claim 4, wherein the heater includes:
a plurality of first electrodes extending in a first direction;
a plurality of second electrodes extending in a second direction intersecting the first direction; and a plurality of dielectrics provided on surfaces of the plurality of second electrodes,
wherein the heater further includes a conductive heating element and a conductive elastic body at each of a plurality of facing portions at which the plurality of first electrodes and the plurality of second electrodes intersect each other, and
the measurement unit measures the pressure distribution by measuring a capacitance between one of the plurality of first electrodes and one of the plurality of second electrodes.

12. The secondary battery according to claim 11, wherein the plurality of first electrodes, the plurality of second electrodes, the plurality of dielectrics, the conductive heating element, and the conductive elastic body are disposed between two protective sheets in the heater.

13. The secondary battery according to claim 11, wherein the conductive heating element at a predetermined position at which a predetermined first electrode among the plurality of first electrodes and a predetermined second electrode among the plurality of second electrodes intersect each other is caused to generate heat by applying an alternating voltage to the predetermined first electrode and the predetermined second electrode, and a predetermined position in the battery cell is locally heated.

14. The secondary battery according to claim 13, wherein the power supply unit supplies the alternating voltage to the predetermined first electrode and the predetermined second electrode.

15. The secondary battery according to claim 11, wherein the conductive heating element is disposed between each of the plurality of first electrodes and each of the plurality of dielectrics, and
the conductive elastic body is disposed between the conductive heating element and the each of the plurality of dielectrics.

16. The secondary battery according to claim 11, wherein the pressure distribution is detected by measuring a change in capacitance between the one of the plurality of first electrodes and the one of the plurality of second electrodes based on a change in an area of a contact region between the conductive elastic body and one of the plurality of dielectrics, and
the conductive heating element is caused to generate heat by applying an alternating voltage to a predetermined first electrode among the plurality of first electrodes and a predetermined second electrode among the plurality of second electrodes.

17. The secondary battery according to claim 16, wherein the measurement of a change in capacitance and the application of alternating voltage are alternately switched by a time-division method.

18. The secondary battery according to claim 11, comprising an additional conductive elastic body disposed on a side opposite to a first electrode side of each of the plurality of second electrodes.

* * * * *